US012759064B2

(12) United States Patent
Sobl et al.

(10) Patent No.: US 12,759,064 B2
(45) Date of Patent: Oct. 13, 2026

(54) MOBILE HAND-HELD MACHINE SAW WITH A PIVOTING SCORING ASSEMBLY

(71) Applicant: Festool GmbH, Wendlingen (DE)

(72) Inventors: Philipp Sobl, Esslingen (DE); Wolfgang Spengler, Neidlingen (DE); Marco Haible, Wernau (DE)

(73) Assignee: Festool GmbH, Wendlingen (DE)

( * ) Notice: Subject to any disclaimer, the term of this patent is extended or adjusted under 35 U.S.C. 154(b) by 134 days.

(21) Appl. No.: 18/789,958

(22) Filed: Jul. 31, 2024

(65) Prior Publication Data

US 2024/0391000 A1 Nov. 28, 2024

Related U.S. Application Data

(63) Continuation of application No. 17/782,245, filed as application No. PCT/EP2020/085875 on Dec. 13, 2020, now Pat. No. 12,083,609.

(30) Foreign Application Priority Data

Dec. 13, 2019 (DE) ........................ 102019134411.5

(51) Int. Cl.
*B23D 45/10* (2006.01)
*B23D 45/16* (2006.01)
(Continued)

(52) U.S. Cl.
CPC ......... *B23D 45/105* (2013.01); *B23D 45/165* (2013.01); *B27B 9/02* (2013.01); *B27G 19/04* (2013.01); *B27G 19/10* (2013.01)

(58) Field of Classification Search
CPC ............. Y10T 83/0215; Y10T 83/0207; Y10T 83/0333; Y10T 83/0348; Y10T 83/0385;
(Continued)

(56) References Cited

U.S. PATENT DOCUMENTS 4,245,390 A 1/1981 Bond
4,353,165 A * 10/1982 Albery ...................... B27B 9/02
30/376

(Continued)

FOREIGN PATENT DOCUMENTS

CN 1312753 A 9/2001
DE 7324551 U1 7/1973
(Continued)

OTHER PUBLICATIONS

Japanese Office Action dated Jul. 30, 2024.

*Primary Examiner* — Phong H Nguyen
(74) *Attorney, Agent, or Firm* — Hoffmann & Baron, LLP

(57) ABSTRACT

A mobile handheld machine saw (10) having a saw assembly (11), which has a saw toolholder (14) for a saw tool (15), in particular a saw blade, and a saw drive motor (12) for driving the saw toolholder (14), and having a guide device (17), which has a guide body (18) having a guide surface (19) for guiding the handheld machine saw (10) along a working direction (AR) on a workpiece (W) and on its upper side (19A) opposite to the guide surface (19), the saw toolholder (14) is movably mounted by means of a saw depth setting bearing (16) between an upper depth setting position (UT) in which the saw toolholder (14) is adjusted closer to the guide surface (19) than in the upper depth setting position (OT).

28 Claims, 12 Drawing Sheets

(51) Int. Cl.

| | |
|---|---|
| ***B27B 9/02*** | (2006.01) |
| ***B27G 19/04*** | (2006.01) |
| ***B27G 19/10*** | (2006.01) |

(58) Field of Classification Search

CPC .... B23D 45/16; B23D 45/105; B23D 45/046; B23D 45/048; B23D 45/165; B23D 45/10; B23D 45/04; B23D 45/042; B23D 45/044; B23D 45/02; B23D 45/022; B23D 45/021; B23D 45/024; B23D 45/028; B27B 9/02; B27B 9/00; B27G 19/04; B27G 19/10

USPC ...... 30/375, 376, 166.3, 371, 372, 373, 388; 144/3.1

See application file for complete search history.

(56) References Cited

U.S. PATENT DOCUMENTS

| | | | | |
|---|---|---|---|---|
| 4,706,535 | A | | 11/1987 | Ducharme |
| 5,117,722 | A | | 6/1992 | Letendre |
| 5,148,732 | A | | 9/1992 | Striebig |
| 5,159,870 | A | | 11/1992 | Fiala |
| 5,287,786 | A | | 2/1994 | Fiala |
| 5,561,907 | A | * | 10/1996 | Campbell .............. B23Q 3/186 30/388 |
| 5,724,740 | A | * | 3/1998 | Bishop ................. B23D 45/165 30/375 |
| 5,979,525 | A | | 11/1999 | Durney |
| 2013/0318801 | A1 | * | 12/2013 | Nicholson ................. B27B 9/02 30/377 |

FOREIGN PATENT DOCUMENTS

| | | | |
|---|---|---|---|
| DE | 3800935 | A1 | 7/1989 |
| DE | 9106212 | U1 | 1/1992 |
| DE | 19581444 | T1 | 1/1997 |
| DE | 102013020723 | A1 | 6/2015 |
| DE | 102015101907 | A1 | 8/2016 |
| EP | 1193036 | B1 | 4/2002 |
| EP | 2 881 229 | A2 | 6/2015 |
| JP | 2-218510 | A | 8/1990 |
| JP | 9-323301 | A | 12/1997 |
| JP | 2016-64468 | A | 4/2016 |
| WO | 2016/128232 | A1 | 8/2016 |

* cited by examiner

MOBILE HAND-HELD MACHINE SAW WITH A PIVOTING SCORING ASSEMBLY

CROSS-REFERENCE TO RELATED APPLICATIONS

This application is a continuation application of U.S. application Ser. No. 17/782,245, filed Jun. 3, 2022, which is a national stage application based on PCT/EP2020/085875, filed Dec. 13, 2020, which claims priority to DE 10 2019 134 411.5, filed Dec. 13, 2019.

BACKGROUND OF THE INVENTION

The invention relates to a mobile handheld machine saw having a saw assembly, which has a saw toolholder for a saw tool, in particular a saw blade, and a saw drive motor for driving the saw toolholder, and having a guide device, which has a guide surface extending along a longitudinal axis for guiding the handheld machine saw along a working direction on a workpiece or a guide rail and on its upper side opposite to the guide surface, the saw toolholder, in particular the saw assembly as a whole, is movably mounted by means of a saw depth setting bearing between an upper depth setting position and at least one lower depth setting position, in which the saw toolholder is adjusted closer to the guide surface than in the upper depth setting position, so that the saw tool protrudes farther in front of the guide surface in the lower depth setting position than in the upper depth setting position to introduce a saw cut into the workpiece.

Such a handheld machine saw is described, for example, in EP 1 193 036 B1. The saw assembly is pivoted by the operator in the direction of the workpiece to introduce a saw cut into the workpiece. The guide device is guided along the workpiece here in the form of a so-called saw table or a guide plate. Teeth of the saw blade, which is used as the saw tool, cut into the workpiece from the lower side and emerge from the upper side of the workpiece. It can occur in some cases here that components, for example chips, of the workpiece are torn out at the edge adjacent to the saw cut, i.e., an unclean cut results.

Handheld machine saws having scoring assemblies are known, for example, from DE 73 24 551 U1, DE 38 00 935 A1, DE 91 06 212 U1, U.S. Pat. No. 5,287,786, and DE 195 81 444 T1.

It is therefore the object of the present invention to provide an improved mobile handheld machine tool.

SUMMARY OF THE INVENTION

To achieve this object, it is provided in a handheld machine saw of the type mentioned at the outset that it has a scoring assembly, which is arranged in front of the saw assembly on the guide device with respect to the working direction, having a scorer toolholder for a scoring tool, in particular a scorer saw blade, and having a scorer drive for driving the scorer toolholder, which is movably mounted on or with respect to the guide device by means of a scorer depth setting bearing separate from the saw depth setting bearing between at least one active position, in which the scoring tool arranged on the scorer toolholder protrudes in front of the guide surface to introduce a score into the tool upstream in the working direction of a saw cut to be introduced, and an inactive position, in which the scoring tool is adjusted behind the guide surface.

A score can thus be introduced into the surface of the workpiece, in particular its upper side, using the scoring tool. The score aligns with the saw cut to be introduced later into the workpiece. The saw tool preferably cuts into the workpiece from its lower side. The saw tool emerges from the workpiece in the region of the score, wherein the risk is avoided or at least reduced by the score that the workpiece will be torn out on its upper side by the saw tool.

The saw depth setting bearing and the scorer depth setting bearing are preferably arranged in a longitudinal distance with respect to the working direction on the guide body.

The saw depth setting bearing and the scorer depth setting bearing are preferably arranged separately from one another on the guide body.

The saw depth setting bearing and the scorer depth setting bearing preferably have no shared bearing components.

There is preferably movement play between the saw assembly and the scoring assembly, so that the saw toolholder and the scorer toolholder are adjustable independently of one another by means of the respective depth setting bearing, for example to activate and deactivate the scoring tool and the saw tool, to set the respective penetration depth of the scoring tool or saw tool into the workpiece, or the like.

However, it is also possible that the saw toolholder and the scorer toolholder are positively coupled or movement coupled by a driving device, so that they pass through simultaneous movements. The positive coupling or movement coupling can be deactivatable by a deactivation device.

An individual depth mobility of the saw toolholder and the scorer toolholder with respect to the guide surface or the workpiece permits kinematic freedoms.

Of course, it is possible that in one work step first the score is introduced and immediately thereafter the actual saw cut is introduced into the workpiece using the handheld machine saw. However, it is also possible that the handheld machine saw is used in a way known per se in different work steps exclusively as a machine saw, i.e., without a scoring device, or that only a score is introduced into the workpiece, but not a saw cut. The score can be introduced decoratively into the workpiece, for example like an engraving. However, it is typical that the score is used for a later saw cut. In particular if the handheld machine saw is used with a guide rail which is fastened temporarily fixed in place on the workpiece for the workpiece processing, it is possible, for example, to first introduce a score into the workpiece and subsequently the saw cut. In this case, the handheld machine tool is guided along the guide rail twice, first to produce the score, wherein the scoring tool is adjusted into the active position and the saw tool is inactive, in which the upper depth setting position of the saw assembly is set, and subsequently to produce the saw cut, in which the scoring tool is in the inactive position, but the saw toolholder is in one of the lower depth setting positions.

It is preferred if the saw depth setting bearing enables multiple lower depth setting positions, so that the saw tool can engage with different depths into the workpiece and/or protrudes different distances in front of the guide surface. However, it is also readily possible that the saw depth setting bearing only enables one fixedly settable lower depth setting position of the saw toolholder.

Furthermore, it is possible that the saw assembly can assume multiple active positions, in which the scoring tool protrudes different distances in front of the guide surface and thus penetrates to different depths into the workpiece during working operation, so that scores of different depths are producible. Of course, it is possible to set different score depths by exchanging scoring tools, which protrude different distances in front of the guide surface in the active position.

It is preferred if the scoring assembly and/or the saw assembly are adjustable as a whole on the respective depth setting bearing with respect to the guide device between various positions. However, it is also possible in principle that the saw assembly or the scoring assembly are fixed as such with respect to the guide device, for example, have a housing arranged fixed in place with respect to the depth setting on the guide device, and only the respective toolholder, thus the saw toolholder and/or the scorer toolholder, are adjustable between the upper depth setting position and the at least one lower depth setting position or the inactive position and the at least one active position.

It is advantageously provided that the handheld machine saw has a driving device to provide a driving coupling between the saw toolholder and the scorer toolholder, by which upon a movement of the saw toolholder between depth setting positions and/or between the upper and the at least one lower depth setting position, the scorer toolholder is carried along between the inactive position and the at least one active position, wherein the driving device has an actuation generator arranged on the saw assembly to actuate an actuation acceptor arranged on the scoring assembly. The actuation generator actuates the actuation acceptor, wherein the scoring assembly as a whole or the scorer toolholder is actuatable, for example, from the inactive position into the at least one active position and/or from the at least one active position into the inactive position.

The actuation generator of the saw assembly and the actuation acceptor of the scoring assembly are advantageously mechanically coupled with one another or engaged with one another. The actuation generator can be arranged fixed in place or movably on the saw assembly and the actuation acceptor can be arranged fixed in place or movably on the scoring assembly. The driving of the scorer toolholder by the saw toolholder can take place, for example, between two different lower depth positions. The driving preferably takes place between the upper depth setting position and one or more lower depth setting positions. The actuation generator and the actuation acceptor can also be components of a gearing, a gearwheel transmission, a cable pull transmission, a Bowden cable, or the like.

However, an actuation generator in the form of a sensor for detecting the depth setting position of the saw toolholder is also possible, by the signals of which a motorized scorer positioning drive is activated to adjust the scorer toolholder between the active position and the inactive position. The scorer positioning drive then forms the actuation acceptor.

The driving device can only couple the toolholders with one another. For example, it is possible that the saw toolholder carries along the scorer toolholder by way of the driving device. However, it is preferred if the driving device enables a movement coupling between the saw assembly and the scoring assembly as a whole, so that the scoring assembly is carried along by the saw assembly upon an adjustment of the saw assembly.

The driving device can act bidirectionally or unidirectionally. For example, it is provided that the driving device carries along the scorer toolholder, in particular only, in a first movement direction of the saw toolholder from the upper depth setting position in the direction of the at least one lower depth setting position and/or, in particular only, carries it along in a second movement direction from the at least one lower depth setting position in the direction of the upper depth setting position. It is possible that only the driving in the first movement direction or only the driving in the second movement direction or also driving in both movement directions is provided between the saw toolholder and the scorer toolholder.

It is advantageous if the scorer toolholder and thus a scoring tool arranged thereon is adjustable into one of the active positions without the saw tool penetrating into the workpiece. One preferred exemplary embodiment accordingly provides that the driving device couples the scorer toolholder having a scoring tool arranged thereon and the saw toolholder having a saw tool arranged thereon with one another in a scorer activation section in such a way that the saw toolholder is adjustable into a lower, in particular non-sawing, depth setting position, in which the saw tool does not protrude in front of the guide surface, and the scorer toolholder is adjusted by the adjustment of the scorer toolholder into the lower depth setting position in the at least one active position, in which the scoring tool protrudes in front of the guide surface to penetrate into the workpiece. It is thus possible that the saw tool is already adjusted in the direction of one of the lower depth setting positions or in the direction of the guide surface to actuate the scorer toolholder in the direction of the active position but does not yet protrude in front of the guide surface, while the scoring tool already protrudes in front of the guide surface. In this way, for example, a score can be introduced into the workpiece without the saw tool also penetrating into the workpiece. The scorer activation section is, for example, a first actuation section, namely in particular an actuation section in the case of an adjustment of the saw toolholder from the upper depth setting position in the direction of the at least one lower depth setting position.

It is advantageously provided that the handheld machine saw has an only-scoring depth stop device, wherein the only-scoring depth stop device has a stop element, which is adjustable between a stop position, in which the stop element stops on a counter stop in the lower depth setting position, which is not provided for sawing, or scorer depth setting position of the saw toolholder, and a release position, in which the stop element is movable past the counter stop, so that the saw toolholder is adjustable into a lower depth setting position, in which the saw tool protrudes in front of the guide surface. The stop element comprises, for example, a slide, a pivot body, or the like which is adjustable between the stop position and the release position. The movable stop element is, for example, movably mounted on the component connected to the saw toolholder, for example a housing for the saw drive motor, and interacts with a counter stop arranged fixed in place, for example, on a cover hood for the saw tool.

It is also advantageous, however, if the saw toolholder is adjustable between multiple, for example two, depth setting positions, in which the saw blade or saw tool protrudes different distances in front of the guide surface and/or penetrates different depths into the workpiece, without the position of the scorer toolholder and thus the penetration depth of the scoring tool into the workpiece or the distance with which the scoring tool protrudes in front of the guide surface thus being influenced. One preferred exemplary embodiment provides that the driving device couples the saw toolholder having a saw tool arranged thereon and the scorer toolholder having a scoring tool arranged thereon with one another in a scorer holding section in such a way that the saw toolholder is adjustable between lower depth setting positions, in which the saw tool protrudes different distances in front of the guide surface and/or in which the saw toolholder is adjusted differently close to the guide device or the guide surface and the scorer toolholder remains essentially in the same active position. Of course, it is possible that the scorer toolholder does not remain exactly in the same active position, i.e., that the distance by which the scoring tool protrudes in front of the guide surface also varies in the scorer holding section of the driving device by a predetermined, small amount. The scorer holding section is preferably a second actuation section when the scoring tool has thus already penetrated into the workpiece, but the scoring tool is not to penetrate farther into the workpiece for the introduction of the saw cut by the saw tool.

The actuation generator and the actuation acceptor are, for example, components of an actuating transmission or coupling transmission. Thus, for example, a four-bar linkage or similar other actuating mechanism or actuating linkage arrangement can be provided between the saw assembly and the scoring assembly. Furthermore, the driving device can comprise, for example, a lever transmission, a toothed transmission, a gearwheel transmission, an articulation, or combinations thereof or can be formed thereby. Furthermore, it is possible that the actuation generator and the actuation acceptor are components of a cable pull transmission and/or Bowden cable. It is therefore possible that the driving device comprises, for example, a Bowden cable, a cable pull transmission, a curve transmission, a cam disc, a linkage, a gearwheel transmission, or the like.

A link guide is preferably provided, wherein the actuation generator and actuation acceptor are components of the link guide. One component of actuation generator and actuation acceptor is a guide link and the other component is a link follower guided on the guide link. It is preferably provided that the actuation generator is embodied as a guide link and the actuation acceptor as a link follower. However, it is also possible that the actuation generator is a link follower which is guided along the actuation acceptor designed as the guide link. The guide link is preferably arranged on the saw assembly. The link follower is preferably a component of the scoring assembly.

The link follower preferably comprises a roller or touch roller, which rolls along the guide link. However, it is also possible that the link follower is a sliding body or comprises a sliding body.

It is preferred if the link follower is spring-loaded by a spring or spring arrangement in a contact position with the guide link.

The link follower is preferably arranged on an arm.

The guide link preferably has two or more actuation sections arranged in succession, which effectuate an actuation of the scorer toolholder or the scoring assembly as a whole between the in active position and the at least one active position in different ways.

It is advantageously provided that the guide link has a scorer activation section and a scorer holding section. The scorer activation section effectuates, for example, upon the adjustment of the saw toolholder between depth setting positions, an adjustment of the scorer toolholder between the inactive position and the at least one active position and the scorer holding section effectuates holding or ensures holding of the scorer toolholder in a predetermined active position independently of an adjustment of the saw toolholder between depth setting positions. The scorer holding section has, for example, a circular profile having a constant radius around a pivot axis, for example a depth setting axis, around which the saw toolholder, in particular the saw assembly as a whole, pivots between depth setting positions. It is possible that the scorer activation section, upon the adjustment of the saw toolholder from the upper depth setting position into a first lower depth setting position, effectuates an adjustment of the scorer toolholder from the inactive position into the at least one active position and the scorer holding section effectuates holding of the scorer toolholder in the at least one active position upon a farther adjustment of the saw toolholder from the first lower depth setting position in the direction of a second lower depth position, in which the saw toolholder is adjusted closer toward the guide device or the guide surface than in the first lower depth setting position and/or in which the saw toolholder protrudes farther in front of the guide surface than in the first lower depth setting position. An arrangement of the saw toolholder on the saw assembly is preferably made so that the or a saw tool arranged on the saw toolholder does not (yet) protrude in front of the guide surface in the scorer activation section, in particular is adjusted behind the guide surface.

The above-mentioned actuation sections, thus the scorer holding section and the scoring actuation section, or these kinematic couplings between the saw toolholder and the scorer toolholder, may be implemented, for example, by the design of a coupling transmission or actuating transmission, for example, by corresponding free running sections, design of levers, articulated limbs, or the like.

The driving device advantageously has a deactivation device for deactivating the driving coupling between the saw toolholder and the scorer toolholder. It is advantageously provided that the scorer toolholder, upon a movement of the saw toolholder between depth setting positions, in particular between the upper and at least one of the lower depth setting positions, remains in a deactivation position of the deactivation device in the inactive position and is actuated in an activation position of the deactivation device for adjustment between the inactive position and the at least one active position. The driving device is therefore activatable or deactivatable by the deactivation device. For example, the scorer toolholder is mechanically carried along upon a movement of the saw toolholder between its depth setting positions.

It is advantageously provided that the deactivation device for deactivating the driving coupling, in the deactivation position, holds the actuation acceptor disengaged from the actuation generator and/or decouples it from the actuation acceptor and in the activation position releases the actuation acceptor to engage and/or to couple with the actuation generator. For example, it is provided that the link follower is held disengaged from the guide link in the deactivation position by the deactivation device or the guide link is held at a distance from the link follower. The deactivation device can also be designed, however, to engage gear wheels of a transmission gearing comprising the actuation acceptor and the actuation generator in the activation position and disengage them in the deactivation position or to activate free running of such a transmission gearing in the deactivation position and to deactivate it in the activation position.

The deactivation device can also comprise an electrical switching device, for example an electrical switch. The switching device of the deactivation device can, for example, in the deactivation position, actuate the scorer positioning drive to adjust the scorer toolholder into the inactive position and/or interrupt a power supply of the scorer positioning drive to prevent an adjustment of the scorer toolholder into the active position.

It is advantageously provided that the handheld machine saw has scorer depth setting means for setting a distance of the scorer toolholder to the guide device or the guide surface and/or the penetration depth of the scoring tool into the workpiece in the at least one active position. It is therefore possible to set different penetration depths of the scoring tool into the workpiece in the active position. Therefore, for example, a depth of the score to be introduced into the workpiece can be settable.

A width of the score introducible by the scoring tool into the workpiece can advantageously be settable by different penetration depths of the scoring tool into the workpiece. For example, a cutting region or engagement region of the scoring tool can taper toward its free end region provided for cutting into the workpiece, for example taper conically, so that the width of the score is settable by different penetration depths of the scoring tool into the workpiece.

The scorer depth setting means comprise, for example, a positioning screw, a positioning transmission, an inclined surface transmission, or the like. The scorer depth setting means enable, for example, a depth setting in such a way that the scoring tool protrudes in front of the guide surface between 0 and 10 mm in different active positions settable by the scorer depth setting means. A greater depth setting range of the scorer depth setting means is advantageous, for example, for operation of the handheld machine saw with a guide rail. The guide rail has, for example, a height of approximately 3-5 mm between its lower side provided for placement on the workpiece and its upper side provided for placement of the handheld machine saw, so that in the case of a greater positioning range of the scorer depth setting means, a sufficient positioning range for setting the depth of the score is available both during operation with guide rail and also operation without guide rail.

It is advantageously provided that an actuation distance is provided between the scorer toolholder and an actuating surface, with which the actuation acceptor of the driving device is engaged or in contact with the actuation generator of the driving device, and the scorer depth setting means are designed to set the actuation distance so that the distance of the scorer toolholder to the guide device or the guide surface and/or the penetration depth of the scoring tool into the workpiece is settable or is set in the at least one active position by the setting of the actuation distance.

It is advantageously provided that the scorer depth setting means have a positioning body, which is adjustable between at least two positioning positions to set different distances of the scorer toolholder to the guide device or the guide surface and/or the penetration depth of the scoring tool into the workpiece in the at least one active position, wherein the positioning body forms a positioning element for adjusting the deactivation device between the activation position and the deactivation position and/or is designed for adjusting the deactivation device between the activation position and the deactivation position. The respective penetration depth of the scoring tool into the active position is thus settable and moreover the driving device is also activatable and deactivatable using the positioning body.

The positioning body, for example a slide or a rotatable body, is advantageously movable with a first degree of movement freedom between the active position and the inactive position, for example, is displaceable and/or rotatable along a first axis.

The scorer depth setting means comprise, for example, a depth setting element, which is supported on a positioning contour of the positioning body. The depth setting element is adjustable between at least two depth setting positions to set a distance of the scorer toolholder to the guide device or the guide surface and/or the penetration depth of the scoring tool into the workpiece in the at least one active position.

The depth setting element comprises, for example, a screw, a positioning screw, or another positioning element, which is adjustable between at least two positions. The depth setting element can readily, for example, also comprise a positioning arm, however, which is pivotable between two or more positions. The depth setting element is advantageously locked or lockable in a respective depth setting position.

The depth setting element has, for example, an actuating surface, which supports itself on the positioning contour of the positioning body.

The depth setting element is, for example, arranged on the actuation acceptor or is movement coupled thereto.

The depth setting element can also be arranged, for example, on a carrier of the scoring assembly, however, on which the actuation acceptor and the positioning body are movably mounted.

The positioning contour advantageously has a positioning section assigned to the activation position and a positioning section assigned to the deactivation position, which actuate the depth setting element differently to set the penetration depth of the scoring tool into the workpiece by adjustment, in particular pivoting, of the positioning body. For example, the positioning sections deflect the depth setting element by different distances. The positioning sections are, for example, components of an eccentric contour or a surface eccentric to an axis of rotation. By pivoting the positioning element around the axis of rotation, the depth setting element is supported on the different positioning sections of the eccentric contour.

It is possible that an actuating surface of the actuation acceptor, which is arranged on the actuation acceptor or is operationally connected thereto, supports itself on a positioning surface of the positioning body. The actuating surface can be provided, for example, on the depth setting element, which is in turn arranged on the actuation acceptor or is operationally connected to the actuation acceptor. The actuating surface can also be fixed in place with respect to the actuation acceptor, however. It is advantageously provided that by way of an adjustment of the positioning body between positioning positions assigned to the activation position and the deactivation position, for example by a rotation and/or linear displacement, the positioning surface of the positioning body can be engaged with or disengaged from the actuating surface of the actuation acceptor or the actuating surface of the actuation acceptor is adjusted into a position assigned to the active position or the inactive position. For example, in the deactivation position, the actuation acceptor is no longer engaged with the positioning surface of the positioning body or is supported by a positioning section of the positioning contour in such a way that the actuation acceptor is adjusted or adjustable into the inactive position, for example, by a spring arrangement acting on the actuation acceptor.

The positioning surface of the positioning body, preferably the positioning body as a whole, is adjustable by means of the depth setting element between at least two depth setting positions. For example, the depth setting element comprises a guide or receptacle, into which the positioning body is adjustable with the first degree of movement freedom. The depth setting element is preferably designed to adjust the positioning body with a second degree of movement freedom, which is different from the first degree of movement freedom.

One advantageous concept provides that the positioning body is adjustable between at least two positioning positions to set different penetration depths of the scoring tool into the workpiece and is adjustable, in particular displaceable and/or pivotable, while remaining in the respective positioning position, between an inactive position assigned to the deactivation position, in which the actuation acceptor is disengaged or not in contact with the actuation generator, and an active position assigned to the activation position, in which the actuation acceptor is in contact or engaged with the actuation generator.

The positioning body, in particular a positioning surface of the positioning body, to set the distance of the scorer toolholder to the guide device or the guide surface and/or the penetration depth of the scoring tool into the workpiece in the at least one active position, for example, the actuation distance between the scorer toolholder and the actuating surface of the actuation acceptor, is advantageously adjustable with a second degree of movement freedom, for example, displaceable transversely to the first axis, eccentrically pivotable, or the like, wherein the positioning surface maintains its position when the positioning body is adjusted with respect to the first degree of movement freedom between the activation position and the deactivation position. The depth setting position of the scorer toolholder or the scoring tool is thus maintained by the positioning body, i.e., the distance of the scorer toolholder to the guide device or the guide surface, when the driving coupling between actuation generator and actuation acceptor is canceled or established, thus deactivated or activated.

The scorer depth setting means can also be referred to as a scorer depth setting device. The scorer depth setting means or also the scorer depth setting device advantageously comprises a scorer depth stop for setting an in particular minimum distance of the scorer toolholder to the guide device or the guide surface and/or the in particular maximum penetration depth of the scoring tool into the workpiece in the at least one active position. The scorer depth stop can be a fixed depth stop which is arranged, for example, fixed in place on the guide device. However, it is preferred if the scorer depth stop is adjustable between at least two stop positions, in which the scorer toolholder has different distances to the guide device or the guide surface and/or the scoring tool protrudes different distances in front of the guide surface. The scorer depth stop can have, for example, a stop element adjustable, for example pivotable or displaceable, between two positions. It is preferred if the scorer depth stop is continuously adjustable. For example, a positioning screw can be provided, using which the depth stop is adjustable. The head of the positioning screw can form or provide the depth stop.

It is preferred if the handheld machine saw has a saw depth setting device for setting at least one of the lower depth setting positions of the saw toolholder. The saw depth setting device preferably has a depth stop holder, for example a depth stop guide, on which a depth setting stop, on which the saw assembly stops during the adjustment by means of the saw depth setting bearing, is fixable in at least two depth stop positions.

The depth stop holder or depth stop guide extends, for example, in an arc shape. The depth stop guide comprises, for example, a guide link, guide receptacle, guide groove, or the like, on which the depth stop is adjustably mounted, in particular adjustable and/or displaceable continuously and/or in multiple locking positions. The depth stop holder can have multiple holding receptacles, on which the depth stop is fixable to set different depth setting positions. The depth stop holder can also, however, comprise a receptacle groove, which moreover represents a depth stop guide, or can be formed thereby.

The depth setting stop comprises, for example, a clamping screw, which can be clamped in the respective depth stop settings to be set, in particular to be set or settable continuously, with the depth stop holder or depth stop guide. A detent of the depth stop with the depth stop holder or depth stop guide is readily possible.

One preferred exemplary embodiment provides that the guide link and the depth stop holder, for example the depth stop guide, have sections extending in arcs arranged adjacent to one another. Thus, for example, the above-mentioned scorer holding section and the depth stop guide, on which the depth stop is guided, can have sections extending in arcs which are arranged adjacent to one another. For example, the two sections extend in arcs, in particular in circular arcs, around a pivot axis of the saw depth setting bearing. A particularly space-saving arrangement is thus possible.

It is advantageous if the saw depth setting bearing is a pivot bearing, which pivotably mounts the saw toolholder around a depth setting axis. It is also advantageous in the case of the scorer depth setting bearing if it is a pivot bearing which pivotably mounts the scorer toolholder around a depth setting axis. Of course, it is possible that instead of pivot bearings, for example, slide bearings or pivot-slide bearings are provided as the saw depth setting bearing and/or scorer depth setting bearing for setting different depth setting positions of the saw toolholder or the scorer toolholder, respectively. At least one of the pivot axes, preferably both pivot axes preferably extend in parallel to axes of rotation, around which the scorer toolholder and/or saw toolholder are rotatably mounted.

It is advantageous if the depth setting axis of the scorer depth setting bearing designed as a pivot axis is arranged between the scorer toolholder and the saw toolholder with respect to the working direction. A particularly space-saving arrangement may thus be provided. It is particularly preferred if the pivot axis of the scorer depth setting bearing penetrates the saw tool when it is installed on the saw toolholder, for example penetrates its flat side. With respect to a longitudinal axis of the guide device, which extends parallel to the working direction, the pivot axis of the scorer depth setting bearing is arranged between the toolholders, preferably in a longitudinal position in which the saw tool is also located.

It is preferably provided that the saw depth setting bearing is arranged behind the saw toolholder on the guide device in the working direction. For example, the handheld machine saw is designed as a plunge saw. However, in the case of a design as a portable circular saw, it would also be possible that the saw depth setting bearing is arranged in front of the saw toolholder on the guide device in the working direction.

It is also advantageous if the scorer depth setting bearing is arranged behind the scorer toolholder on the guide device in the working direction. However, it would also be readily possible to arrange the scorer depth setting bearing, for example a pivot bearing, in front of the scoring tool or the scorer toolholder in the working direction.

The following measure represents a particularly compact and ergonomic embodiment, which is also shown in the drawings. It is preferred if the scorer depth setting bearing is arranged in the working direction between the scorer toolholder and the saw toolholder on the guide device. In particular, it is thus possible that the scoring tool so to speak forms the frontmost component of the handheld machine saw in the working direction, so that the operator can see the cutting or penetration of the scoring tool into the workpiece, for example, for an exact guide of the handheld machine saw along the workpiece.

It is preferred if the saw toolholder, preferably the saw assembly as a whole, and/or the scorer toolholder, advantageously the scoring assembly as a whole, is pivotably mounted on the guide device by means of a miter bearing arrangement around a miter axis, which is parallel to the working direction and/or extends in parallel to a longitudinal axis of the guide device, which extends in parallel to the working direction. It is possible that the saw toolholder and the scoring tool older are pivotable relative to one another around the miter axis. However, it is also possible that the two toolholders are connected or coupled to one another in a non-pivotable or rotationally-fixed manner with respect to the miter axis and are jointly pivotable around the miter axis. For example, both depth setting bearings are arranged on the same carrier.

A further embodiment can provide that the saw toolholder, preferably the saw assembly as a whole, is pivotably mounted on the guide device around the miter axis or a miter axis, but the scorer toolholder, advantageously the scoring assembly as a whole, is arranged fixed in place with respect to the miter axis on the guide device. Miter cuts can thus nonetheless be produced using the saw tool or saw assembly.

It is advantageous if the saw depth setting bearing and/or the scorer depth setting bearing are arranged on a carrier designed in particular as a cover hood and/or protective housing, which is arranged between a front miter bearing of the motor mount arrangement in the working direction and a rear miter bearing in the working direction. The carrier or the cover hood forms, for example, a bearing base for the scorer depth setting bearing and/or the saw depth setting bearing. It is preferred if both depth setting bearings are arranged on the carrier, so that their pivot location or angle location with respect to the miter axis is settable simultaneously by pivoting the carrier with respect to the guide device. A high precision in the workpiece processing and/or a robust system thus advantageously results, for example.

The actuation acceptor is advantageously pivotably mounted around the depth setting axis of the scorer depth setting bearing to set a distance of the scorer toolholder to the guide device or the guide surface and/or the penetration depth of the scoring tool into the workpiece in the at least one active position and/or to activate and deactivate the driving coupling between the saw toolholder and the scorer toolholder. The actuation acceptor, for example, the above-mentioned link follower, is, for example, arranged on an actuation acceptor arm which protrudes from the depth setting axis and is pivotably mounted around the depth setting axis.

The actuation acceptor is advantageously arranged on an actuation acceptor arm which protrudes in front of the depth setting axis of the scorer depth setting bearing and is movable by a positioning body, for example the positioning body of the scorer depth setting means, into at least two pivot positions different from one another with respect to the depth setting axis, in which the actuation acceptor assumes different angle positions with respect to the depth setting axis. The distance of the scorer toolholder to the guide device or guide surface and/or a distance with which the scoring tool protrudes in front the guide surface is settable by means of the different angle positions of the actuation acceptor in relation to the depth setting axis. In the different angle positions of the actuation acceptor in relation to the depth setting axis, the actuation acceptor has, for example, different distances to the scorer toolholder.

The actuation acceptor arm is preferably spring-loaded by a spring arrangement in a position remote from the actuation generator. It is also possible that the actuation acceptor arm is spring-loaded by a spring arrangement in the direction toward the actuation generator, for example, to establish and/or maintain a contact between actuation generator and actuation acceptor.

An actuating surface, with which a positioning body interacts, using which different angle positions of the actuation acceptor with respect to the depth setting axis are settable and/or using which a driving coupling between the saw toolholder and the scorer toolholder can be established and/or canceled, is advantageously arranged on the actuation acceptor arm, in particular on an actuating arm or positioning lever protruding at an angle from the actuation acceptor arm. The positioning body is, for example, the above-mentioned positioning body, which can be engaged with the actuating surface or the actuating arm to establish the driving coupling and can be disengaged to cancel the driving coupling, for example, by an axial displacement along a displacement axis. Furthermore, the positioning body or a positioning contour arranged thereon can be adjustable transversely to the displacement axis, for example, eccentrically pivotable, displaceable, or the like to adjust the angle positions of the actuation acceptor with respect to the depth setting axis.

The handheld machine saw advantageously has a transverse adjustment device for setting a transverse distance of the saw toolholder and/or the scorer toolholder transverse to a longitudinal axis parallel to the working direction, so that by setting the transverse distance of the saw toolholder and/or by setting the transverse distance of the scorer toolholder in relation to the longitudinal axis, the scoring tool and the saw tool can be brought into a position aligned with one another with respect to the longitudinal axis. The score introduced by the scoring tool into the workpiece thus aligns with the saw cut, which so to speak follows in the working direction.

It is preferred if the transverse distance of the saw toolholder with respect to the longitudinal axis is fixed, but the transverse distance of the scorer toolholder is settable.

The transverse adjustment device enables, for example, a transverse adjustment in a range of at least 2 mm, preferably at least 3 mm. The range of the transverse adjustment can be limited, for example, to at most 8 mm, preferably at most 4 mm.

Preferably, a transverse adjustment range of the transverse adjustment device is bidirectional with respect to a normal distance, which the saw toolholder has in relation to the longitudinal axis, wherein the normal distance represents a starting location, in particular a center location, of the transverse adjustment range, so that the scorer toolholder is adjustable away from the starting location in directions opposite to one another. For example, the transverse adjustment range can enable, starting from the starting location or middle location, a transverse adjustment of the scorer toolholder and thus a scoring tool arranged thereon by 2-4 mm in each direction.

The transverse adjustment device and/or a manually actuatable, in particular rotatable actuating element of the transverse adjustment device is advantageously arranged on the scorer depth setting bearing and/or is penetrated by the depth setting axis of the scorer depth setting bearing. Particularly intuitive operation of the transverse adjustment device thus results.

The transverse adjustment device preferably has a screw element, which extends along the depth setting axis of the scorer depth setting bearing and/or the respective rotational position of which is fixed by a detent arrangement.

The transverse adjustment device preferably comprises a bearing body, in particular a bearing sleeve, the longitudinal position of which with respect to the depth setting axis of the scorer depth setting bearing is settable, for example, by the above-mentioned screw element. The scoring assembly is pivotably mounted around the depth setting axis on the bearing body.

It is fundamentally possible that the saw assembly or at least the saw toolholder is actuated manually by the operator both in the direction of the lower depth setting positions and also in the opposite direction toward the upper depth setting position, for example, in an embodiment of the handheld machine saw as a portable circular saw. However, spring loading is preferred. It is thus advantageously provided that the saw toolholder, in particular the saw assembly, is loaded by a saw assembly spring arrangement in the upper depth setting position, so that to introduce a saw cut into the workpiece, the operator actuates the saw toolholder, in particular the saw assembly, against the force of the saw assembly spring arrangement in the direction of the lower depth setting position.

In particular when a movement coupling or positive coupling is present between the saw assembly and the scoring assembly, for example, spring mounting of the scoring assembly can be omitted. Thus, for example, the above-mentioned saw assembly spring arrangement can impinge both the saw assembly directly and also the scoring assembly coupled to the saw assembly indirectly in the direction of the inactive position.

However, it is preferably provided that the scorer toolholder, in particular the scoring assembly, is impinged by the scoring assembly spring arrangement in the inactive position and/or the at least one active position, wherein the scoring assembly spring arrangement is separate from the saw assembly spring arrangement or a spring arrangement loading the saw assembly or the saw toolholder in the upper depth setting position. A spring which impinges in the direction of the inactive position can have, for example, a greater spring force than a spring which impinges in the active position. An impingement only in the inactive position, but not in the active position, is preferred in particular. The scoring assembly spring arrangement and the saw assembly spring arrangement thus preferably act in the same direction in such a way that the saw tool and the scoring tool are loaded into a position adjusted behind the guide surface. The operator thus acts actively in the direction of the at least one lower depth setting position on the saw assembly or in the direction of the at least one active position on the scoring assembly when he wishes to introduce a saw cut into the workpiece having score leading in the working direction.

The impingement of the scoring assembly spring arrangement in the direction of the active position can be advantageous, for example, in conjunction with a driving device, which, during an emerging movement of the scoring tool out of the workpiece, carries along the scoring assembly in the sense of emergence of the scoring tool from the workpiece.

It is advantageous if the handheld machine saw has a scorer positioning drive for adjusting the scorer toolholder between the active position and the inactive position. The scorer positioning drive can be formed, for example, by the driving device or it is possible that the driving device forms a part of the scorer positioning drive. However, it is also possible that the scorer positioning drive comprises a positioning motor, for example, an electrical, pneumatic, or hydraulic positioning motor.

It is preferably provided that the handheld machine saw has an actuating element, which is arranged on the saw assembly and actuatable by an operator, in particular an actuating handle which can be grasped by the operator, for adjusting the scorer toolholder between the active position and the inactive position. It is advantageously provided that the actuating element, in particular the actuating handle, is designed and provided to actuate the saw toolholder between the upper depth setting position and the at least one lower depth setting position. For example, the driving device can transmit the force exerted on the actuating element or the actuating handle to the scorer toolholder, in particular to the scoring assembly as a whole. It is advantageous if a depth stop for the scorer toolholder in the active position is provided on the guide device.

It is also possible that the actuating element has an electrical sensor or switch arranged on the saw assembly for the scorer positioning drive. The sensor can detect, for example, a respective depth setting position of the saw toolholder to activate a positioning motor of the scorer positioning drive, so that the positioning motor is activated simultaneously with the respective height adjustment of the saw toolholder.

The actuating element can also comprise an actuating body, which is movably mounted on the saw assembly and is manually actuatable by an operator, and which is movement coupled with a force transmission element, in particular a Bowden cable, for force transmission to the scorer toolholder force adjustment between the inactive position and the at least one active position. The actuating body, e.g., a handle, lever, or the like, is arranged, for example, on a saw assembly housing of the saw assembly, a handle of the saw assembly, or the like and can be actuated by the operator in particular upon grasping or gripping the handle. The force transmission element acts, for example, on a pneumatic drive or the like. The force transmission element can also be, for example, an air hose.

One embodiment of the invention can provide that the saw drive motor drives the scorer toolholder by means of a transmission, for example a belt transmission, gearwheel transmission, or the like. The transmission can be or comprise, for example, a reduction gear. However, it is advantageous if the scoring assembly has a scorer drive motor separate from the saw drive motor.

The scorer drive motor is expediently switchable by an electrical switch.

The actuating element arranged on the saw assembly can comprise, for example, an electrical switch for switching on and switching off the scorer drive motor. This switch can only be provided for switching on and switching off the scorer drive motor. However, it is advantageously provided that a switch for switching on and switching off the saw drive motor is arranged on the saw assembly, using which the scorer drive motor can be switched on and switched off.

It is possible that the switch for the scorer drive motor is a switch that is separately and independently actuatable from the switch of the saw drive motor. For example, it is possible that only the scorer drive motor can be switched on and switched off using such a switch, without the saw drive motor being switched on or switched off at the same time. It is also possible that a switch for the saw drive motor and the switch for the scorer drive motor are functionally connected in series, so that the scorer drive motor is only energized when both switches assume their switching-on position.

The handheld machine saw advantageously has a switch for switching on and switching off the scorer drive motor, which is actuatable by the deactivation device, in particular the above-described positioning body of the deactivation device, in such a way that the deactivation device or the positioning body switches off the scorer drive motor in the deactivation position and switches it on in the activation position or releases it for switching on by a farther switch, for example, the switch for switching the saw drive motor. When the deactivation device assumes the deactivation position, the scorer drive motor is switched off and/or cannot be switched on.

The following measure represents an invention which is independent as such but can also be an advantageous embodiment of the invention. It is provided here that the handheld machine saw has a flexible electrical connecting line between the saw assembly and the scoring assembly for the electrical power supply of the scoring assembly. The flexible connecting line can extend in the open between the scoring assembly and the saw assembly.

One preferred measure provides that the connecting line has an attachment section connected to the saw assembly and an attachment section connected to the scoring assembly, wherein the attachment sections are connected to one another by a connecting section and have a greater distance to the saw toolholder and the scorer toolholder than the connecting section, so that the connecting line extends around a space open toward the side of the handheld machine saw facing away from the toolholders. For example, actuating elements of the handheld machine-tool, in particular the actuating element of the scoring assembly, can be accessible to the operator through the open space. The connecting line can be designed as a flexible loop. The connecting section preferably extends in an arc or loop. The attachment sections preferably extend transversely to a longitudinal axis of the guide device, which extends in the working direction. At least one attachment section, but preferably both attachment sections preferably have a linear profile in the transition to the saw assembly or scoring assembly.

The scoring tool and/or the saw tool are preferably designed as a saw blade, in particular a circular saw blade. However, it would also be possible in principle that the saw tool is, for example, a jigsaw blade or similar other saw blade of a noncircular type. Furthermore, the scoring tool can also, for example, comprise a milling head or a milling tool or can be formed thereby.

An embodiment of saw tool and scoring tool as a saw blade is preferred. One advantageous embodiment provides that the ratio of an external diameter of the saw tool to an external diameter of the saw drive motor is greater, in particular at least 1.5 times greater, preferably two times greater, more preferably at least 2.5 times greater than a ratio of the external diameter of the scoring tool to an external diameter of the scorer drive motor.

The handheld machine saw is a machine saw to be guided manually along the workpiece. The machine can be guided freely over the workpiece, i.e., operated without a guide rail. However, operation with a guide rail is preferred. The handheld machine saw is preferably a plunge saw and/or does not have a protective cover for a section of the saw tool and/or the scoring tool protruding freely in front of the guide surface.

The saw assembly and the scoring assembly are arranged on an upper side of the guide device opposite to the guide surface. The guide device comprises, for example, a so-called saw table. The guy device or the guide body preferably comprises a plate body, on one side of which the guide surface is arranged and on the side of which opposite to the guide surface or the upper side of which the saw assembly and the scoring assembly are arranged. Guide receptacles, for example longitudinal grooves or the like, for guide ribs or guide projections of a guide rail are preferably arranged on the guide surface.

The saw drive motor and/or the scorer drive motor are preferably electrical motors, in particular universal motors or brushless, electronically commutated motors or DC motors. Different motor types can be used as the saw drive motor and scorer drive motor, for example, an electronically commutated motor as the saw drive motor and a DC motor as the scorer drive motor.

BRIEF DESCRIPTION OF THE DRAWINGS

An exemplary embodiment of the invention is explained hereinafter on the basis of the drawings. In the figures.

DETAILED DESCRIPTION

Figure 1:
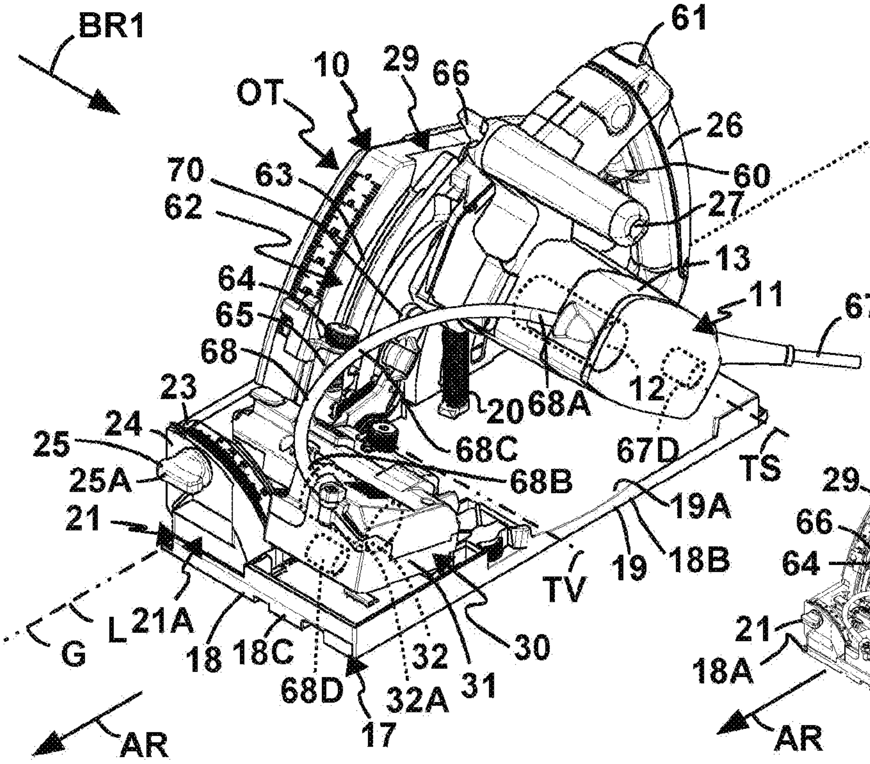
FIG. 1 shows a perspective diagonal view diagonally from the front of a handheld machine saw having a saw assembly and a scoring assembly in an upper depth setting position.

A handheld machine saw 10 is designed, for example, like a plunge saw, but could also have, for example, a retractable hood or similar other protective cover and can thus be a portable circular saw.

The handheld machine saw 10 has a saw assembly 11 having a saw drive motor 12, which is accommodated in a motor housing part 28 of a saw assembly housing 13. The saw drive motor 12 drives, directly or via a gearing not visible in the drawing, a saw toolholder 14, on which a saw tool 15 is arrangeable or arranged. For example, a holding screw or a holding element 14A is used to hold the saw tool 15 on the saw toolholder 14.

Figure 2:
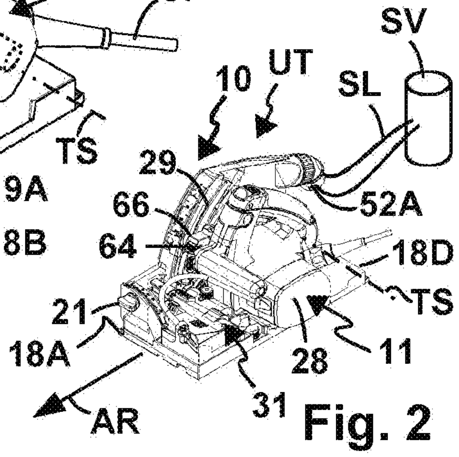
FIG. 2 shows the handheld machine saw according to FIG. 1, but in a lower depth setting position.
Figure 8:
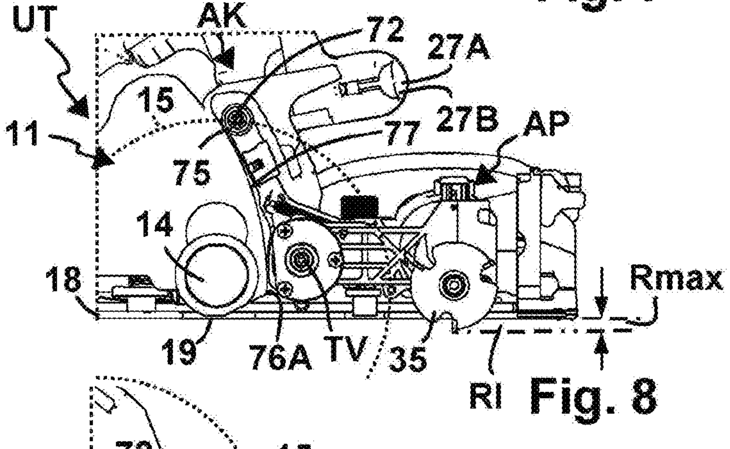
FIG. 8 shows the view according to FIGS. 6 and 7, but having saw assembly adjusted into a lowermost depth setting position and scoring assembly adjusted into an active position.
Figure 9:
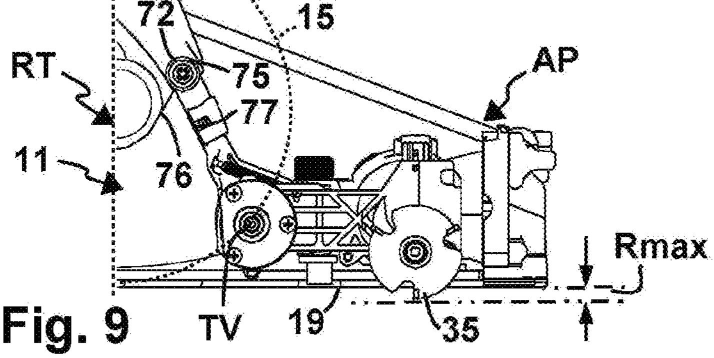
FIG. 9 shows the view according to FIG. 8, but having saw assembly adjusted into an only-scoring depth setting position and scoring assembly adjusted into the active position.
Figure 11:
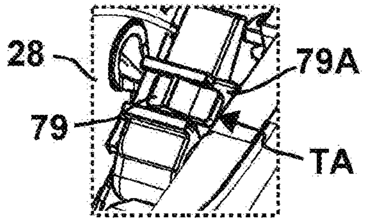
FIG. 11 shows the only-scoring depth stop device according to FIG. 10, but in its stop position, which corresponds to an only-scoring depth setting position of the saw assembly.
Figure 12:
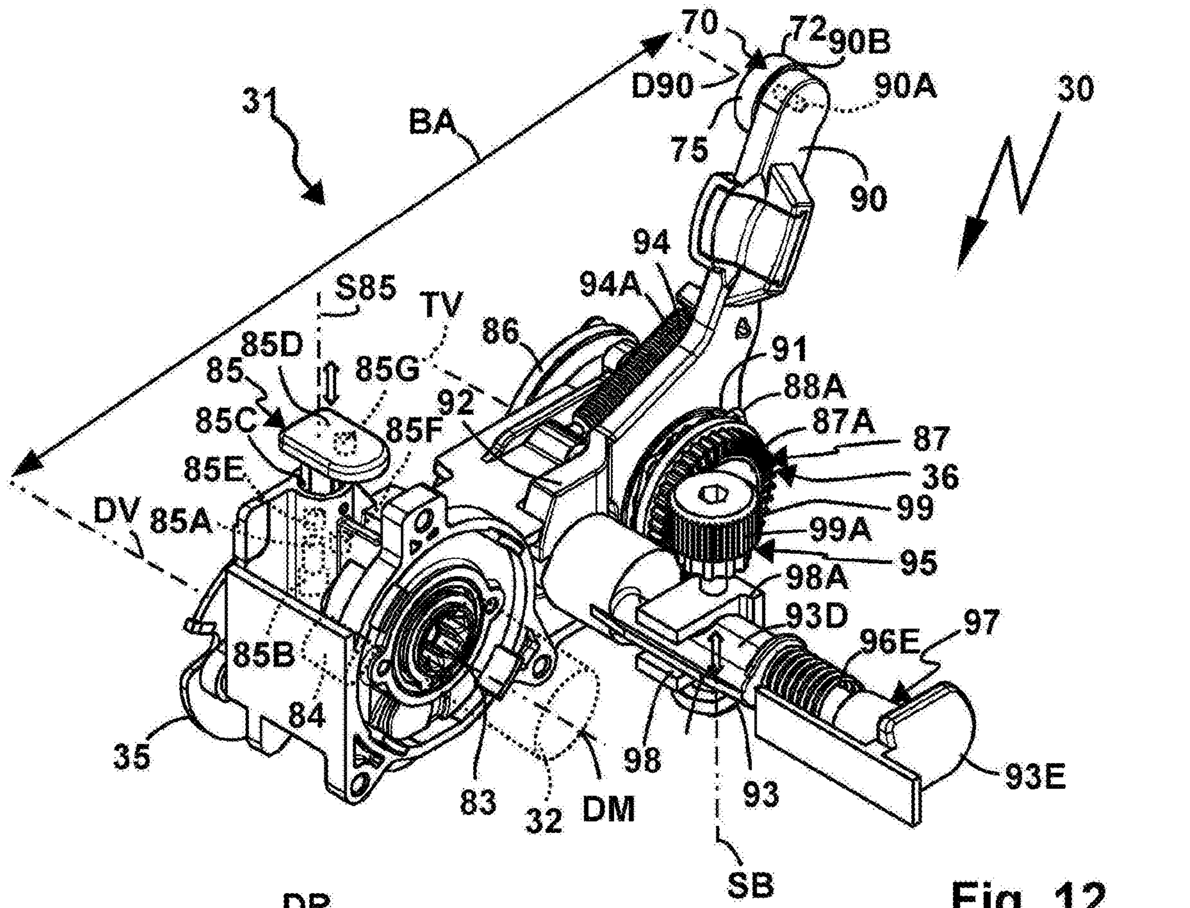
FIG. 12 shows a detail view of the scoring assembly diagonally from the front, approximately from the viewing direction of FIG. 1.
Figure 13:
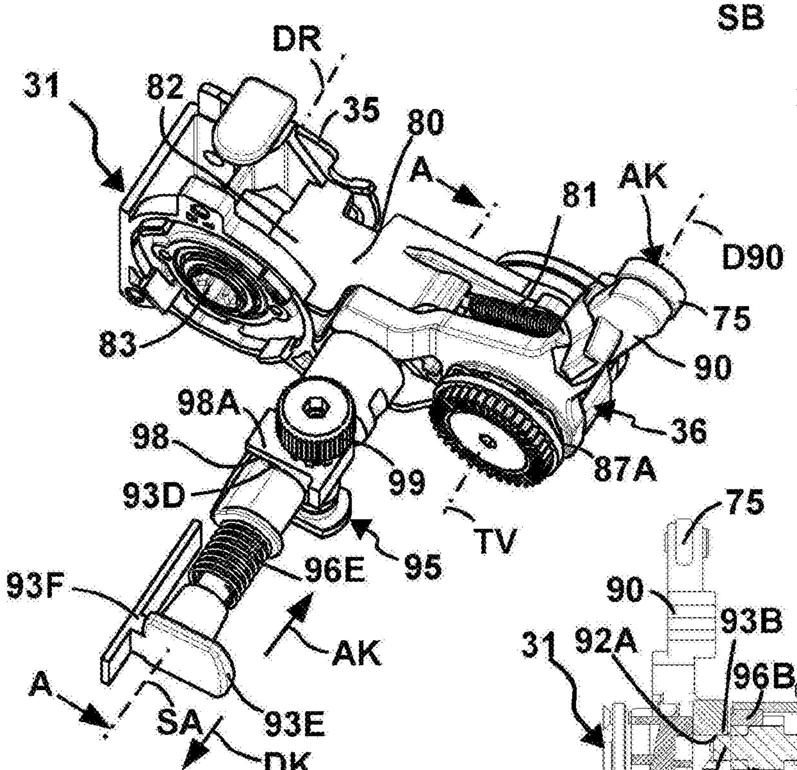
FIG. 13 shows the scoring assembly according to FIG. 12, but diagonally from the rear, approximately corresponding to the viewing direction in FIG. 3, in an activation position.
Figure 14:
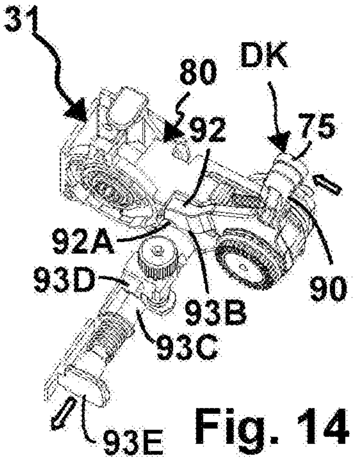
FIG. 14 shows the view of the scoring assembly according to FIG. 13, wherein the scoring assembly is adjusted into a deactivation position.
Figure 15:
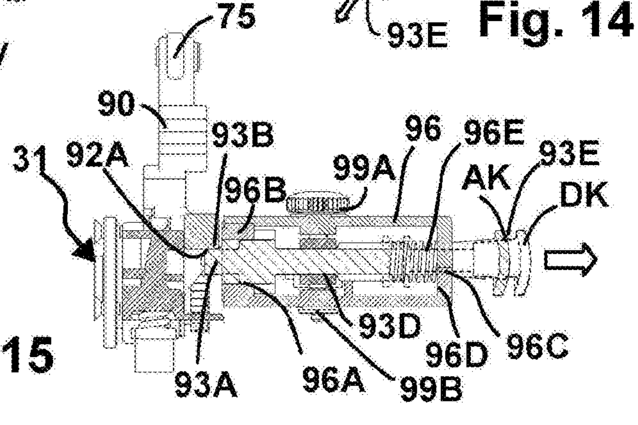
FIG. 15 shows a section through the scoring assembly according to FIG. 13, approximately along a line of section A-A through its deactivation device.
Figure 16:
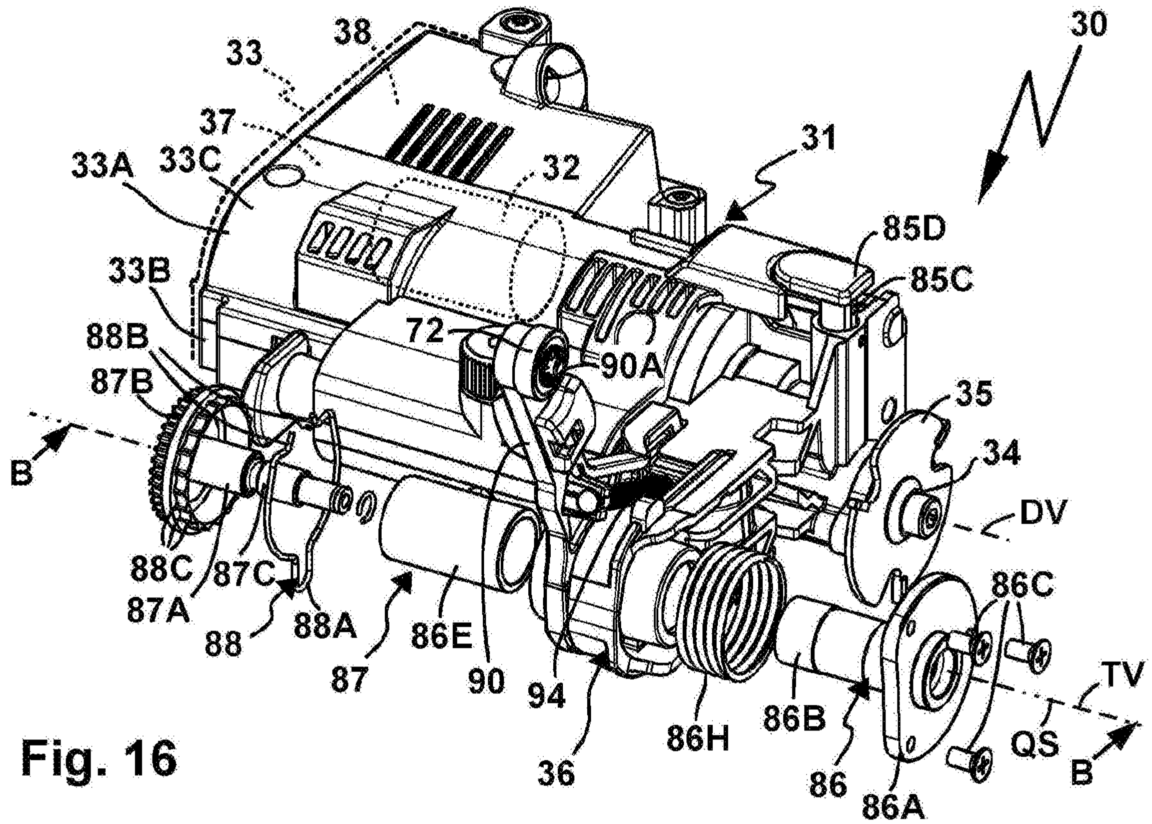
FIG. 16 shows a view diagonally from the front of the scoring assembly of the handheld machine saw according to FIG. 1.
Figure 17:
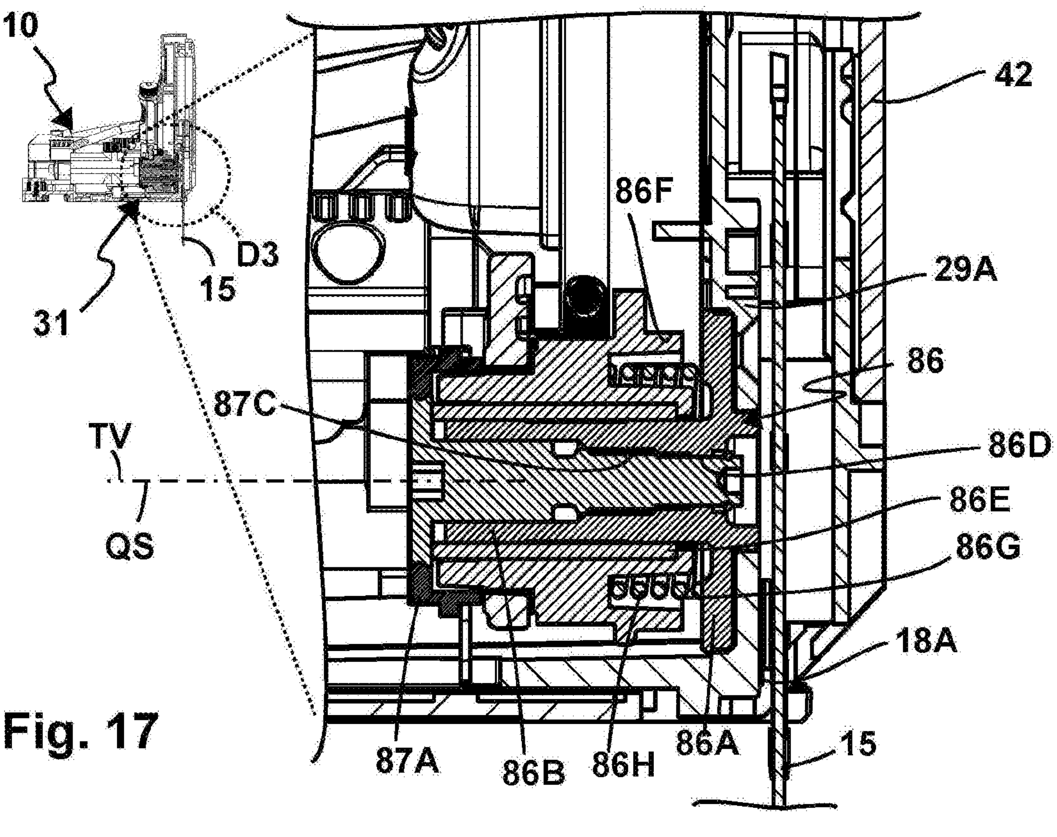
FIG. 17 shows a partial section through the scoring assembly according to FIG. 16, approximately along a line of section B-B, wherein in addition a section through the handheld machine saw as a whole is shown in a smaller illustration to visualize the detail D3 shown in FIG. 17.

The saw assembly 11 is pivotable as a whole around a depth setting axis TS with respect to a guide device 17, on which the saw assembly 11 is arranged, by means of a saw depth setting bearing 16. By way of such a pivot movement, the saw tool 15 is settable between an upper depth setting position OT and multiple lower depth setting positions, for example, a lowermost depth setting position UT according to FIG. 2 or 8. In the lower depth setting positions UT, the saw tool 15 protrudes in front of a guide surface 19 of a guide body 18 of the guide device 17, for example, to introduce a saw cut into a workpiece W.

The guide body 18, and therefore the handheld machine saw 10 as a whole, can be guided with the guide surface 19, for example, directly along a workpiece upper side WO of the workpiece W in a working direction AR. The guide surface 19 extends with a longitudinal axis L parallel to the working direction AR.

The guide body 18 can also, for example, be guided along an upper side or guide surface 202 of a guide rail 200, however, which can be laid with its lower side 201 on the workpiece W. Particularly exact and straight saw cuts can thus be introduced into the workpiece W.

The guide rail 200 has a long design having long narrow sides 203, 204 extending along a longitudinal axis LS of the guide rail 200, along which the working direction AR is oriented, between rear end face 207 in the working direction AR and a front end face 208 in the working direction AR. The saw tool 15 can plunge into the workpiece W past the long narrow side 204.

Furthermore, a counter guide contour 206 in the form of a longitudinal rib and optionally a receptacle groove 205 extend in parallel to the longitudinal axis LS. The receptacle groove 205 is used, for example, to accommodate aids, clamping devices for clamping the guide rail 200, or the like. The longitudinal rib or guide contour 206 protrudes upward from the guide surface 202 and is used to engage in a guide contour 216 on the guide surface 19 of the guide body 18. The guide contour 216 is designed, for example, as an elongated receptacle groove 217 extending along the longitudinal axis L of the guide body 18.

An alternative embodiment of the guide rail 200 is schematically shown, for example, in the form of the guide rail 200A. The guide rail 200A has an engaging-behind projection 210, which protrudes from the guide surface 202 and from which at least one engaging-behind leg 211, preferably two engaging-behind legs 211 opposite to one another, laterally protrude transversely, and form a T-shaped structure, for example. The engaging-behind legs 211 engage in a receptacle 220 optionally provided on the guide surface 19, which has engaging-behind receptacles 221. For example, in the plane of the guide surface 19, support legs 222 protrude in the direction of the receptacle 220, behind which the engaging-behind legs 211 can engage, which engage in the engaging-behind receptacles 221. The guide device 17 is thus held in a force direction perpendicular to the guide surface 18 on the guide rail 200A, but at the same time is displaceable along the working direction AR on the guide rail 200A, however. The receptacle 220 and the engaging-behind projection 210 have an elongated form and extend in the direction of the longitudinal axes L or LS.

The guide body has a long side referred to hereinafter as the tool long side 18A, on which the saw tool 15 is arranged, and a so to speak tool-free long side 18B, which extends in parallel to the long side 18A and, like this, extends between a front and a rear end face 18C, 18D of the guide body 18.

The saw assembly 11 is arranged on an upper side 19A of the guide device 17 or the guide body 18 opposite to the guide surface 19. The guide body 18 is formed, for example, by a guide plate or is plate like. While the guide surface 19 is essentially a planar surface, except for receptacle contours arranged thereon, in particular, for example, the receptacle 220 and/or guide contour 216, the upper side 19A can bear functional components and/or can be reinforced by a rib structure. Inter alia, it is possible that an operator grasps and/or actuates the upper side 19A to guide the handheld machine saw 10, in particular in the region of a handle part 18F to the front end face 18C, for example, to apply a force direction perpendicular to the guide surface 19 in the direction of the workpiece W or the guide rail 200 to the front section of the guide body 18. The handle part 18F can be or comprise, for example, a planar surface. The handle part 18F advantageously has a recessed grip. However, the handle part 18F can also comprise a grip element 218, for example, a rod-shaped or toggle-shaped handle.

The saw assembly 11 as a whole is applied in the direction of the upper depth setting position OT by means of a saw assembly spring arrangement 20. The saw assembly spring arrangement 20 comprises, for example, a coiled spring 20A. The coiled spring 20A or spring assembly 20 supports itself, on the one hand, on the upper side 19A of the guide device 17, on the other hand, on the lower side of the saw assembly housing 13.

In addition to the depth adjustability around the depth setting axis TS, the saw assembly 11 can also be pivoted around a miter axis G.

The handheld machine saw 10 has a carrier 40. The carrier 40 comprises a protective housing 29. The saw assembly 11 is held on the carrier 40.

The carrier 40 and/or the protective housing 29 is pivotably mounted on the guide device 17 around the miter axis G, which extends in parallel to the longitudinal axis L of the guide device 17, namely by means of a front miter bearing 21 in the working direction AR and a rear miter bearing 23 in the working direction AR of a miter bearing arrangement 21A. The miter bearings 21, 22 are arranged close to or immediately at the front and rear end faces 18C, 18D of the guide body 18, thus so to speak form the frontmost and rearmost component of the handheld machine saw 10 in the working direction AR.

The miter bearings 21, 22 each comprise a bearing base 23, in particular like a plate, which protrudes upward from the upper side 19A of the device 10, and on which a bearing body 24, preferably also designed as a plate, is pivotably mounted around the miter axis G.

The miter bearings 21, 22 are fixable in multiple pivot positions with respect to the miter axis G by means of fixing means 25. The fixing means 25 comprise, for example, a clamping screw 25A, which can be applied to the bearing base 23 and the bearing body 24 toward one another into a clamping position, so that they are held against one another in a friction-locked and/or frictional and/or formfitting manner, for example, by means of intermeshing teeth, and fix the carrier 40 in a set angle position with respect to the miter axis G on the guide device 17.

Alternatively to the concept of the carrier 40, on which the saw assembly 11 and the scoring assembly 31 are arranged, to be rotatable simultaneously around the miter axis G by means of the miter bearing arrangement 21A, a concept is also possible in which the scoring assembly 31 can pivot independently of the saw assembly 11 around the miter axis G. For this purpose, for example, a miter bearing 22A is provided between a scoring assembly 31A, corresponding to the scoring assembly 31, and the saw assembly 11, as in the exemplary embodiment of the handheld machine saw 10A according to FIG. 5. Of course, it is advantageous if this miter bearing 22A is also fixable by a fixing means 25 like the miter bearings 21, 22, for example by a clamping screw, so that the relative position of the saw assembly 11 and the scoring assembly 31 is fixable with respect to the miter axis G.

Figure 5:
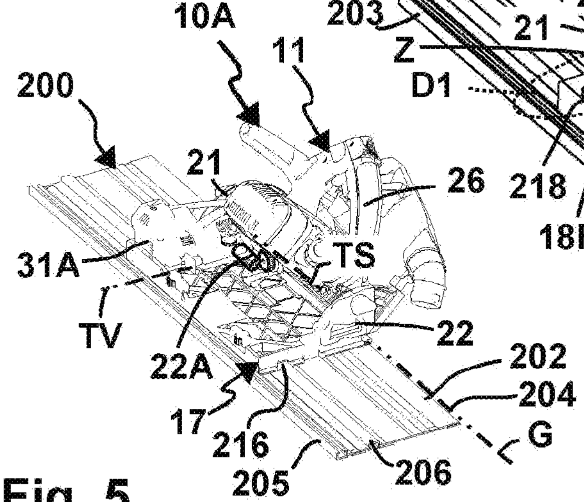
FIG. 5 shows a variant of the handheld machine saw according to the above figures having a scoring assembly pivotable separately from the saw assembly around a miter axis or a scoring assembly fixed in place with respect to the miter axis.
Figure 3:
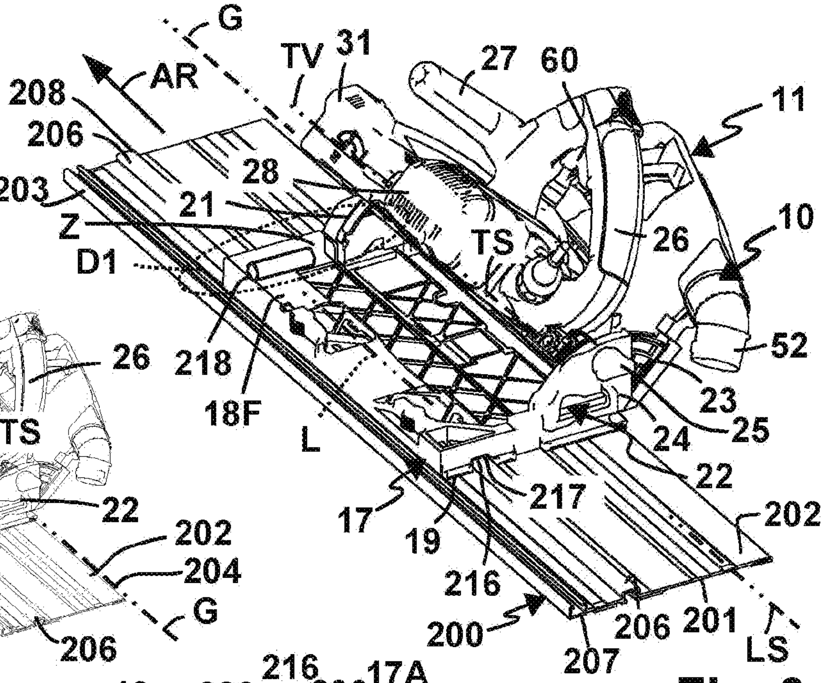
FIG. 3 shows the handheld machine saw according to FIGS. 1 and 2 on a guide rail in a miter location and viewed diagonally from the rear.
Figure 4:
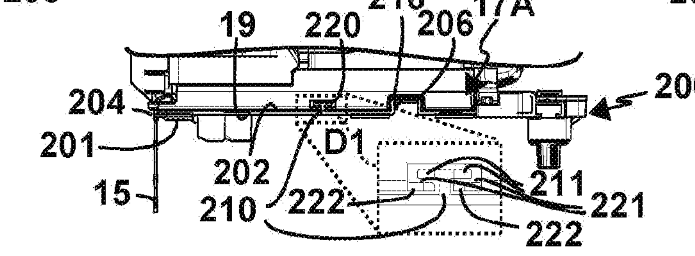
FIG. 4 shows a detail view from FIG. 3 from frontally forward of a lower part of the handheld machine saw and of the guide rail, wherein a guide body of the handheld machine saw and the guide rail engage in one another with additional engaging-behind contours.
Figure 6:
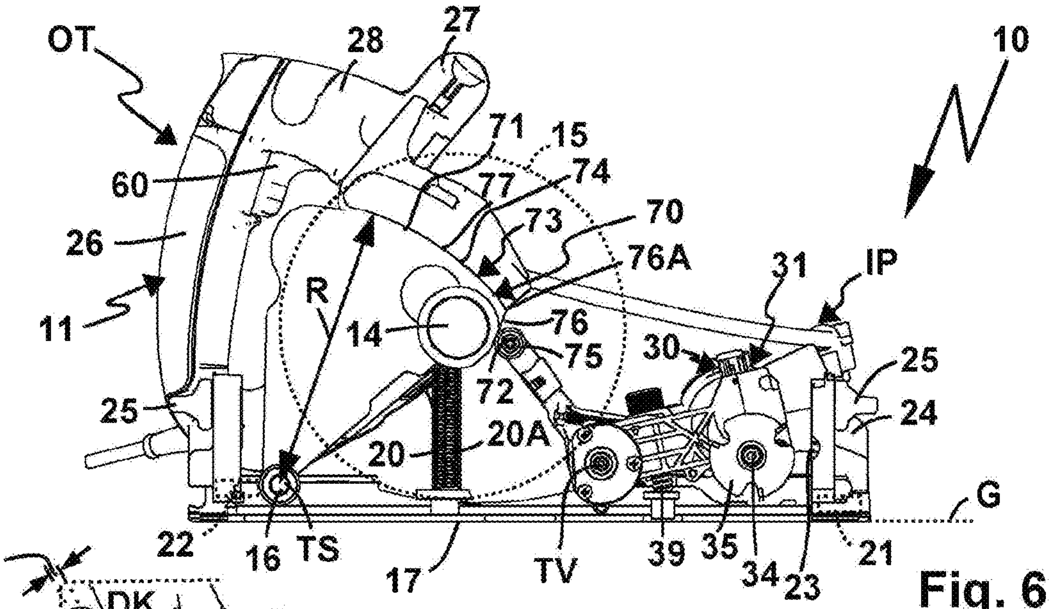
FIG. 6 shows a side view of the handheld machine saw according to FIG. 1, approximately in a viewing direction BR1 having open protective housing and its saw assembly in an upper depth setting position.

However, the embodiment according to FIG. 5 can also provide that the saw assembly 11 can pivot around the miter axis G, but the scoring assembly 31A is arranged fixed in place with respect to the guide device 17 with respect to the miter axis G. The miter bearing 22A is also advantageously provided between the scoring assembly 31 and the saw assembly 11 in this case.

The carrier 40 comprises the protective housing 29 having a saw tool receptacle space 48 for accommodating the saw tool 15. The saw tool 15 is accommodated in a pivotably movable manner in the saw tool receptacle space 48 so it is pivotable around the depth setting axis TS, wherein it does not protrude from the saw tool receptacle space 48 in the upper depth setting position OT, but protrudes a maximum distance in front of the protective housing 29 and the guide surface 19 in the lower depth setting positions, for example the lowermost depth setting position UT.

The saw toolholder 14 is rotationally driven by the saw drive motor 12 around a tool axis of rotation DS with a rotational direction such that the saw tool 15 cuts into the workpiece W from its lower side WU and creates a saw cut SAE. The saw tool 15 is a saw blade, the teeth of which are inclined and driven in a rotational direction toward the guide surface 19, so that the teeth can result in cracking upon exiting from the workpiece upper side WO. To prevent this problem, the handheld machine saw 10 has a scoring module 30.

The scoring module 30 comprises a scoring assembly 31, which is arranged in front of the saw assembly 11 in the working direction AR. The scoring assembly 31 is arranged, like the saw assembly 11, on the carrier 40. A scorer drive motor 32 drives a scorer toolholder 34 around a tool axis of rotation DV, but with an opposite rotational direction in comparison to the rotational direction of the tool axis of rotation DS. The scorer drive motor 32 forms a scorer drive 32A.

A scoring tool 35, for example, a scorer saw blade, is detachably fastenable on the scorer toolholder 34, in particular by means of a holding element 34A, in particular a holding screw. The scoring tool 35 is driven in a rotational direction such that its teeth cut into the workpiece W from its workpiece upper side WO and create a score RI, which is aligned with a saw cut subsequently produced by the saw tool 15 in the workpiece W. The score is somewhat wider than the later saw cut, so that the saw tool 15 is not tangent to the longitudinal edges of the score and thus no or less cracking, no or less tearing out of chips or the like occurs on the workpiece upper side WO.

A scoring assembly housing 33 is arranged on the carrier 40, in which essential components of the scoring assembly 31 are accommodated in a protected manner. The scoring assembly housing 33 is therefore fixed in place with respect to the carrier 40 and also with respect to the protective housing 29, while the movable components of the scoring assembly 31, inter alia, the scorer drive motor 32, a gearing between the scorer drive motor 32 and the scorer toolholder 34, etc., are movably accommodated in the interior of the scoring assembly housing 33. The scorer drive motor 32 is advantageously accommodated in a motor housing 33A separate from the scoring assembly housing 33. The motor housing 33A is movable relative to the scoring assembly housing 33.

The scoring assembly 31 comprises a scorer carrier 80, which is mounted by means of a scorer depth setting bearing 36 around a depth setting axis TV on the carrier 40. The scorer toolholder 34 is also accommodated in the interior of the protective housing 29, namely in a scoring tool receptacle space 49 thereof.

The scorer carrier 80 has, for example, a block-like or cuboid design. The scorer carrier 80 has, for example, an elongated form. A longitudinal axis of the scorer carrier 80 or the scorer carrier 80 as a whole is inclined obliquely at a flat angle, for example, with respect to the guide surface 19 in dependence on his respective pivot position with respect to the depth setting axis TV or in some pivot positions is parallel to the guide surface 19 with respect to the depth setting axis TV.

The scorer carrier 80 comprises a bearing section 81 on mutually opposing longitudinal end regions, which is mounted on the scorer depth setting bearing 36 around the depth setting axis TV, and a motor section 82 having a motor receptacle 83, on which the scorer drive motor 32 is held. A gearing 84 can be arranged between the scorer drive motor 32 and the scorer toolholder 34, for example, a stepped gearing or the like. For example, it is possible that due to the gearing 84, the tool axis of rotation DV and a motor axis of rotation DM of the scorer drive motor 32 have a transverse distance in relation to one another. For example, the motor axis of rotation DM has a greater distance to the guide surface 19 than the tool axis of rotation DV, which is thus very close to the guide surface 19. It is thus possible, for example, that the scorer drive motor 32 has a greater diameter for generating a correspondingly greater torque than in a design in which its motor axis of rotation and the tool axis of rotation DV are aligned with one another.

To actuate the saw toolholder 14 between the upper depth setting position OT and one of the lower depth setting positions UT, the saw assembly 11 as a whole is to be pivoted around the depth setting axis TS. For this purpose, an operator can grasp, for example, handles 26 and/or 27 arranged on the saw assembly housing 13. The handle 26 is arranged at the rear on the saw assembly 11 in the working direction AR, the handle 27 is arranged at a front region of the saw assembly housing 13 on the saw assembly 11 in the working direction AR. Both handles 26, 27 have an elongated form. The handle 26 as a longitudinal axis L 26, which extends essentially in parallel to the longitudinal axis L of the guide device 17, while a longitudinal axis L27 of the handle 27 extends transversely to this longitudinal axis L. The operator can thus, for example, generate a torque around the depth setting axis TS by pressing on the handle 27, whereby the saw toolholder 14 pivots around the depth setting axis TS and the saw tool 15 is moved in front of the guide surface 19.

The handle 27 simultaneously forms an actuating element 27A, using which an operator not only can actuate the saw assembly 11 or the saw toolholder 14 between its depth setting positions, but moreover also the scoring assembly 31. The actuating element 27A, thus an actuating handle 27B, acts via a driving device 70 on the scoring assembly 31 for its adjustment between an active position AP, in which the scoring tool 35 protrudes in front of the guide surface 19, and an inactive position IP, in which the scoring tool 35 is adjusted behind the guide surface 19 or in any case does not protrude in front of it.

The scorer carrier 80 and thus the scorer toolholder 34 is loaded by a scoring assembly spring arrangement 39 in the direction of the inactive position IP. In contrast, in the opposite direction, thus in the active position AP, the driving device 70 carries along the scoring assembly 31 when the saw assembly 11 is actuated from the upper depth setting position OT in the direction of the lower depth setting position UT. Upon adjustment of the handheld machine saw 10 into a lower depth setting position or sawing position, an operator thus so to speak operates against the two spring arrangements 20, 39 to adjust both the saw tool 15 and also the scoring tool 35 into a working position or sawing position engaging in the tool W. In the opposite direction, so to speak into the inactive position or secure position, the two spring arrangements 20, 39, which both act in a safe sense, namely in a sense to adjust the saw tool 15 and the scoring tool 35 behind the guide surface 19.

The driving device 70 comprises an actuation generator 71 on the saw assembly 11, which acts on an actuation acceptor 72 of the scoring assembly 31. The actuation generator 71 is designed as a link guide 73 and comprises a guide link 74, along which a link follower 75, for example a roller or touch roller, of the scoring assembly 31 is guided, for example rolls along. The actuation generator 71 and the actuation acceptor 72 are advantageously arranged outside the protective housing 29.

The guide link 74 comprises a scorer activation section 76 and a scorer holding section 77, between which a vertex 76A is arranged. The scorer holding section 77 of the guide link 74 or link track extends in a radius R around the depth setting axis TS. The scorer activation section 76, in contrast, extends at an angle to the scorer holding section 77 in any case in such a way that the link follower 75 guided along the holding section 77 actuates the scoring assembly 31, in particular the scorer carrier 80, in a direction that the scorer toolholder 34 and thus the scoring tool 35 is actuated out of the inactive position IP along a movement path BB in the direction of the active position AP.

The scorer activation section 76 is designed in such a way that upon an adjustment of the saw toolholder 14 out of the upper depth setting position OT in the direction of the lower depth setting position UT, the scoring tool 35 is adjusted leading in front of the saw tool 15 out of the inactive position IP into the active position AP, in which it protrudes in front of the guide surface 19 with a preferably settable maximum penetration depth or scoring depth Rmax to engage in the workpiece W. The scoring depth RMax or the active position AP is already set or settable when the saw tool 15 or the saw toolholder 14 or the saw assembly 11 assumes a depth setting position RT, in which the saw tool 15 does not yet protrude in front of the guide surface 19. This setting of the handheld machine saw 10 relates to solely scoring operation or scorer operation, in which only the scoring assembly 31 or scoring tool 35 is used to introduce a score into the workpiece W. In order that the operator does not have to so to speak balance out the saw assembly 11 in the depth setting position RT by hand in this solely scoring operation or scoring unit operation, an only-scoring depth stop device 78 is provided. This comprises a stop element 79 movably mounted on the saw assembly 11, for example movable by sliding, which is adjustable between a stop position TA, in which it stops on a counter stop 79A, which is arranged on the protective housing 29, and a release position TF, in which the stop element 79 is movable past the counter stop 79A, to actuate the saw assembly 11 and thus the saw toolholder 14 out of the scorer depth setting position RT farther in the direction of one of the lower depth setting positions UT, in which the saw tool 15 protrudes in front of the guide surface 19 to cut into the workpiece W. For example, the stop element 79 is displaceably mounted transversely to the longitudinal axis L on the motor housing part 28 or saw assembly housing 13.

The stop element 79 is advantageously arranged close to the handle 26, in particular at its upper region most remote from the guide device 17, so that an operator grasping around the handle 26 can actuate the stop element 79 with his thumb in a slide guide (not designated in greater detail) between the stop position TA and the release position TF.

Furthermore, a main switch actuating element 60 for actuating a main switch 60A, using which the saw drive motor 12 and the scorer drive motor 32 can be switched on and switched off, is arranged at this upper region of the handle 26 or region most remote from the guide device 17.

The handheld machine saw 10 is connectable, for example, by means of an attachment line 67 to an electrical power supply grid, for example an AC voltage grid at 120 V, 230 V, or the like, for the electrical power supply of the drive motors 12, 32 and other electrical components of the handheld machine saw 10.

Alternatively or additionally to the supply via an electrical power supply grid, for example, an electrical energy storage device 67D, for example an accumulator, can also be provided for the power supply of the saw assembly 10 and/or the scoring assembly 31.

For the power supply of the scoring assembly 31 by the saw assembly 11, a connecting line 68 is provided. The connecting line 68 is connected using attachment sections 68A, 68B at its longitudinal ends, on the one hand, to the saw assembly 11, on the other hand, to the scoring assembly 31. An arc-shaped connecting section 68C or arc section extends between the attachment sections 68A, 68B.

However, it is also possible that the scoring assembly 31 can be supplied with electrical energy by means of an electrical energy storage device 68D arranged, for example, on or in the scoring assembly housing 33.

The connecting section 68C extends starting from the longitudinal ends 68A, 68B in an arc shape in the direction of the protective housing 29, so that an intermediate space is provided between the longitudinal lens 68A, 68B, which is optimally suitable for operating components of the scoring assembly 31.

In particular, a scorer handle body 37 is accessible through the intermediate space between the attachment sections 68A, 68B or the interior of the connecting section 68C, using which an operator can exert an actuating force in the direction of the guide surface 19 in the region of the scoring assembly 31. The scorer handle body 37 has a handle surface 37A, which is provided in particular on a cover wall 38 of the scoring assembly housing 33. This is because the scoring assembly housing 33 forms the scorer handle body 37.

A recessed grip 37B and a planar surface 37C are provided on the handle surface 37A. A handle bulge 37D extends above the recessed grip 37B, which has, for example, an outer circumferential contour matching with the palm of an operator.

The housing 33 furthermore has a side wall 38A, which extends adjacent to the long side 18B of the guide body 18, and a front wall 38B, which extends in parallel to the front end face 18 of the guide body 18.

Since the housing 33 of the scoring assembly 31 is fixedly arranged on the carrier 40, it does not pivot around the depth setting axis TV, but is pivot-fixed with respect to the depth setting axis TV. To guide the handheld machine saw 10 in the working direction AR, an operator can thus support himself on the housing 33, in particular its cover wall 38, and exert a force in the direction of the guide surface 19 and/or in the working direction AR on the handheld machine saw 10. The housing 33 has a support part 38D for support on the upper side 19A of the guide body 18.

The housing 33 is advantageously designed ergonomically favorably. For example, the cover wall 38 is inclined obliquely to the rear at a small angle with respect to the working direction AR, so that the operator can exert an operating force in the working direction AR toward the front on the housing 38 and thus the handheld machine saw 10. The cover wall 38 or the housing 33 advantageously has a handle bulge 38C. The handle bulge 38C is also suitable for the purpose of accommodating the scorer drive motor 32 beneath it. The operator can support himself on the handle bulge 38C or grasp around it, for example, with his palm. A particularly ergonomic operating concept thus results.

Figure 28:
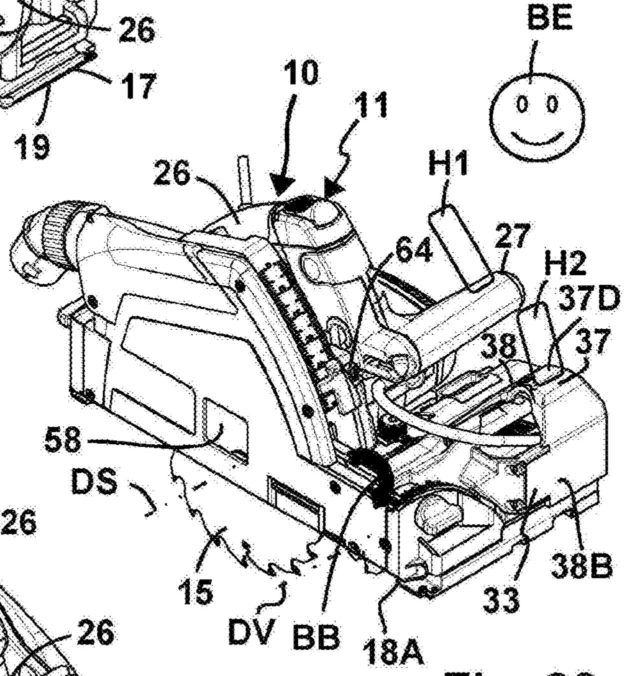
FIG. 28 shows the handheld machine saw according to FIG. 27 diagonally from the front.
Figure 29:
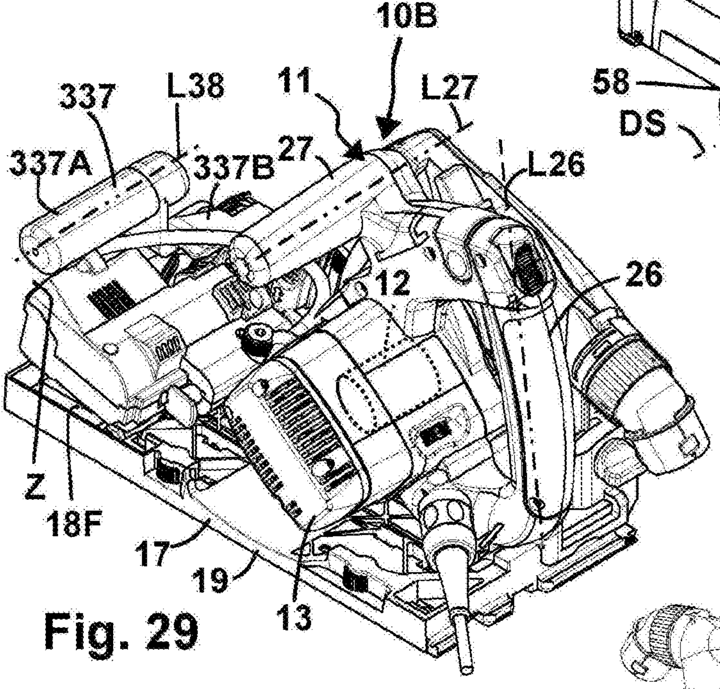
FIG. 29 shows a variant of the handheld machine saw according to FIG. 27 having an additional scorer handle body.
Figure 30:
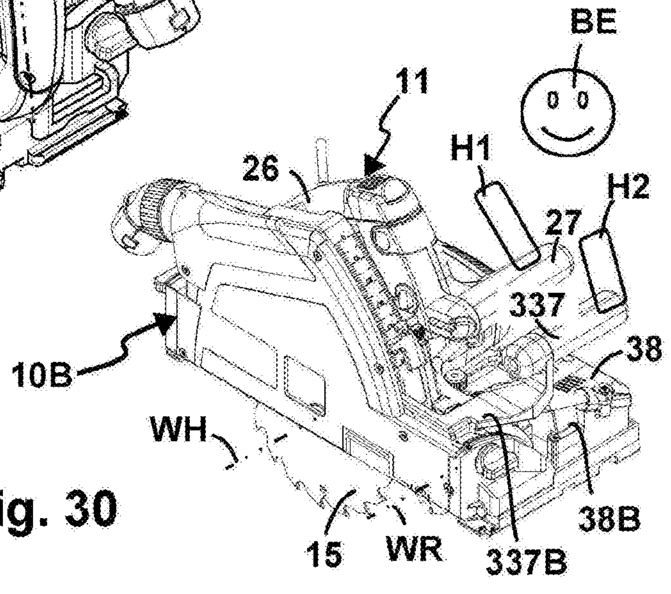
FIG. 30 shows the handheld machine saw according to FIG. 29 diagonally from the front.

A schematically indicated operator BE can thus, for example, grasp around the handle 26 with a hand to guide the handheld machine saw 10, in order to also actuate the main switch 60 and the actuating element 61A with his hand, and with his other hand to optionally either grasp the handle 27, which is shown as a hand position H1 in FIG. 28, or can support himself on the scorer handle body 37 or housing 38, which is shown as the hand position H2.

An alternative operating concept or an operating concept provided in addition to the handle 37 provides an additional scorer handle body 337. The handle body 337 is, for example, rod-shaped and has a handle surface 337A to be grasped around by the operator BE. The handle body 337 is fastened by means of a carrier 337B on the protective housing 29 and protrudes from it in the direction of the scoring assembly 31.

The scoring assembly 31 is arranged between the handle body 337 and the guide body 18, wherein an intermediate space Z, through which an operator can grasp around the handle body 337, is provided between the handle body 337 and the upper side of the housing 33 of the scoring assembly 31 facing away from the guide body 18.

Both handle bodies 37 and 337 extend along a longitudinal axis L38 transverse to the longitudinal axis L of the guide body 18, in particular perpendicularly transverse. Both handle bodies 337 and 37 preferably extend up to the so to speak tool-free long side 18B of the guide body 18. Both handle bodies 37 and 337 preferably extend over essentially the entire transverse width of the guide body 18 from the long side or narrow side 18B in the direction of the long side 18A, on which the tools 15, 35 are arranged, so that they provide the operator with an ergonomic support for guiding the handheld machine saw 10.

Furthermore, the saw assembly 11 or the saw toolholder 14 is lockable by means of a locking device 61 in the upper depth setting position OT. An actuating element 61A of the locking device 61, designed, for example, as a pressure actuating element, is arranged on the upper region or region most remote from the guide device 17 of the handle 26. By actuation of the actuating element 61A, it can be disengaged from a buttress contour 61B, for example engaging-behind contour, so that the saw assembly 11 is unlocked for adjustment from the upper depth setting position OT into one of the lower depth setting positions UT or the scoring depth setting position RT.

The scoring depth setting position RT and other lower depth setting positions UT are also settable by means of a saw depth setting device 62 of the handheld machine saw 10. The saw depth setting device 62 comprises a depth stop guide 63, which extends in an arc shape around the saw depth setting bearing 16.

It is advantageous if the guide link 74, which also extends in an arc shape around the depth setting axis TS at least in the region of the scorer activation section 76, is arranged adjacent to the depth stop guide 63.

A depth stop 64 is adjustably mounted in various depth setting positions, for example displaceably, on the depth stop guide 63. The depth stop guide 63 comprises, for example, a guide groove, a guide slot, or the like. The depth stop 64 is fixable in place with respect to the depth stop guide 63 by means of a fixing unit 65, for example a detent fixing unit.

A stop body 66 is arranged on the saw assembly 11 movable around the depth setting axis TS, which protrudes in the direction of the depth setting stop 64 and stops thereon in the respective depth setting position set by it.

The scoring assembly 31, in particular its scorer carrier 80, is pivotably mounted on the carrier 40 pivotable around the miter axis G around the depth setting axis TV by means of the scorer depth setting bearing 36. The scorer depth setting bearing 36 comprises a bearing base 86, which is fastened on the carrier 40. The bearing base 86 comprises a support plate 86A, for example a flange or flange body, from which an axis element 86B protrudes. The support plate 86A is fastened using screws 86C on a base wall 29A of the protective housing 29, so that the axis element 86B protrudes from the base wall 29A.

A bearing sleeve 86E is arranged on the outer circumference of the axis element 86B, on the outer circumference of which a bearing element 86F is in turn arranged. The bearing sleeve 86E thus engages in a bearing receptacle of the bearing element 86F, so that the bearing element 86F is pivotably mounted by means of the bearing sleeve 86E around the depth setting axis TV. The bearing element 86F is, for example, fixedly connected to the scorer carrier 80, for example accommodated in a receptacle thereof.

The bearing sleeve 86E represents an option which improves the ability to rotate or pivot around the depth setting axis TV. Moreover, the bearing sleeve 86E improves a longitudinal displaceability of the scorer carrier 80 and thus of the scoring assembly 31 with respect to a transverse adjustment axis QS, in order to align the scorer toolholder 34 with respect to the saw toolholder 14 and thus the scoring tool 35 with respect to the saw tool 15 in an axial line aligned with one another, so that the score produced by the scoring tool 35 aligns with the saw cut produced by the saw tool 15. It is advantageous that the transverse adjustment axis QS simultaneously corresponds to the depth setting axis TV.

A transverse adjustment device 87 is used to adjust the scorer toolholder 34 with respect to the transverse adjustment axis QS. The transverse adjustment device 87 comprises as a positioning element 87A, for example, a positioning screw, the head of which represents an actuating element 87B. A ribbing or similar other handle which facilitates the operation for the operator BE can be provided on the radial outside, for example, on the actuating element 87B. A screw section 87C engages in a positioning receptacle 86D of the axis element 86B and is screwed together therewith. Therefore, by rotating the positioning screw or the positioning element 87A, the position of the actuating element 87B can be adjusted along the transverse adjustment axis QS. The screw section 87C is thus so to speak screwed into the positioning receptacle 86D or unscrewed from it.

The actuating element 87B protrudes in front of the axis element 86B with a projection protruding radially in front of the transverse adjustment axis QS, for example a flange projection, so that the bearing sleeve 86E and/or the bearing element 86F can support itself on this projection. The actuating element 87B thus carries along the bearing element 86F as the screw section 87C is screwed into the positioning receptacle 86D in the direction of the support plate 86A of the bearing base 86 along the transverse adjustment axis QS and thus adjusts the scorer toolholder 34 in a direction away from the tool long side 18A of the guide body 18.

A spring 86H acts opposite to this positioning direction, which supports itself on one side on the support plate 86A and on the other side on the bearing element 86F and thus acts with a force in the direction toward the actuating element 87B. The spring 86H engages in a spring receptacle 86G of the bearing element 86F, which is designed, for example, as a circumferential groove that extends around the transverse adjustment axis QS. The spring 86H is penetrated by the bearing element 86F, the bearing sleeve 86E, and the axis element 86B.

By rotating the actuating element 87B around the transverse adjustment axis QS, the position of the scorer toolholder 34 and thus of the scoring tool 35 is adjustable with respect to the longitudinal axis L of the guide body 18 and/or a cut axis producible by the saw tool 15 in directions opposite to one another with respect to the transverse adjustment axis QS, for example, out of a middle location by at most 2.5 to 4 mm in each direction.

A detent device 88 is used for fixing, in particular rotationally fixing, the actuating element 87B or the positioning element 87A. The detent device 88 comprises a clamp-like spring 88A or alternatively 188A, on the free ends of which detent elements 88B are formed. The detent springs 88B, 188B engage in detent receptacles 88C in a locking manner, which are arranged on the radial outer circumference of the actuating element 87B with respect to the transverse adjustment axis QS. By rotating the actuating element 87B, the detent elements 88B move out of the one detent receptacle 88C and engage in the closest adjacent detent receptacle 88C in the circumferential direction. The detent device 88 thus fixes the transverse adjustment device 87 with respect to a respective set transverse setting of the scorer toolholder 34.

The actuation acceptor 72 is arranged on an actuation acceptor arm 90, namely on its free end region. A pivot bearing 90A for a wheel 90B is arranged there, which can rotate around an axis of rotation D90 by means of the pivot bearing 90A at the free end region of the actuation acceptor arm 90 and represents the link follower 75. The wheel 90 can thus roll along the guide link 74.

The actuation acceptor arm 90 is pivotably mounted using a bearing section 91 around a pivot axis, which corresponds to the depth setting axis TV in the present case, with respect to the scorer carrier 80 of the scoring assembly 31, so that the link follower 75 has a different angle positions in dependence on the pivot position of the actuation acceptor arm 90 with respect to the depth setting axis TV or with respect to the scorer carrier 80, so that by pivoting the actuation acceptor arm 90 with respect to the scorer carrier 80, different penetration depths of the scoring tool 35 into the workpiece W or different distances at which the scoring tool 35 protrudes in front of the guide surface 19 in the active position AP are settable. The actuation acceptor arm 90 therefore forms a component of scorer depth setting means 95.

An actuating arm 92 protrudes at an angle from the actuation acceptor arm 90 from the bearing section 91. An actuating surface 92A is provided on the actuating arm 92, on which a positioning body 93 acts. By adjusting the relative position of the positioning body 93 with respect to the actuating surface 92A, the actuation acceptor arm 90 and thus the link follower 75 can be adjusted in such a way that it has different actuation distances BA to the scorer toolholder 34. This is because the link follower 75 and thus the actuation acceptor 72 and the scorer toolholder 34 protrude like arms from the bearing section 81 of the scorer carrier 80 on mutually opposing sides.

The positioning body 93 supports the actuating arm 92 against the force of a spring arrangement 94. The spring arrangement 94 comprises a coiled spring 94A, which is secured on one side on the scorer carrier 80 and on the other side on the actuation acceptor arm 90 and impinges it in a direction toward the carrier 90 or the scorer toolholder 34. In contrast, the positioning body 93 acts in the opposite direction, thus in the direction of an adjustment of the actuation acceptor arm 90 from the scorer carrier 80 and thus in the direction of enlarging the actuation distance between the actuation acceptor 72 and the scorer toolholder 34.

The positioning body 93 is displaceably mounted with respect to the scorer carrier 80 along an axis SA. Moreover, the positioning body 93 is displaceably mounted transversely to the axis SA, in the present case perpendicularly transversely, along an axis SB, wherein this degree of movement freedom is assigned to the scorer depth setting means 95.

The positioning body 93 has a longitudinal end 93A, on which a positioning surface 93B is arranged to engage with the actuating surface 92A of the actuating arm 92. A middle section 93C of the positioning body 93, on which it has a positioning contour 93D, extends between the longitudinal end 93A and an actuating end 93B.

The positioning body 93 is displaceably mounted with respect to the positioning axis SA on a bearing body 96 designed, for example, as a housing. For example, the bearing body 96 has bearing receptacles 96A, 96C, which are arranged on walls or bearing sections 96B, 96D of the bearing body 96. The middle section 93C of the positioning body 93 extends between the bearing receptacles 96A, 96C, wherein the positioning body 93 protrudes on mutually opposing sides in front of the bearing body 96, namely on one side with the positioning surface 93B, which is engaged with the actuating surface 92A of the actuating arm 92, and on the other side with an actuating end or actuating element 93E, on which a grip surface or similar other positioning surface for actuation by an operator is arranged.

Figure 7:
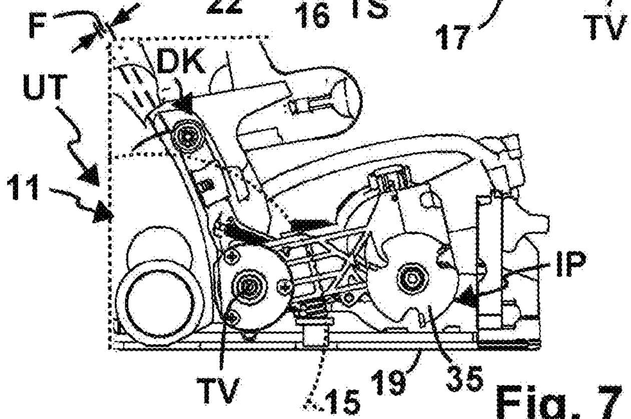
FIG. 7 shows a right part of the view according to FIG. 6, wherein the saw assembly is adjusted into a lowermost depth setting position, but the scoring assembly is inactive.
Figure 10:
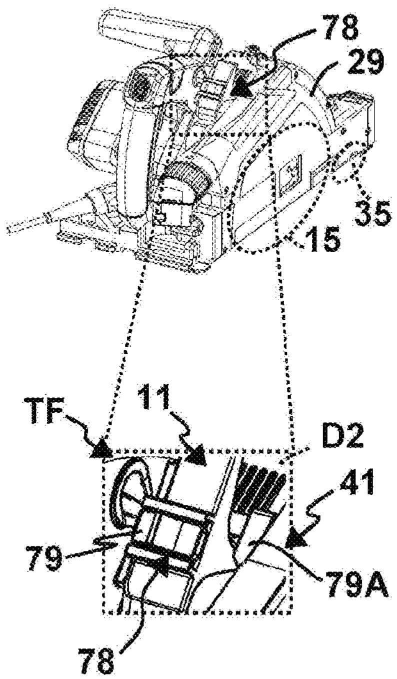
FIG. 10 shows an only-scoring depth stop device in a release position, which enables an adjustment of the saw assembly according to FIG. 8, as a detail D2 of the handheld machine saw additionally shown diagonally from the rear as a whole in FIG. 10.

Specifically, for example, an operator can pull on the actuating element 93E in the direction of the positioning axis SA, whereby the positioning body 93 is disengaged from the actuating surface 92A, so that the spring arrangement 94 can actuate the actuating arm 90 out of an activation position AK away from the guide link 74 into a deactivation position DK. In the deactivation position DK, the link follower 75 is disengaged from the guide link 74 and has, for example, a distance F to guide link 74 (FIG. 7), so that the driving coupling of the driving device 70 between the saw assembly 11 and the scoring assembly 31 is canceled. The saw assembly 11 can thus be adjusted between its depth setting positions OT and UT, without the scoring assembly 11 being adjusted around the depth setting axis TV. The scoring tool 35 remains adjusted behind the guide surface 19, thus inactive.

The positioning body 93 thus forms a component of a deactivation device 97 for deactivating or activating the driving device 70.

The positioning body 93 is loaded by a spring 96E in its activation position AK. The spring 96E supports itself, for example, on the positioning body 93, for example, on a step close to the center section 93C, and on the wall 96D of the bearing body 96.

At the actuating end or actuating element 93E, a rotation lock 93F fixed in place with respect to the scorer carrier 80 is preferably provided, for example, a planar surface, on which the actuating end 93F is supported in a non-rotatable manner with respect to the positioning axis SA.

The positioning contour 93D forms a component of the scorer depth setting means 95. The positioning contour 93D of the positioning body 93 arranged on the radial outer circumference of the middle section 93C is engaged with a positioning receptacle 98, the position of which is adjustable along the positioning axis SB and thus transversely to the positioning axis SA by means of a depth setting element 99, for example a positioning screw. An operator can actuate the depth setting element 99 by means of an actuating element 99A.

Alternatively, it would be possible that the positioning body 93 is pivotably mounted around the positioning axis SA and the positioning contour 93D represents an eccentric contour, so that by pivoting the positioning body 93 around the positioning axis SA, parts of the positioning contour 93D protruding different distances radially in front of the positioning axis SA are supported on the positioning receptacle 98 and thus the positioning surface 93B of the positioning body 93 assumes different positions with respect to the positioning axis SB.

The depth setting element 99 comprises, for example, an actuating element 99A, for example a head, from which a screw section 99B protrudes, which is rotatably mounted on a component fixed in place with respect to the scorer carrier 80, for example the bearing body 96, and is screwed into a body 98A providing the positioning receptacle 98.

By way of a screw actuation of the depth setting element 99, a transverse position of the positioning receptacle 98, which is U-shaped, for example, is adjustable transversely to the positioning axis SA, for example, along a positioning axis SB, whereby the position of the positioning surface 93B and thus the actuating surface 92A of the actuating arm 92 pressing thereon is adjusted transversely to the positioning axis SA at the same time.

The positioning body 93 is accommodated displaceably along the positioning axis SA in the positioning receptacle 98, so that the scorer depth setting means 95 maintain the respective set depth setting position, even if the deactivation device 97 is actuated, in that the positioning body 93 is displaced along the positioning axis SA.

An intermediate space 33B is provided with respect to the longitudinal axis L of the guide device 17 or the guide body 18 between the scoring assembly housing 33 forming a scorer handle body 37 and the saw assembly housing 13, in which one or more actuating elements of the scoring assembly 31 provided for actuation by an operator are conveniently accessible for the operator, for example, the actuating element 93E of the deactivation device 97, the actuating element 87B of the transverse adjustment device 97, or the actuating element 99A of the scorer depth setting means 95.

The handheld machine saw 10 is short with respect to the longitudinal axis L of its guide body 18, thus between the end faces 18C, 18D. This is achieved, inter alia, by the compact scoring module 30 or scoring assembly 31. Furthermore, it is advantageous that the depth setting axis TV is arranged between the toolholders 14 and 34. The handheld machine saw 10 is therefore not so to speak top-heavy in its front region in the working direction AR, but rather extremely short.

The arrangement of the toolholders 14, 34 and thus of the saw tool 15 and the scoring tool 35 close to or directly at the long side 18A of the guide body 18 also contributes to the user-friendliness of the handheld machine saw 10. Inter alia, the two tools 15, 35 are thus well visible at their penetration region into the workpiece W. Moreover, the miter axis G extends directly adjacent to the long side 18A, so that the tools 14, 35 can pivot optimally around this long side 18A, but also around the long narrow side 204 of the guide rail 200, 200A.

Furthermore, an advantageous suction concept for dust, particles, and the like, which arise during the sawing and scoring of the workpiece W, is ensured in the handheld machine saw 10:

The saw tool receptacle space 48 and the scoring tool receptacle space 49 are provided with a sawdust removal device 48A and a scorer dust removal device 49A. The receptacle spaces 48, 49 extend up to the guide surface 19, where the saw tool 15 protrudes in one of the lower depth setting positions UT and the scoring tool 35 protrudes in its active position AP out of the respective receptacle space 48, 49 in front of the guide surface 19. The dust removal devices 48A, 49A are arranged in a flow connection with a dust removal fitting 52, which is arranged at the rear in the working direction AR on the handheld machine saw 10, in particular on the top rear of the protective housing 29. A suction hose SL of a suction device SV, for example, a workshop suction unit, is connectable to the dust removal fitting 52, which is designed, for example, as a connecting piece, to suction off dust, particles, or the like arising during the sawing operation of the handheld machine saw 10.

The protective housing 29 has a protective housing part 40A, which is fixed in place with respect to the carrier 40, and which is covered by a protective housing cover 41 which is advantageously removable from the protective housing part 40A for maintenance purposes. The receptacle spaces 48, 49 for the top parts of the tools 15, 35 with respect to the guide device 17 are formed between the protective housing part 40A and the protective housing cover 41. The protective housing part 40A has, for example, a base wall 29A, which is opposite to a cover wall 42 of the protective housing cover 41.

A recess 42A is provided between the base wall of 29A and the cover wall 42, through which the tools 15, 35 are movable out of the protective housing 29, so that they protrude in front of the guide surface 19. An obliquely inclined wall section 42B of the cover wall 42 extends adjacent to the recess 42A, which is obliquely inclined in such a way that a transverse distance between the cover wall 42 and the base wall 29A is reduced in the region of the recess 42A and/or is less than in a region of the saw tool receptacle space 48 more remote from the guide surface 19, in which the saw tool receptacle 14 is arranged.

Angled side walls 43C, 43 and 44C, 44 protrude from the base wall 29A and the cover wall 42, which press against one another at the end faces and interlock, so that the side walls 43-44 delimit the receptacle spaces 48, 49. The side walls 43C, 43 are, for example, rear side walls in the working direction AR. The side walls 44C, 44 extend along an upper section or section most remote from the guide device 17 of the protective housing 29 and on a front section of the protective housing 29 in the working direction AR.

The protective housing 29 has a projection 45, in which the scoring tool receptacle space 49 is provided. The cover wall 42 extends up to the projection 45. A side wall 46 protrudes there from the cover wall 42 on a side facing away from the guide device 17 and a side wall 47 protrudes at an angle forward in the working direction, thus in orientation toward the end face 18C, which press at the end faces on the protective housing part 40A fixed in place with respect to the carrier 40, so that overall the projection 45 also provides a closed scorer receptacle space 49 toward the guide surface 19, except for a passage opening for the scoring tool 35.

It would be possible in principle to suction off the two receptacle spaces 48, 49 without further fluidic measures via the dust removal fitting 52. However, it is not considered here that the scoring tool 35, when it cuts into the workpiece upper side WO, throws particles toward the saw tool 15, which would significantly worsen a view of the front cutting edge of the saw tool 15 in the working direction AR. Several measures described hereinafter are advantageous to remedy these problems.

To suction off dust, particles, or the like, a dust removal duct 50 extends on a region of the protective housing 29 facing away from the guide device 17. The dust removal duct 50 is delimited, on the one hand, by the side walls 44, 44C, on the other hand by intermediate walls 51, 51C opposite thereto on the cover 41 or protective housing part 40A, respectively. The dust removal duct 50 extends from a front region of the saw tool 15 in the working direction AR to the dust removal fitting 52 arranged at the rear in the working direction AR.

It would be possible in principle that the scoring tool receptacle space 49 communicates directly with the dust removal duct 50. However, the saw tool receptacle space 48 is advantageously provided with a partition, namely in the form of a partition wall 55, from the scoring tool receptacle space 49 at least in that region where the saw tool 15 and the scoring tool 35 are directly opposite, namely close to the guide surface 19. The partition wall 55 advantageously has a partition wall part 55C fixed in place with respect to the protective housing 29, for example, the protective housing part 40A. The partition wall 55, in particular the partition wall part 55C, extends up to the guide surface 19 and thus stands between the saw tool 15 and the scoring tool 35.

On a side facing toward the scoring tool 35, the partition wall part 55C or the partition wall 55 advantageously has a flow guiding surface 55E, for example, inlet bevel or baffle 55D, on which the particles generated by the scoring tool 35 strike and are deflected in the direction of the dust removal duct 50, and thus do not continue to flow toward the saw tool 15.

Figure 18:
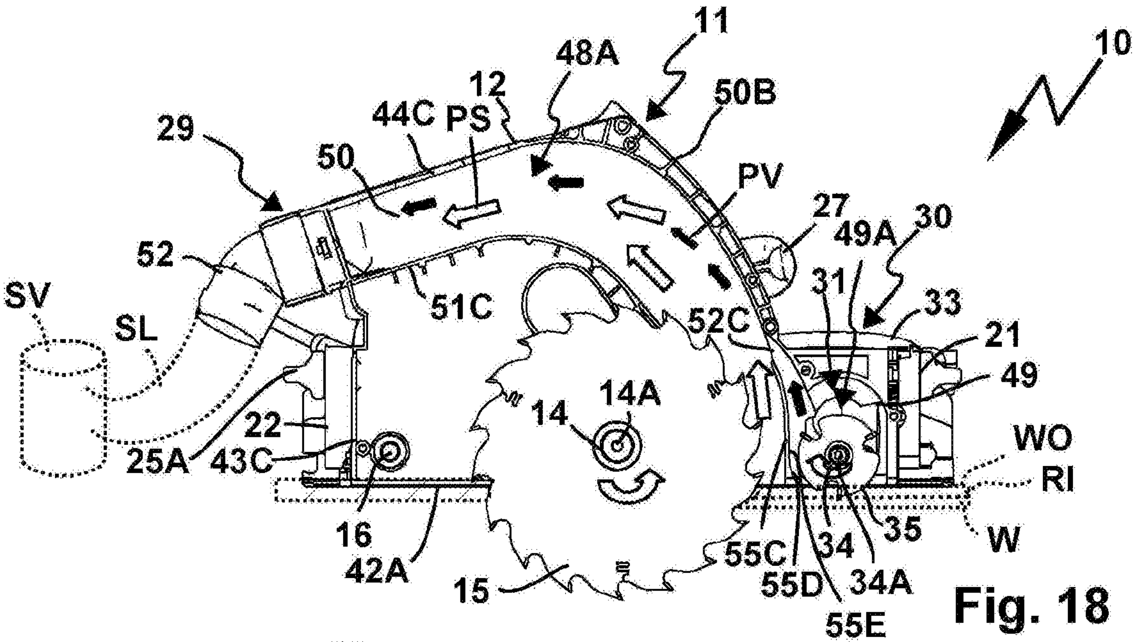
FIG. 18 shows a side view of the handheld machine saw according to the above figures having open protective housing, approximately corresponding to the view according to FIG. 6.
Figure 19:
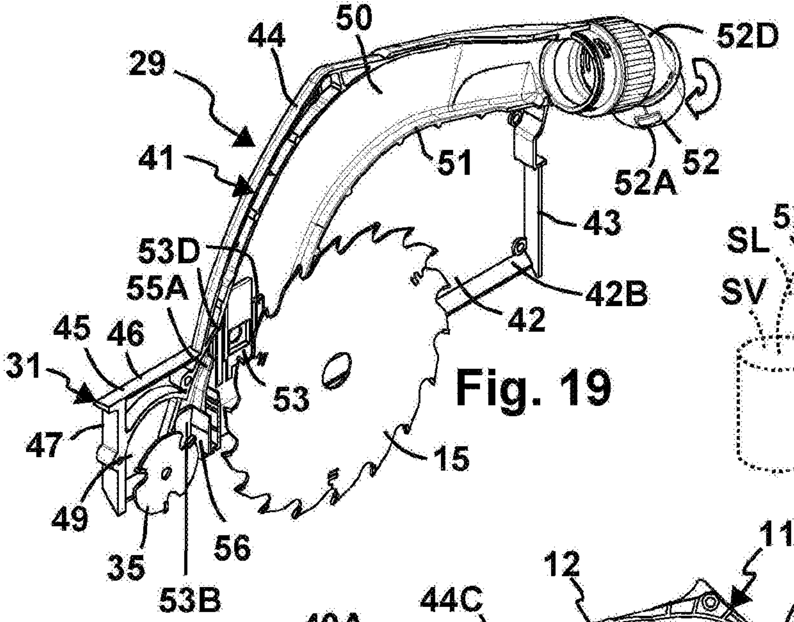
FIG. 19 shows a cover of the protective housing diagonally from the front, approximately in the perspective according to FIG. 1.

At a region of the partition wall section 55C remote from the guide surface 19, the scoring tool receptacle space 49 opens at an outflow opening 52C into the dust removal duct 50, so that the particles generated by the scoring tool 35, which are indicated in FIG. 18 as a particle flow PV by black arrows, mix with a particle flow PS represented by white arrows, which contains particles generated by the saw tool 15.

Figure 21:
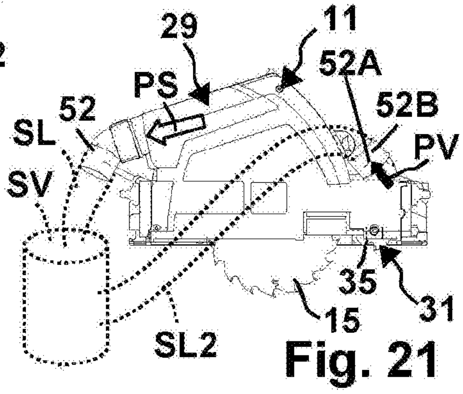
FIG. 21 shows a further variant of the handheld machine saw from the side, approximately corresponding to the viewing direction BR1 in FIG. 1.
Figure 20:
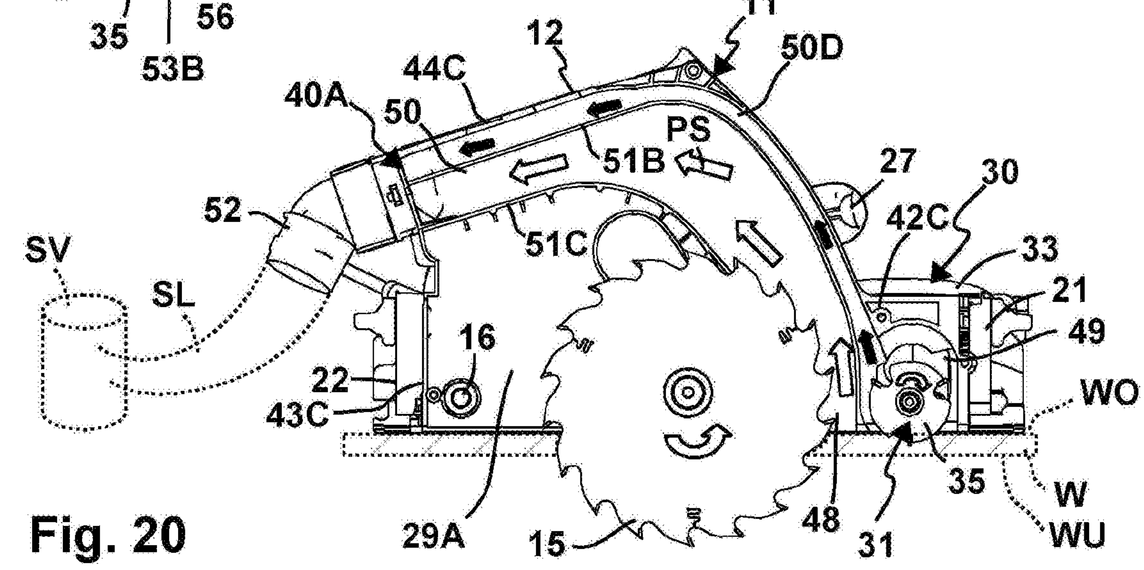
FIG. 20 shows a view similar to FIG. 18 of a variant of the handheld machine saw.
Figure 22:
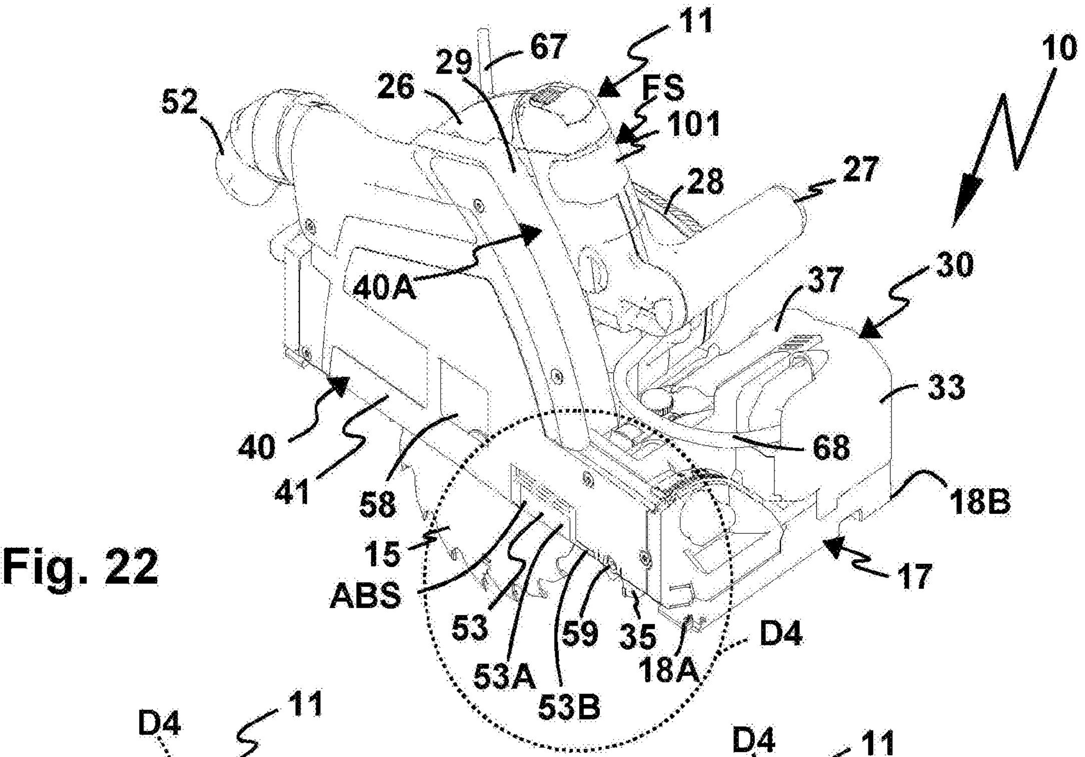
FIG. 22 shows the handheld machine saw according to the above figures diagonally from the front, wherein the protective housing is closed using the cover according to FIG. 19.
Figure 23:
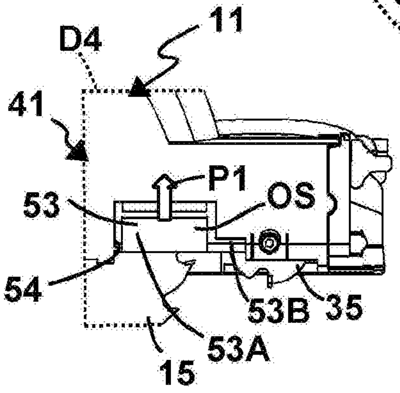
FIG. 23 shows a front detail D4 of the view according to FIG. 22 having a cover element adjusted into an open position.
Figure 24:
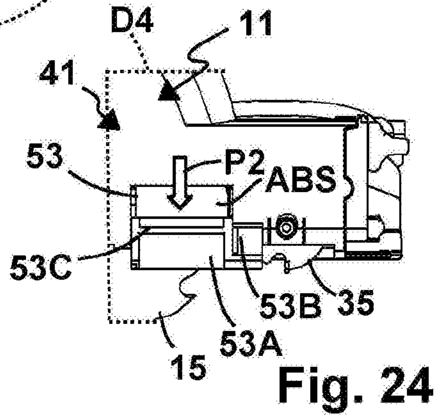
FIG. 24 shows the view according to FIG. 23, but having cover element adjusted into a cover position.
Figure 25:
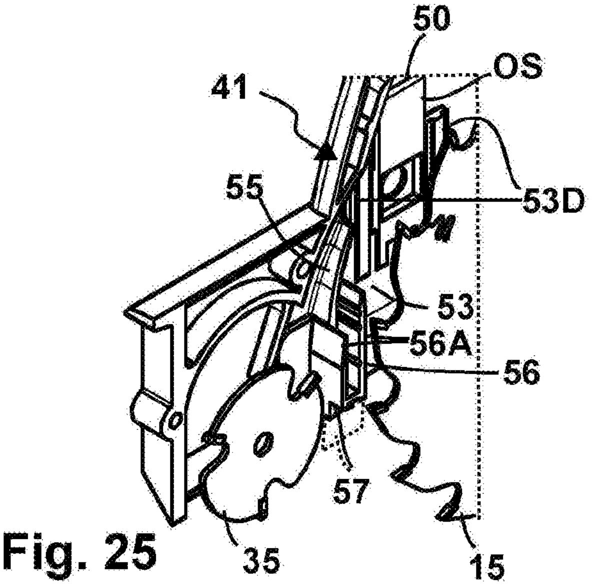
FIG. 25 shows a subsection of the cover according to FIG. 19 having cover element adjusted into the open position, corresponding to the partial view according to FIG. 23.
Figure 26:
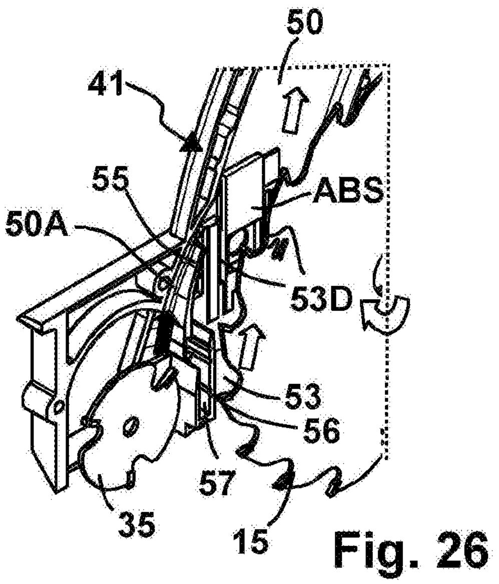
FIG. 26 shows a view according to FIG. 25, but having cover element adjusted into cover position.
Figure 27:
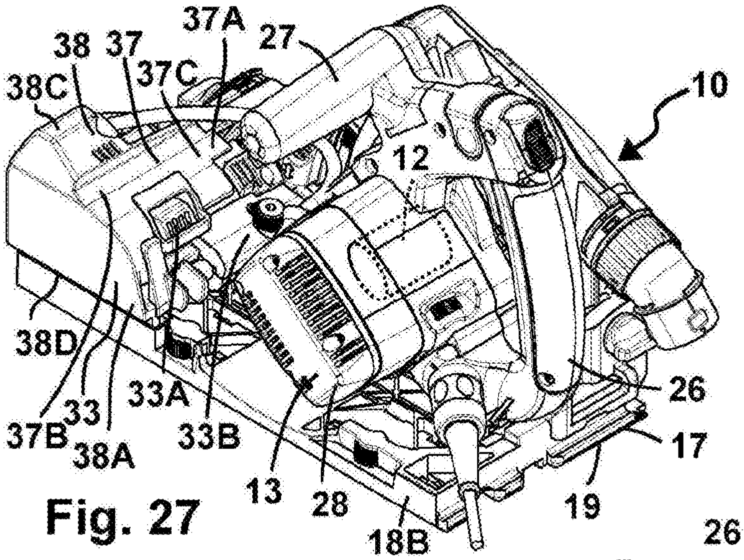
FIG. 27 shows the handheld machine saw according to FIG. 1 diagonally from the rear to illustrate a scorer handle body.

An alternative concept, in which the above-mentioned partition wall 55 between scoring tool 35 and saw tool 15 is also advantageous and provided, is indicated in FIG. 21. However, the receptacle spaces 48, 49 are completely separated from one another therein and the scoring tool receptacle space 49 has a dust removal fitting 52B separate from the dust removal fitting 52 for removing the particles of the scoring assembly 31, to which a farther suction hose SL2 is connectable. For example, a connecting piece for connecting the suction hose SL2 is provided on the dust removal fitting 52B, which is also fluidically connected to the suction device SV, for example, to generate a particle flow PV conveying away particles of the scoring assembly 31. Via the dust removal fitting 52, the particles generated by the saw tool 15 flow as a particle flow PS separate from the particle flow PV to the suction device SV.

Formfitting contours 52A, for example rotational formfitting contours, plug-in formfitting contours, etc., are provided on the dust removal fittings 52, 52B for the formfitting hold of the suction hoses SL, SL2. Furthermore, it is advantageous if the dust removal fittings 52, 52B have pivot bearings 52D, so that the suction hoses SL, SL2 are rotatably mounted on the handheld machine saw 10.

Solely due to the arrangement of toolholders 14, 34 and thus the tools 15, 35 directly on the so to speak free long side 18A of the guide body 17, optimum visibility of these tools is already provided. A viewing window 54 on the cover wall 42, in particular on its lower edge region close to the guide surface 19, is furthermore advantageous.

The viewing window 54 is arranged on a region of the cover wall 42, where the scoring tool 35 is opposite to the saw tool 15. Both tools can thus be seen through the viewing window 54.

The viewing window 54 could be closed by a fixed, transparent wall, for example made of plastic, so that receptacle spaces 48, 49 would be closed by this wall. However, in the present case a cover element 53 is provided, in particular a window body or window cover element.

The cover element 53 has a saw tool section 53A and a scoring tool section 53B, which are assigned to the saw tool 15 or scoring tool 35, respectively, and are each opposite thereto, in any case when the cover element 53 is adjusted into a cover position ABS, in which it conceals the viewing window 54.

The cover element 53 is adjustable by means of a bearing 53D, in particular a slide bearing, on the cover wall 42 between the cover position ABS and an open position OS, in which it at least partially exposes the viewing window 54, in particular its section facing toward the guide surface 19. An actuating contour 53C, for example a rib or the like, is advantageously provided for grasping the cover element 53. The cover element 53 is adjustable by a sliding actuation in a direction P1 into its open position OS, and into its cover position ABS by a sliding actuation in a direction P2 opposite thereto.

The cover element 53 has a partition wall section 56 of the partition wall 55. The partition wall section 56 is engaged or in contact in the cover position ABS and in the open position OS telescopically or in such a way with the fixed partition wall section 55A that the partition wall 55 is so to speak closed. The partition wall section 56 has a partition wall receptacle 57 which comprises, for example, mutually opposing side walls 56A. The fixed partition wall section 55A can engage in the partition wall receptacle 57, wherein it engages deeper in the partition wall receptacle 57 in the open position OS than in the cover position ABS.

Furthermore, recesses 58, 59 are provided on the cover wall 42, through which the toolholders 14, 34 are accessible for a tool change of the tools 15, 35. It is to be mentioned here that the holding elements 14A, 34A advantageously have identical actuating contours, for example slots for screwdrivers, for a tool, using which the holding elements 14A, 34A can be released for a tool change and can be fixed on the toolholder 14, 34.

A blocking device 85 is provided for a tool change of the scoring tool 35. The blocking device 85 comprises a scorer blocking element 85A, which engages in a blocking receptacle 85B, which is connected in a rotationally-fixed manner to the scorer toolholder 34, for example is arranged on an output shaft of the gearing 84, in a blocking position. The blocking element 85A is axially displaceable on a guide 85C along a positioning axis S85. By pressing on an actuating contour 85D at a free end region of the blocking element 85A protruding in front of the guide 85C, an operator can engage the blocking element 85A with the blocking receptacle 85B, thus move it into a blocking position in which the scorer toolholder 34 is blocked in a rotationally-fixed manner. This blocking position can be canceled, for example, by pulling on the blocking element 85A in a direction away from the blocking receptacle 85B. A spring 85E, which is schematically shown in the drawing, is advantageously provided, which acts upon the blocking element 85A in a release position, in which the blocking element 85A does not engage in the blocking receptacle 85B.

Alternatively or additionally, a motorized drive 85F can also be provided, for example, an electromagnet, electrical linear drive, etc., using which the blocking element 85A is adjustable into the blocking position and/or the release position. For example, the drive 85F can be active in the blocking position, while the spring 85E acts in the release position. To switch the drive 85E, for example, an electrical switch 85G is provided, which is actuatable by the operator by pressure actuation or the like.

A securing device 100 is used for safe and convenient tool change of the saw tool 15 and/or scoring tool 35.

The securing device 100 disables the switch 60A against switching on of the drive motors 12, 32 when it is adjusted into its securing position SG and releases the switch 60A for switching on the drive motors 12, 32 when it is adjusted into a saw operation position FS. Both drive motors 12, 32 can thus be disabled simultaneously against switching on by the securing device 100 for a tool change.

Figure 31:
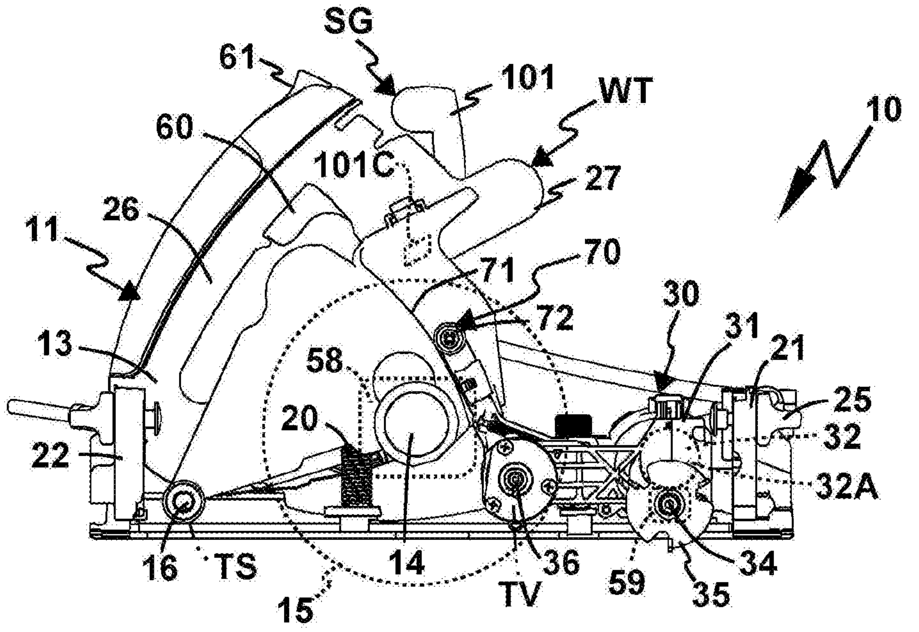
FIG. 31 shows a side view of the handheld machine saw according to the above figures having a securing device in a securing position.
Figure 32:
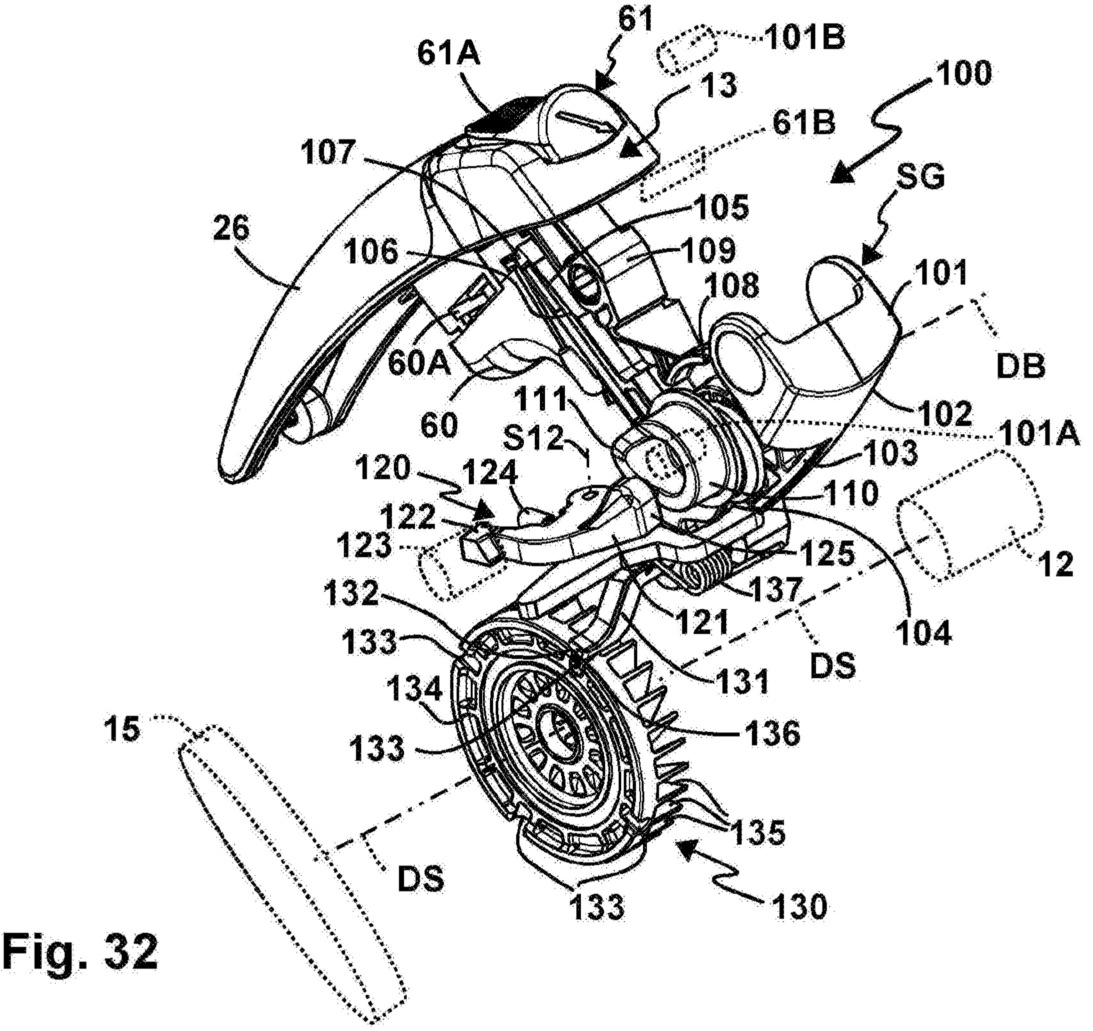
FIG. 32 shows a perspective diagonal view of the securing device of the handheld machine saw according to FIG. 31.

The securing device 100 comprises an actuating element 101, which is pivotably mounted on the protective housing 29 and/or with respect to the handle 26 around a pivot axis DB. When the actuating element 101 is pivoted away from the protective housing 29 or handle 26, thus assumes the position of the securing position SG shown in FIGS. 31 and 32, the securing position SG is immediately recognizable to the operator. The actuating element 101 comprises a handle part 102 having side legs, between which a part of the protective housing 29 is accommodated in the saw operation position FS. The actuating element 101 therefore so to speak clings to the protective housing 29 in the saw operation position FS, and in any case does not protrude in front of it. Actuating element 101 can be grasped manually by an operator on the handle part 102.

A motorized drive 101A for the actuating element 101 is also possible, for example, a schematically shown electric motor, which can drive the actuating element 101 to pivot or rotate and is switchable by means of a schematically shown electrical switch 101B, which is actuatable by an operator, for example, by a pressure actuation.

The handle part 101 is arranged at the free end region of an actuating arm 103 of the actuating element 101, which is pivotably mounted with a bearing section 104 with respect to the pivot axis DB on the protective housing 29.

The actuating element 101 actuates a switch disabling element 105 for disabling the switch 60A. The disabling element 105 has an arm 106 actuatable displaceably and/or pivotably, for example, by the actuating element 101, on the free end region of which an engaging-behind contour 107, for example a hook, is arranged, which in the disabled position of the switch disabling element 105 engages behind the actuating element 60 of the switch 60A, so that it can no longer actuate the switch 60A in the direction of its switching-on position.

It is furthermore advantageous if the actuating element 101 is designed to release the locking device 61. For this purpose, for example, an actuating body 108, for example a cam disc or the like, is movement coupled with the actuating element 101, for example, in the sense of a rotation around the axis DB, which acts on a positioning element 109 such that upon adjustment of the actuating element 101 into the securing position SG, it actuates the actuating element 61A to disengage from the buttress contour 61B. The saw assembly 11 can thus pivot around the depth setting axis TS from the upper depth setting position OT into a tool changing depth setting position WT suitable for a tool change of the saw tool 15.

A detent device 120 is provided for locking in the tool changing depth setting position WT. The detent device 120 has a detent element 121, which is pivotably mounted around a pivot axis S12. The detent element 121 comprises a detent projection 122 to lock with a detent receptacle 123, which is arranged fixed in place on the protective housing 29, for example adjacent to the depth stop guide 63. A spring 124 loads the detent element 121 in the direction of a detent position, in which it can lock with the detent receptacle 123.

The detent device 120 is activatable and deactivatable by the securing device 100. Specifically, when the actuating element 101 is adjusted into the securing position SG, it activates the detent device 120. The actuating element 101 is movement coupled with an actuating body 110 for activating and deactivating the detent device 120, for example in terms of a rotational movement. The actuating body 110 has an actuating link 111 on its side facing toward the detent element 121, which acts on an actuating leg 125 of the detent element 121, specifically in such a way that with the actuating element 101 adjusted into the securing position SG, the detent element 121 is released for locking with the detent receptacle 123 by the spring 124 and/or pre-tensions the spring 124, while with the actuating element 101 adjusted into the saw operation position FS, the detent element 121 is permanently held disengaged from the detent receptacle 123 against the action of the spring 124 and/or the spring 124 does not have spring tension sufficient for locking the detent element 121.

When the saw toolholder 14 is adjusted into the tool changing depth setting position WT, it is arranged in the region of the recesses 58. The scorer toolholder 34 is also adjusted into the tool changing depth setting position, in which it is arranged in the recess 59, by the driving device 70. The toolholders 14, 34 are thus accessible for a tool change of the tools 15, 35.

Furthermore, the actuating element 101 interacts with a blocking device 130 or acts on the blocking device 130, using which the saw toolholder 14 can be blocked against a pivot around the tool axis of rotation DS.

The blocking device 130 has a saw blocking element 131, which is engaged in a blocking position with at least one blocking contour 132, which is connected in a rotationally-fixed manner to the saw toolholder 14. For example, multiple blocking contours 132 in the form of blocking recesses 133 are arranged on a fan wheel 134, which is rotationally coupled to the saw drive motor 12 and/or the saw toolholder 14. The fan wheel 134 has, for example, fan blades 135. The blocking recesses 133 are arranged on the radial outer circumference of the fan wheel 134.

The motorized drive 101A of the securing device 100 simultaneously forms a drive for adjusting the saw blocking element 131 between its blocking position blocking the saw toolholder 14 and its release position releasing it.

The saw blocking element 131 has a blocking projection 136 at its one longitudinal end, which can engage in one of the blocking recesses 133 when it is opposite thereto due to a corresponding rotational position of the fan wheel. The other longitudinal end of the saw blocking element 131 is movably accommodated, in particular displaceably movable, in a bearing, which is not visible in the drawing, and is loaded by a spring 137 in the direction of its blocking position. By adjusting the actuating element 101 into the securing position SG, the saw blocking element 131 is released for actuation by the spring 137 or the spring 137 is pre-tensioned by the actuating element 101 to actuate the saw blocking element 131, so that the blocking projection 136 is pre-tensioned to lock with one of the blocking recesses 133. When the saw toolholder 14 is now pivoted somewhat, one of the blocking recesses 133 reaches a frontal position in relation to the blocking projection 136, so that it locks in the blocking recess 133 and secures the saw toolholder 14 against a further pivot.

Switching on of the scorer drive motor 32 is electrically blocked and thus prevented by the securing device 100 adjusted into the securing position SG. The operator can therefore block the scorer toolholder 34 safely by manually actuating the blocking device 85 and change the scoring tool 35.

Alternatively or additionally to this manual actuation, a mechanical driving coupling (not shown in the drawing) can also be provided between the scorer blocking element 85A and the saw blocking element 131, so that when the saw blocking element 131 is adjusted into the blocking position, the scorer blocking element 85A is also adjusted into the blocking position simultaneously.

Figure 33:
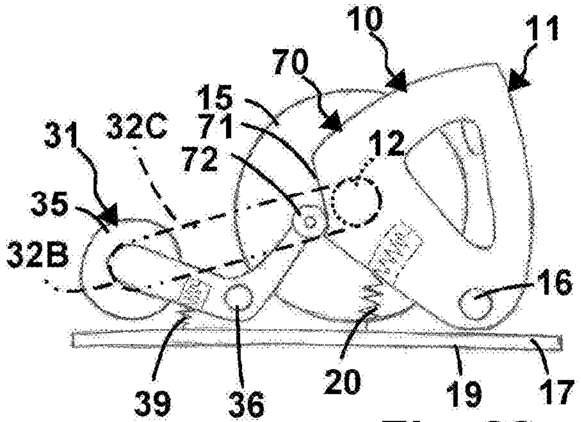
FIG. 33 shows a schematic view of the handheld machine saw according to the above figures from the side.

When a mechanical connection between the blocking elements 85A and 131 is possible with difficulty or not at all, for example, because a gearing establishing a coupling of the blocking elements 85A and 131 would be complex or has a high space requirement, an electrical coupling is also possible. For example, a sensor 101C is provided for detecting the position of the securing device 100, for example the positions of the actuating element 101. The sensor 101C detects, for example, whether the securing device 100 is in the securing position SG or in the saw operation position FS. In the saw operation position FS, the sensor 101C controls, for example, a The driving device 70 is schematically shown in FIG. 33. It can be seen that the operator can actuate the scoring assembly 31 from the inactive position in the direction of the active position by a pivot actuation of the saw assembly 11, wherein the force transmission takes place through the driving device 70. A scorer drive 32B of the scoring assembly 31 is schematically indicated, wherein, for example, a belt 32C or similar other force transmission element is movement coupled to the saw drive motor 32 and is driven thereby to drive the scorer toolholder 34. A tensioning roller, which is spring-loaded in particular, and/or a length compensation device or the like (not shown in the drawing), for example, can be provided to tension the belt.

Figure 34:
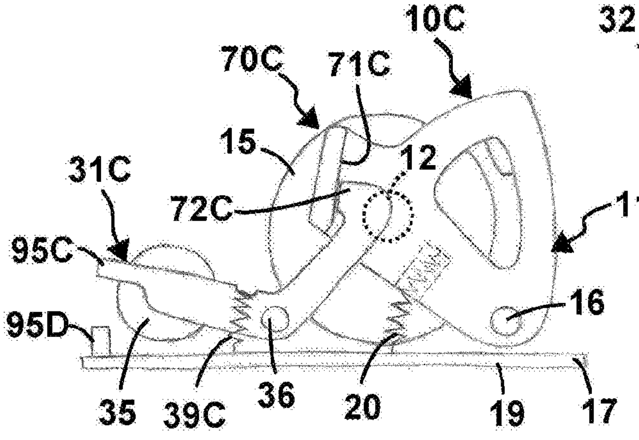
FIG. 34 shows a variant of the handheld machine saw according to FIG. 33 having another driving device.
Figure 35:
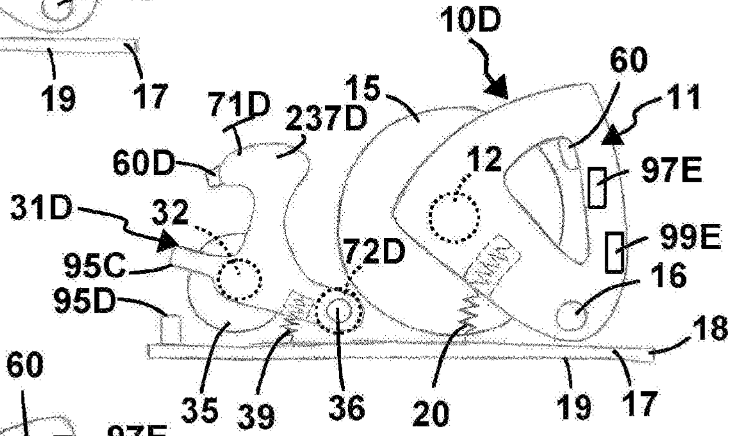
FIG. 35 shows a schematic view of a handheld machine saw having a manually and individually activatable scoring assembly.
Figure 36:
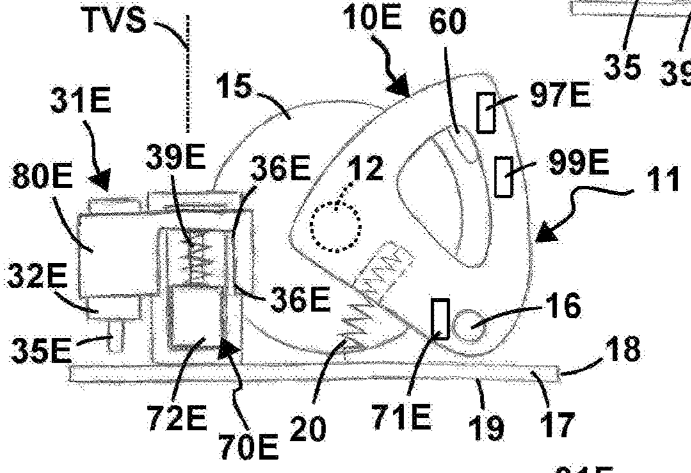
FIG. 36 shows a handheld machine saw having a scoring assembly which is adjustable by a motor.
Figure 37:
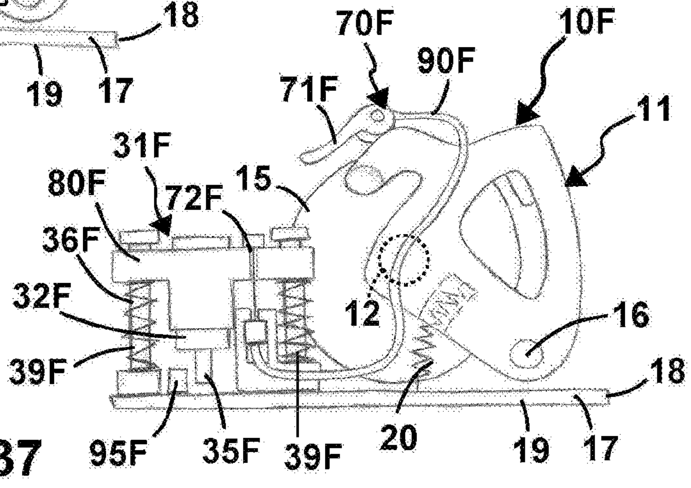
FIG. 37 shows a handheld machine saw having a scoring assembly manually actuatable via a force transmission element.
Figure 38:
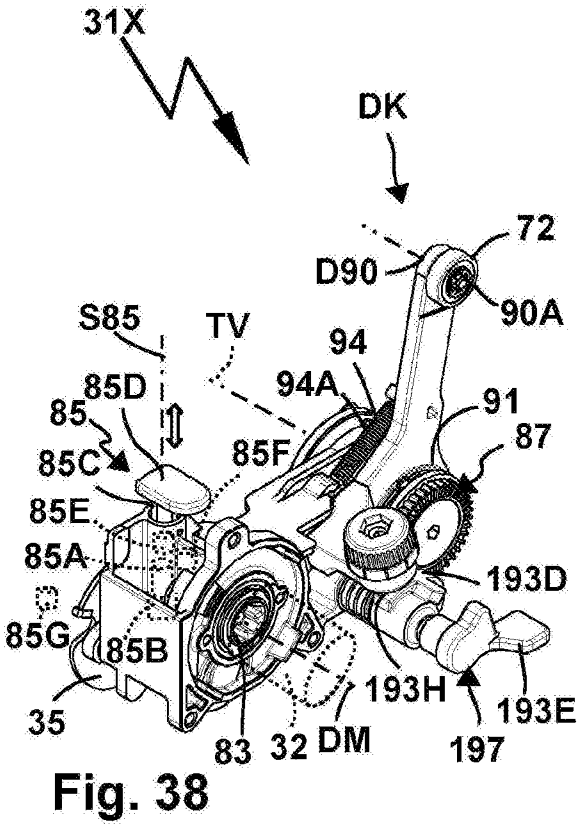
FIG. 38 shows a variant of the scoring assembly having alternative scorer depth setting means and an alternative deactivation device in a perspective diagonal view in a deactivation position.
Figure 39:
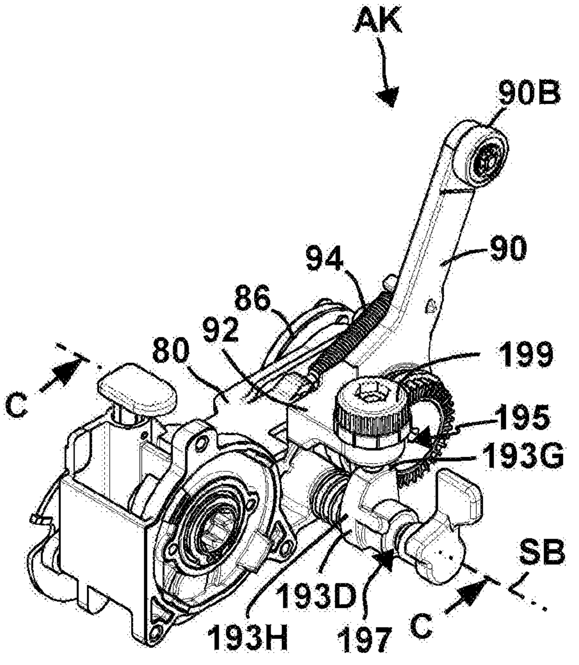
FIG. 39 shows the scoring assembly according to FIG. 38, but in the activation position.
Figure 41:
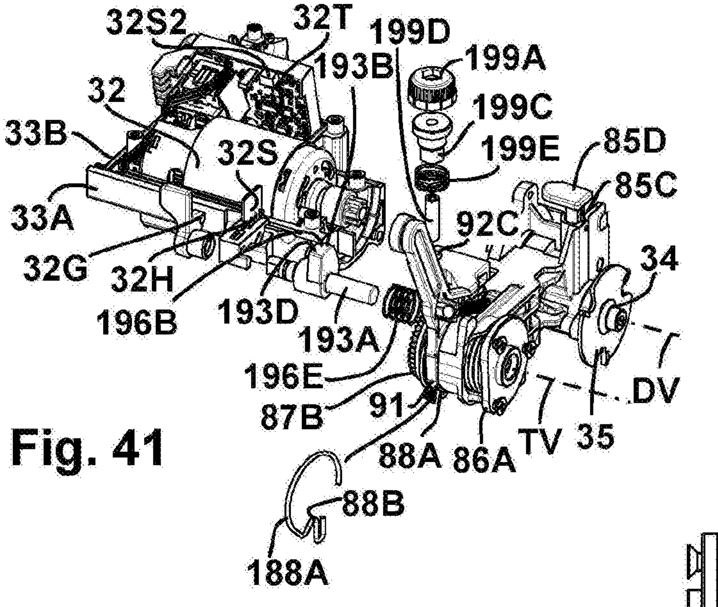
FIG. 41 shows an exploded illustration of the scoring assembly according to FIGS. 38-40.
Figure 40:
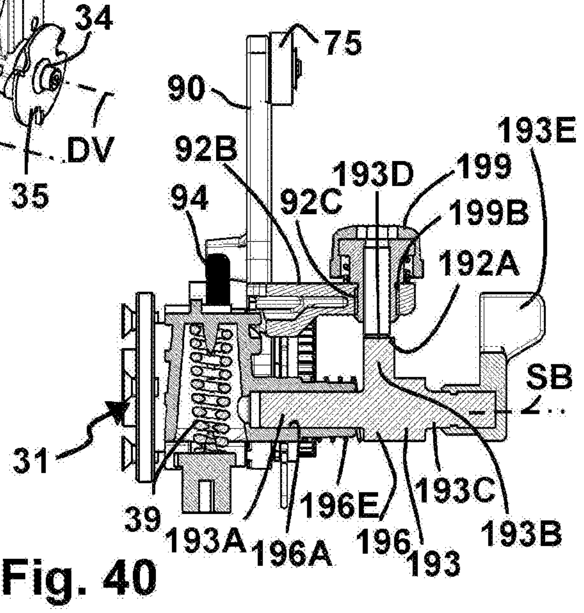
FIG. 40 shows a section along a line of section C-C in FIG. 39 through the scoring assembly.
Figure 42:
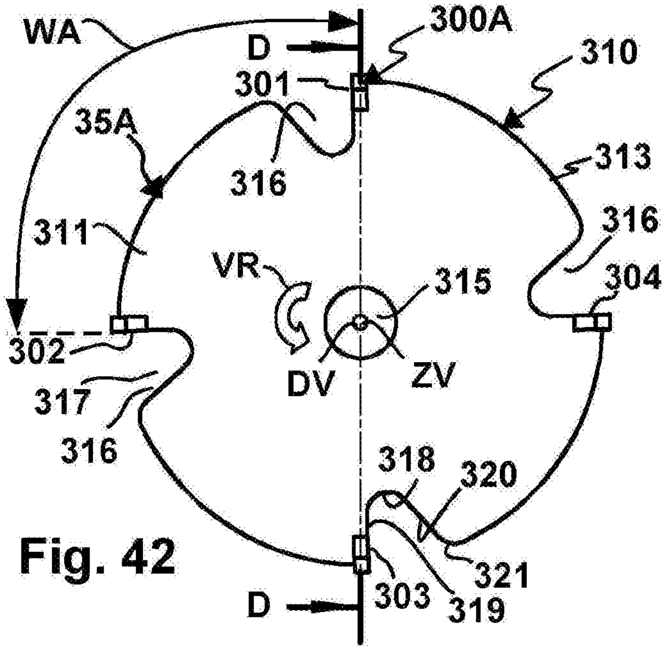
FIG. 42 shows a scoring tool having four scoring teeth.
Figure 44:
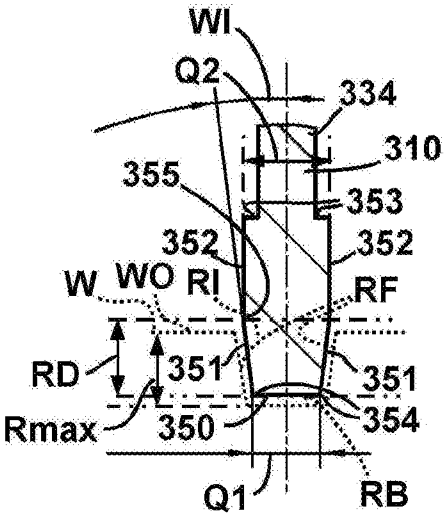
FIG. 44 shows a detail D5 from FIG. 43.
Figure 51:
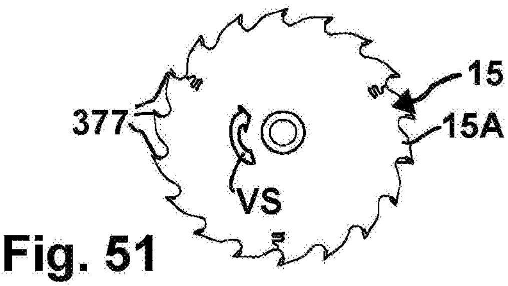
FIG. 51 shows a saw tool from the side.
Figure 43:
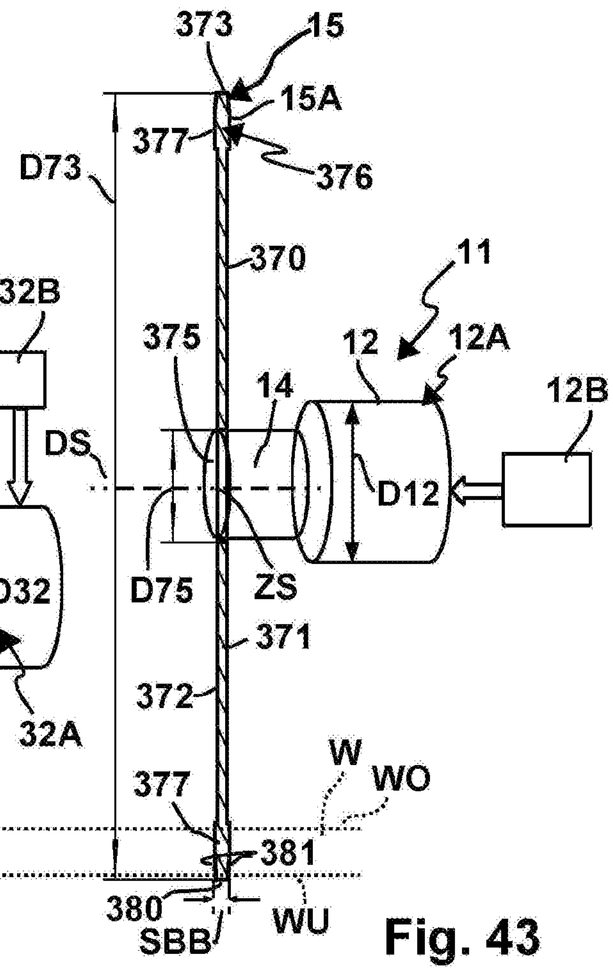
FIG. 43 shows a system comprising the scoring tool according to FIG. 42 in section along a line of section D-D and a saw tool.
Figure 43:
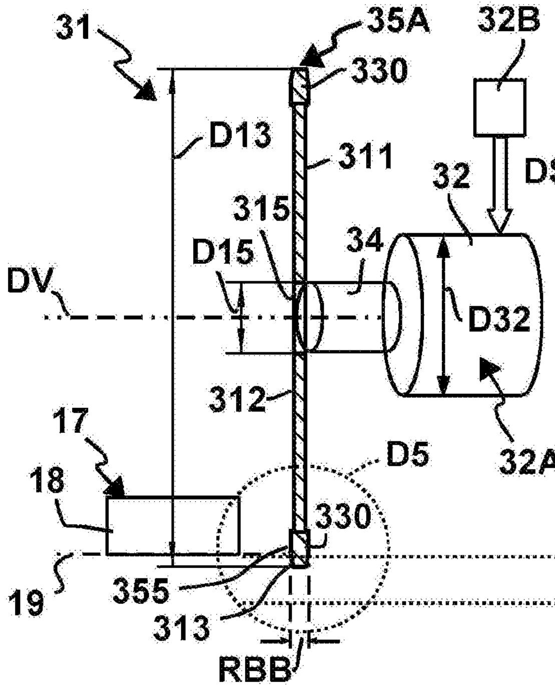
Figure 45:
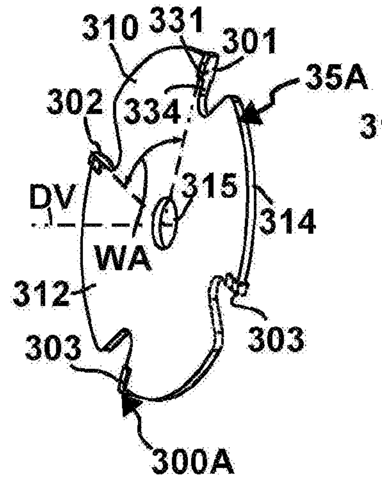
FIG. 45 shows the scoring tool according to FIG. 42 illustrated diagonally in perspective.
Figure 46:
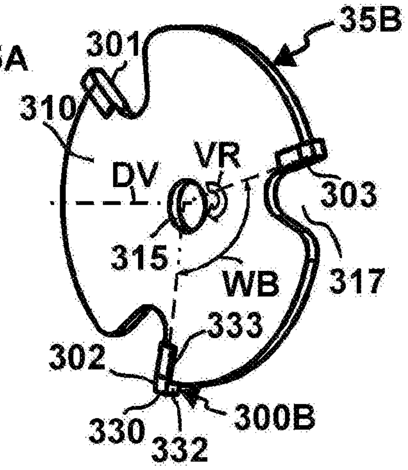
FIG. 46 shows a scoring tool having three scoring teeth.
Figure 47:
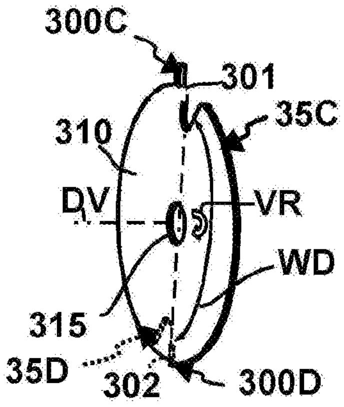
FIG. 47 shows a scoring tool having one scoring tooth, alternatively having two scoring teeth.
Figure 48:
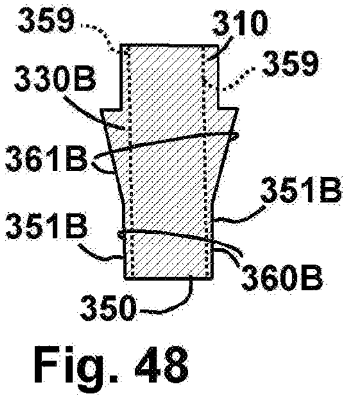
FIG. 48 shows another embodiment of a scoring tooth of a scoring tool, approximately corresponding to the detail D5 according to FIG. 44, having secondary cutting edge sections angled in relation to one another.
Figure 49:
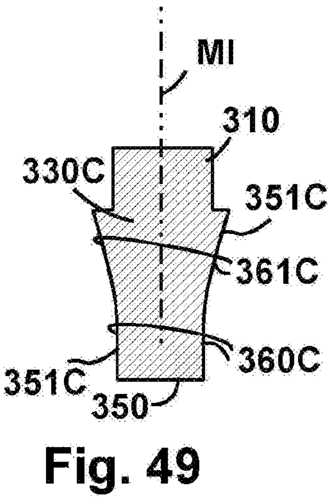
FIG. 49 shows an alternative embodiment of a scoring tooth, approximately like the scoring tooth according to FIG. 48, but having concave secondary cutting edges.
Figure 50:
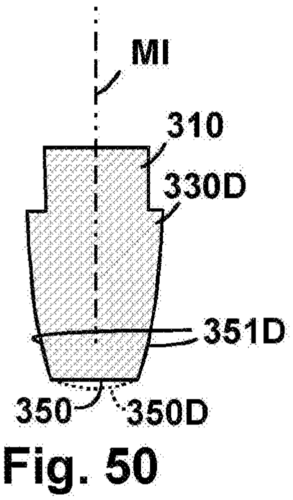
FIG. 50 shows a further embodiment of a scoring tooth having convex secondary cutting edges.

In the exemplary embodiment of the handheld machine saw 10C according to FIG. 34, a driving device 70C is provided, using which a scoring assembly 31C is carried along upon actuation of the saw assembly 11 from the upper depth setting position shown in the drawing in the direction of a lower depth setting position, in which the saw tool 15 protrudes in front of the guide surface 19. However, the scoring assembly 31C is loaded by a spring arrangement 39C in the direction of its active position, in which the scoring tool 35 protrudes in front of the guide surface 19, and not in the direction of its inactive position, as in the handheld machine saw 10.

A driving surface or stop surface is provided as the actuation generator 71C on the saw assembly 11, on which an actuation acceptor 72C of the scoring assembly 31C is supported. The actuation acceptor 72C is, for example, arranged on an actuating arm, which protrudes from the scoring assembly 31C starting from the scorer depth setting bearing 36. When the saw assembly 11 is adjusted in the direction of a lower depth setting position of the saw toolholder 34, the actuation generator 71C so to speak releases the actuation acceptor 72C, i.e., the spring arrangement 39C can adjust the scoring assembly 31C from the inactive position in the direction of the active position.

In the active position, the scoring assembly 31C advantageously stops with a stop projection 95C on a scorer depth stop 95D of the guide device 17. The depth stop 95D can be adjustable to set different depth setting positions or active positions, for example, if it is formed by the head of a screw that can be screwed into the guide device 17. The stop projection 95C is provided, for example, on a free end region of an arm of the scoring assembly 31C protruding from the depth setting bearing 36.

In the exemplary embodiment of the handheld machine saw 10D, no driving device is provided between its saw assembly 11 and its scoring assembly 31D. The scoring assembly 31D is pivotably mounted by means of the explained depth setting bearing 36 on the guide device 17 around the depth setting axis TV freely and independently of the saw assembly 11, but has to be manually actuated by an operator. For this purpose, for example, a scorer handle body 237D is provided, for example, in the manner of an actuating button which protrudes upward with respect to the guide device 17 from the scoring assembly 31D. Furthermore, the stop projection 95C for stopping on the depth stop 95D is advantageously provided on the scoring assembly 31D.

A switch 60D is arranged on the handle body 237D, for example, to switch on and/or switch off a drive motor 32 of the scoring assembly 31D. The handle body 237D thus forms an actuation generator 71D for the scoring assembly 31D.

A rotational drive for adjusting the scoring tool 35 between the active position and the inactive position and/or for setting its penetration depth into the workpiece is also possible, for example. For example, a positioning motor 72D could be arranged on the scorer depth setting bearing 36 and adjust the scoring tool 35 between various depth setting positions by rotational drive around the depth setting axis TV.

However, a motorized drive concept is also readily advantageous to adjust a scoring assembly between its inactive position and its active position, which is clear on the exemplary embodiment of the handheld machine saw 10E. Its saw assembly 11 is pivoted manually in the described manner by the operator between the upper depth setting position and one of the lower depth setting positions by means of the depth setting bearing 16, while a positioning motor 72E is provided for the adjustment of the scoring assembly 31E. A sensor is used as the actuation generator 71E of a driving device 70E, which detects the respective rotational positions or relative position of the saw assembly 11 with respect to the guide device 17, thus, for example, a respective set depth setting position. The sensor or actuation generator 71E is connected by means of a control connection, for example, a wireless or wired control connection (not shown in the drawing, however), to the positioning motor 72E, thus an actuation acceptor, of the scoring assembly 31E, to activate it. It is obvious that the positioning motor 72E can also be individually activatable, i.e., is decoupled from the actuation generator or sensor 71E. For example, a switching element 99E, which is electrical in particular, can be provided, using which an operator can individually activate the positioning motor 72E, for example, to introduce a score into a workpiece without a saw cut being produced or to adjust the scoring assembly 31E into the inactive position in order to only produce a saw cut using the saw tool 15. Furthermore, a deactivation device 97E is advantageous, for example, also an electrical switch, using which the positioning motor 72E is actuatable in the direction of the inactive position or upper position of the scorer toolholder 34E and/or using which energizing of the positioning motor 72E in the direction of the active position of the scorer toolholder 34E can be blocked.

The deactivation device 97E and/or the switching element 99E could readily be provided for activating the rotationally driving positioning motor 72D.

In contrast to the above-described scoring assembly, the scoring assembly 31E is not pivotably mounted with respect to the guide device 17, but rather displaceably mounted along a depth setting axis TVS by means of a slide bearing 36E. A spring 39E acts on, for example, a scorer carrier 80E, on which a scorer drive motor 32E is held, in the direction of an inactive position, in which a scoring tool 35E driven by the scorer drive motor 32E is adjusted back behind the guide surface 19. The positioning motor 72E acts in the opposite direction to the spring 39E, thus actuates the scoring tool 35E in the direction of the active position, so that the scoring tool 35E protrudes in front of the guide surface 19 and can engage in the workpiece. However, a depth setting, i.e., a setting of the penetration depth of the scoring tool 35E into the workpiece W, is also settable by means of the positioning motor 72E.

A scoring assembly 31F of a handheld machine saw 10F is also linearly adjustable, namely along a depth setting axis TVS by means of a depth setting bearing, in particular a slide mount 36F. The slide mount 36F comprises, for example, guide rods or support columns, on which a scorer carrier 80F is displaceably mounted with respect to the depth setting axis TVS. The scorer carrier 80F is acted on by a spring arrangement 39F in its inactive position, in which the scoring tool 35F does not protrude in front of the guide surface 19. The scoring tool 35F could comprise a saw blade or scoring blade as such, but is advantageously also a milling tool or milling head like the scoring tool 35E. The scoring tool 35F is driven by a scorer drive motor 32F.

The scoring assembly 31F is also adjustable independently of the saw assembly 11 between its inactive position and one or more active positions.

In contrast to the handheld machine saw 10E, however, the scoring assembly 31F is not adjustable by motor between the active position and the inactive position, but rather manually. A spring arrangement 39F loads the scorer carrier 80F in the inactive position. In the direction of the active position, a hand lever or other actuating element pivotably mounted on the saw assembly 11 is provided as an actuation generator 71F, which actuates a force transmission element 90F by manual actuation, for example, a Bowden cable, cable pull, a pneumatic or hydraulic line, or the like, which acts on an actuation acceptor 72F, for example, a fluidic cylinder, a positioning drive, or the like, to adjust the scoring tool 35 in the direction of the active position against the force of the spring arrangement 39F, wherein this movement is advantageously limited by a depth stop 95F, which is arranged fixed in place on the guide device 17.

A scoring assembly 31X essentially corresponds to the scoring assembly 31, but has alternative depth setting means 195. While the depth setting means 95 effectuate the depth setting by means of the positioning body 93, which supports the actuating arm 92, a depth setting element 199 is arranged on the actuation acceptor arm 90, for example, on an actuating arm projection 92B protruding from the actuating arm 92, and supports itself on a positioning body 193.

The depth setting element 199 has an actuating element 199A, which is connected to a screw section 199B or comprises it. The screw section 199B is screwed into a screw receptacle 92C on the actuating arm projection 92B. The screw section 199B is arranged on a screw body 199C, which is screwed into the screw receptacle 92C. The screw body 199C is connected, on the one hand, to the actuating element 199A and, on the other hand, accommodates a support body 199D, which is pin-like or elongated, for example. A free end region of the support body 199D provides an actuating surface 192A, using which the actuation acceptor arm 90 is actuatable.

The two-part construction made of support body 199D and screw body 199C has the advantage that the support body 199D is positionable relative to the screw body 199C and is then fixable there, for example can be adhesively bonded, to calibrate a first depth setting position or original depth setting position in a fixed manner, which the scoring assembly 31X is to assume. Manufacturing tolerances can thus be compensated for, for example. However, it is readily possible that the depth setting element 199 is in one piece or parts thereof, for example, the support body 199D and the screw body 199C, consist of one part.

Between the actuating element 199A representing so to speak a head of the depth setting element 199 or screw body 199C, on the one hand, and the actuating arm projection 92B, on the other hand, a spring 199E is preferably arranged, which is provided, for example, for a lock and/or a friction lock, to fix the depth setting element 199 in the respective set depth setting position, for example, to clamp it or hold it by friction locking. Inadvertent adjustment movements, in particular triggered by vibrations or the like, can thus be prevented or reduced, for example.

The scorer depth setting means 195 cooperate with a deactivation device 197 and with a positioning body 193. The positioning body 193 protrudes laterally from the scorer carrier 80, similarly to the positioning body 93. However, in contrast to the positioning body 93, the positioning body 193 is pivotably mounted, namely around a pivot axis or positioning axis SB. The positioning axis SB corresponds to the longitudinal axis or longitudinal extension of the positioning body 193.

A longitudinal end or bearing end 193A of the positioning body 193, which is designed, for example, like a bearing pin, is pivotably mounted in a bearing receptacle 196, which is arranged fixed in place on the carrier 80, namely around the positioning axis SB. The bearing receptacle 196A is designed, for example, like a receptacle sleeve or a receptacle tube. The bearing receptacle 196A is provided, for example, on a bearing body 196, which protrudes from the scorer carrier 80 transversely to its longitudinal extension, in particular perpendicularly transversely.

A middle section 193C of the positioning body 193 has a positioning contour 193D, on which the depth setting element 199 is supported with its actuating surface 192A. The positioning contour 193D is located between the longitudinal end or bearing end 193A and an actuating element 193E, for example a handle, which protrudes transversely to the positioning axis SB from the positioning body 93 and can be grasped comfortably by an operator.

The positioning contour 193D has positioning sections 193G and 193H, which are formed by an eccentric circumferential form of the positioning contour 193D with respect to the pivot axis or positioning axis SB. The positioning section 193G is assigned to the activation position AK of the deactivation device 197 and protrudes farther in front of the positioning axis SB than the positioning section 193H, which is assigned to the deactivation position DK. The positioning section 193H thus deflects the depth setting element 199 a lesser distance from the positioning axis SB, whereby the actuation acceptor arm 90 is more remote due to the spring force of the spring arrangement 94 from the actuation generator 71, the guide link 74, than in the activation position AK. This is because the positioning section 193G, which protrudes farther in front of the positioning axis SB, acts in a position deflecting or actuating the actuation acceptor arm 90 farther in the direction of the actuation generator 71, in which the actuation acceptor 72 is in contact with the actuation generator 71.

A spring 196E supports itself on one side on a step of the positioning body 193, on the outer circumference of which the positioning contour 193D is provided, and on the other side on a step on the outer circumference of the bearing body 196 and thus loads the positioning body in terms of a friction lock or a lock in the respective set deactivation position DK or activation position AK. For example, the spring 196E presses a radial projection or flange projection 193B, on the outer circumference of which the positioning contour 193D is arranged, against a support surface 196B. The support surface 196B is provided, for example, on the motor housing 33A.

The scorer drive motor 32 is regularly switched on and switched off by the switch 60A when the saw drive motor 12 is switched on and switched off. In the deactivation position DK of the deactivation device 197, however, the scorer drive motor 32 is not required. It is not problematic per se when the scorer drive motor 32 is energized, even if the scoring assembly 31 or 31X is in its deactivation position DK and/or is in its inactive position IP. The scoring tool 35 is then driven, but does not protrude in front of the guide surface 19 in the sense of engaging in the workpiece W and/or is accommodated in the protective housing 29. The scorer drive motor 32 can advantageously be switched off in this situation, however, for example by a switch 32S and/or 32S2. The switch 32S or 32S2 is, for example, a component of a control device 32T, which is arranged in the motor housing 33A, or is assigned thereto.

The motor housing 33A has, for example, a receptacle part or lower part 33B and a cover 33C which, in the closed state, encapsulates or encloses the scorer drive motor 32 and the control device 32T, so that these electrical components are protected from environmental influences.

The switch 32S or 32S2 comprises, for example, a magnetic sensor or other sensor operating in a contactless manner or is formed thereby. The switch 32S is arranged, for example, on a carrier 32H, for example a printed circuit board, outside the motor housing 33A and communicates with the control device 32T. The switch 32S2 provided alternatively or additionally to the switch 32S is accommodated protected in the interior of the motor housing 33A and is, for example, a component of the control device 32T. An actuating element 32G, for example, a magnetic encoder or the like, is provided for actuating the switch 32S or 32S2. The actuating element 32G is actuatable by the positioning body 193. For example, the actuating element 32G is accommodated in a holding receptacle of the positioning body 193, for example in a pocket. The actuating element 32G could readily also be arranged on the positioning body 93. In any case, the actuating element 32G is, for example, displaceable along the positioning axis SA and/or pivotable around the positioning axis SA or SB, so that its relative position to the sensor or switch 32S or 32S2 changes. The switch 32S communicates with the control device 32T and transmits the respective position of the actuating element 32G thereto. As a function of the respective position of the actuating element 32G to the switch 32S, it or the control device 32T switches the scorer drive motor 32 on or off, namely on in the activation position AK and off in the deactivation position DK of the positioning body 93 or 193.

The scoring tool 35 is explained hereinafter in embodiments 35A, 35B, 35C, 35D. Insofar as the above-mentioned scoring tools 35-35 D have the same components, reference is also made very generally to a scoring tool 35.

For example, each scoring tool 35 has a blade body 310 having mutually opposing flat sides 311, 312. In the scoring tools 35A, 35B, 34C, 35D, scoring tooth arrangements 300A, 300B, 300C, 300D are arranged on a radial outer circumference of the blade body 310. Scoring tooth arrangements 300A, 300B, 300C, 300D have different numbers of scoring teeth 301-304. For example, the scoring tooth arrangement 300A has scoring teeth 301, 302, 303, 304, thus a total of four scoring teeth, while the scoring tooth arrangement 300B only has three scoring teeth 301, 302, 303 and the scoring tooth arrangement 300C has only one scoring tooth 301 and finally the scoring tooth arrangement 300D has only two scoring teeth 301, 302.

The blade body 310 has a machine receptacle 315 at its center ZV for detachable fastening on the scorer toolholder 34 of the machine saw 10. The center ZV is penetrated by a center axis or axis of rotation DV of the scoring tool 35, which is the axis of rotation of the scorer toolholder 34 at the same time, when the scoring tool 35 is fastened on the machine saw 10.

The scoring teeth 301-304 protrude with main cutting edges 350 from a radial outer circumference 313 of the blade body 310 or scoring tool 35, so that they are ready there to cut into the workpiece surface WO of the workpiece W.

The scoring teeth 301-304 thus protrude from a radial outer circumferential surface 314 of the blade body 310. The circumferential surface 314 essentially has the form of a cylindrical jacket.

Comparatively large angle intervals are present between the scoring teeth 301-304. For example, in the scoring tool 35, angle intervals WA of approximately 90° or exactly 90° are provided between the scoring teeth 301-304. In the scoring tool 35B, angle intervals WB of, for example, 120° are provided between the scoring teeth 301-303. In the scoring tool 35C, only a single scoring tooth 301 is present, which results in an angle interval of 360°. If two scoring teeth 301, 302 are provided in the case of the scoring tooth arrangement 300D, they are preferably equidistant to one another and have an angle interval WD of 180°.

It is to be mentioned at this point that of course different angle intervals can also be provided between scoring teeth. For illustration, for example, in the scoring tool 35A, the scoring tooth 303 is shown by dashed lines. It could not be present, for example.

A chip space 316 is provided in front of each scoring tooth 301-304. The chip space 316 is formed by a depression 317 of the blade body 310, which is designed radially inward from the radial outer circumference 313 like a trough, in particular an approximately U-shaped or V-shaped trough. Each depression 317 or each chip space 316 has a bottom 318, from which lateral surfaces 319, 320 extend away in the direction of the radial outer circumference 313. The lateral surfaces 319, 320 are essentially linear. The lateral surface 319 faces toward a respective main cutting edge 350 of a scoring tooth 301-304, while the lateral surface 320 of the chip space 316 is so to speak opposite to this main cutting edge 350. An arc-shaped transition part 321 extends between the lateral surface 320 and the radial outer circumference 313 or the circumferential surface 314.

Except for the chip spaces 316, the radial outer circumference 313 extends in the form of a circle or circular ring around the center axis of the blade body 310 or scoring tool 35, thus the axis of rotation DV. Thus, for example, this arc-shaped profile extends over an angle of at least 30°, preferably at least 40° or even more with respect to the axis of rotation DV, even if four scoring teeth 301-304 are provided in the case of the scoring tool 35A.

These scoring teeth 301-304 each have a cutting body 330. Each cutting body 330 is fastened using a fastening part 331 on the blade body 310, in particular on the lateral surface or close to the lateral surface 319. For example, the lateral surface 319 has a step into which the respective cutting body 332 is inserted. For example, the fastening part 331 is accommodated in such a step. The fastening part 331 of the cutting body 332 is supported at the rear on the blade body 310.

Sections 332 of the cutting body 330 protrude radially outward with respect to the axis of rotation DV from the blade body 310. Lateral sections 333 of the cutting body 330 protrude from the flat sides 311, 312. The sections 332, 333 are therefore mechanically loaded in working operation of the scoring tool 35, thus when it cuts into the workpiece W, but are optimally supported by the fastening part 331. Furthermore, it is advantageous if the cutting bodies 330 have support projections 334 protruding radially inward, which are also supported on the blade body 310.

The cutting teeth 301-304, therefore the cutting bodies 332, have the main cutting edges 350, which extend, for example, in parallel to the axis of rotation DV or center axis of the scoring tool 35.

Secondary cutting edges 351 extend transversely to the main cutting edge 350. The secondary cutting edges 351 are, for example, somewhat more than perpendicular, thus, for example, in an angle range of 90-110°, with respect to the main cutting edge 350, which is located between the secondary cutting edges 351. For example, the main cutting edge 350 and the respective adjacent cutting edge 351 enclose an angle 354 which is at least 90° and at most 110°. In the exemplary embodiment, an angle dimension WI of the angle 354 is, for example, approximately 7°.

The secondary cutting edges 351 extend radially inward with respect to the axis of rotation DV, wherein radially inner end regions 355 have a radial distance RD to the main cutting edge 350. The secondary cutting edges 351, which extend slightly or flatly obliquely inclined with respect to the flat sides 311, 312, enable the production of the score RI in different depths, wherein the transverse width of the respective score RI increases when the scoring tool 35 plunges or penetrates deeper into the workpiece surface WO. The maximum depth Rmax of the score RI is thus fundamentally determined by the radial distance RD.

However, the score RI could be produced even deeper in the present case, specifically, for example, if side parts 352 of the cutting bodies 332 or scoring teeth 301-304 are also designed as cutting edges. The side parts 352 extend, for example, in parallel to a center plane of the blade body 310 or perpendicular to the axis of rotation DV.

A score RI produced by the scoring tool 35 has a score bottom RB, from which side flanks RF extend up to the workpiece surface WO. A transverse width of the bottom RB is determined by the transverse distance Q1 of the secondary cutting edges 351 in the region of the main cutting edge 350 or the length of the main cutting edge 350.

A step 353 is formed between the radially inner ends of the side parts 352 and the respective flat side 311, 312.

The saw tool 15 comprises, for example, a saw blade 15A. A blade body 370 of the saw blade 15A has mutually opposing flat sides 371, 372 and a saw tooth arrangement 376 having saw teeth 377 on its radial outer circumference 373 with respect to the axis of rotation DS, around which the saw blade 15A rotates during saw operation.

The number of the saw teeth 377 is greater than the number of the scoring teeth 301-304. Furthermore, the saw teeth 377 have a smaller angle interval with respect to the axis of rotation DS, around which the saw blade 15A is driven, than the scoring teeth 301-304 with respect to the axis of rotation DV.

The saw tool 15 is provided and designed for sawing or cutting into the workpiece W from its lower side WU. At its center ZS, the saw blade 15A has a machine receptacle 375, which is penetrated by the axis of rotation DS or center axis of the saw blade 15A.

The radial outer circumference 373 has an external diameter D73, which is, for example, three to four times greater than an external diameter D13 of the outer circumference 313 of the scoring tool 35.

An internal diameter D75 of the machine receptacle 375 of the saw blade 15A is greater than an internal diameter D15 of the machine receptacle 315 of the scoring tool 35.

A maximum transverse width of the score RI in the region of the workpiece surface is settable in that the scoring tool 35 penetrates to different depths into the workpiece surface WO. A maximum width of the score RI, thus a maximum distance of the score side flanks RF, is determined by a transverse distance Q2, which the secondary cutting edges 351 have in relation to one another in the region of the maximum radial distance RD. The score RI can thus be at most as wide as the transverse distance Q2.

Such an adaptation is advantageous in particular because the scoring tool 35 can thus be used in conjunction with different saw tools or saw blades, but in any case with saw tools, the cutting width or cut width of which (in relation to the respective length parallel to the axis of rotation DS), can be different. The above-mentioned adaptation is also advantageous in conjunction with manufacturing tolerances or dimensional tolerances of the saw tool or saw blade and/or in the case of different plunging depths of the saw blade into the workpiece or the like.

The scoring tool 35A can be adjusted with respect to its penetration depth into the workpiece W. The scorer toolholder 34 is a component of the scoring assembly 31, which has a scorer drive 23A. The scorer drive 32A comprises a scorer drive motor 32, which drives the scorer toolholder 34 directly or via a gearing (not shown in the schematic illustration), on which the scoring tool 35 is in turn arranged. For example, a mounting flange penetrates the machine receptacle 315. For example, a stepped gearing can be provided between the drive motor 32 and the tool holder 34, so that the axis of rotation of the toolholder 34 and the motor axis of rotation of the drive motor 32 do not align, in particular the motor axis of rotation of the drive motor 32 has a greater distance to a region of the scoring tool 35 which is provided to penetrate into the workpiece W than the drive axis of rotation DV.

The saw toolholder 14, on which the machine receptacle 375 is arranged, is drivable by a saw drive motor 12, for example directly or via a gearing (not shown in the drawing).

The scoring assembly 31 is also arranged, like a saw assembly 11, on a guide device 17, for example movably on a guide body 18 of the guide device 17. Its guide surface 19 is provided for guiding along the workpiece surface WO. Both the saw toolholder 14 and also the scorer toolholder 34 are adjustable in depth with respect to the guide surface 19, so that they protrude different distances in front of it. Penetration depths of the scoring tool 35 and the saw tool 15 into the workpiece W are thus settable.

The saw tool 15 is now set or settable so that is its main cutting edges 380 cut into the workpiece W from the workpiece lower side WU. In addition, secondary cutting edges 381 extend adjacent to the main cutting edges 380 at an angle thereto, which so to speak produce the side flanks of the saw cut SAE, which can be cut using the saw tool 15 into the workpiece W. In any case the saw cut SAE has a saw cut width SBB, which is effectuated by the length of the main cutting edges 380, on the one hand, also by the secondary cutting edges 381, on the other hand, which are inclined, for example, obliquely to the main cutting edge 380 similarly as the secondary cutting edges 351 to the main cutting edges 350.

Since the saw teeth 377 cut into the workpiece W from the workpiece lower side WU and thus move out of it on the workpiece upper side WO, this has the risk that the side flanks of the saw cut SAE will tear out in the region of the workpiece upper side WO. The scoring tool 35 is now to be set or is set with respect to its penetration depth into the workpiece W or the amount by which the scoring tool 35 protrudes in front of the guide surface 19 so that score RI has a score width RBB at the workpiece surface WO which is greater than saw cut width SBB. The saw tool 15 or saw blade 15A then emerges from the workpiece W between the side flanks RF of the score RI at the workpiece surface WO. Thus, for example, if a cover or a coating, a veneer, or the like is arranged on the workpiece surface WO, the cover or the coating is not tangent to or damaged by the saw teeth 377 emerging from the workpiece W.

The oblique inclination of the side flanks RF has the advantage that the score RI has a slight chamfer or bevel in the transition region to the workpiece surface WO.

The saw drive motor 12 has an external diameter D12, the scorer drive motor 32 has an external diameter D32. In relation to the external diameter of the respective driven scoring tool 35 or saw tool 15, the external diameter D12 of the saw drive motor 12 is less than the external diameter D32 of the scorer drive motor 32. Therefore, for example, the ratio of the external circumference D73 to the external circumference D12 or the quotient of external circumference D73 to external circumference D12 is greater than the ratio of the external circumference D13 to the external circumference D32 or the quotient of external circumference D13 to external circumference D32 of the scorer drive motor 32.

Speeds of the saw toolholder 14 and the scorer toolholder 34 can be settable, for example, by means of setting means 12B and/or 32B. It is possible that the scorer toolholder 34 is always operated at the same speed, while the speed of the saw toolholder 14, for example, the speed of the saw drive motor 12, is settable. The configuration is made here so that the scorer toolholder 34 is driven or drivable at at least twice the speed, preferably three times or four times the speed of the saw toolholder 14.

Furthermore, rotational directions VS, VR of the toolholders 14, 34 are opposite. The toolholder 34 for the scoring tool 35 is driven, for example, with the rotational direction VR, which corresponds to a reverse cut saw. The rotational direction VR thus has the effect that the scoring tool 35 so to speak conveys or drives the machine saw 10 along the workpiece W.

The rotational direction VS of the saw toolholder 14 is chosen so that force is applied to the guide surface 19 in the direction of the workpiece surface WO.

In the cutting body 330, the secondary cutting edges and main cutting edges are linear. Alternatively, however, main cutting edges and secondary cutting edges having curved, for example convex or concave profiles, also in combination, or also secondary cutting edges and/or main cutting edges having sections of different inclination and/or curvature are possible.

For example, a cutting body 330B has a main cutting edge 350 having a linear profile, while secondary cutting edges 351B, between which the main cutting edge 350 is arranged, have edge sections 360B, 361B. The edge sections 360B are, for example, linear profiles. The edge sections 360B are, for example, perpendicular to the main cutting edge 350. In contrast, the sections 361B are flatly obliquely inclined with respect to the sections 360B and have an angle of for example, 103-105° with respect to the main cutting edge 350.

A cutting body 330C also has the main cutting edge 350, but secondary cutting edges 351C having sections 360C and 361C. The sections 360C are concave with respect to a center plane MI, which extends between the flat sides 311 and 312 of the blade body 310, but with lesser curvature than the sections 361C.

To illustrate a convex profile, a cutting body 330D is shown, the secondary cutting edges 351D of which are concave with respect to the center plane MI.

Alternatively to the linear main cutting edge 350, for example, the main cutting edge 350D can be provided, which has a convex profile in a direction away from the blade body 310.

Furthermore, it is advantageous if the cutting bodies or scoring teeth of a scoring tool are so to speak symmetrical, i.e., form a cutting edge on mutually opposing sides and thus in the region of each flat side 311, 312. However, it is also possible that scoring teeth or cutting bodies have a cutting edge only on one flat side 311 or 312. This is schematically indicated in the cutting body 330B. For example, instead of a right secondary cutting edge 351B in the drawing, a lateral surface 359 can be provided on a cutting body 330B, which does not protrude from the flat side 311, and on a following or leading cutting body 330B in the circumferential direction of the blade body 310 or scoring tool 35, a lateral surface 359 not protruding from the flat side 312 can be provided instead of a left secondary cutting edge 351B in the drawing.

The invention claimed is:

1. A mobile handheld machine saw having a saw assembly, which has a saw toolholder for a saw tool, and a saw drive motor for driving the saw toolholder, and having a guide device, which has a guide body having a guide surface extending along a longitudinal axis for guiding the handheld machine saw along a working direction on a workpiece or a guide rail and, on its upper side opposite to the guide surface, the saw toolholder as a whole is movably mounted by means of a saw depth setting bearing between an upper depth setting position and at least one lower depth setting position, in which the saw toolholder is adjusted closer to the guide surface than in the upper depth setting position, so that the saw tool, to introduce a saw cut into the workpiece, protrudes farther from the guide surface in the lower depth setting position than in the upper depth setting position, wherein the hand-held machine saw further comprises a scoring assembly, arranged in front of the saw assembly on the guide device with respect to the working direction, having a scorer toolholder for a scoring tool and having a scorer drive for driving the scorer toolholder, which is movably mounted on or with respect to the guide device by means of a scorer depth setting bearing, which is separate from the saw depth setting bearing, between at least one active position, in which the scoring tool arranged on the scorer toolholder protrudes from the guide surface to introduce a score, which is upstream in the working direction from a saw cut to be introduced, into the workpiece, and an inactive position, in which the scoring tool is adjusted behind the guide surface, and wherein the scoring assembly is configured to introduce the score using the scoring tool into an upper side surface of the workpiece, and the saw assembly is configured to introduce the saw cut using the saw tool from a lower side surface of the workpiece opposite the upper side surface, the upper side surface of the workpiece being closer to the guide surface of the guide device than the lower side surface of the workpiece, and wherein the saw depth setting bearing is spaced a longitudinal distance along the guide body with respect to the working direction from the scorer depth setting bearing, and wherein the scorer depth setting bearing is a pivot bearing, which pivotably mounts the scorer toolholder around a depth setting axis, and wherein the depth setting axis of the scorer depth setting bearing is arranged between the scorer toolholder and the saw toolholder on the guide device.

2. The handheld machine saw as claimed in claim 1, further comprising scorer depth setting means for setting a distance of the scorer toolholder to the guide device or the guide surface or for setting a penetration depth of the scoring tool into the workpiece in the at least one active position.

3. The handheld machine saw as claimed in claim 2, wherein an actuation distance is provided between the scorer toolholder and an actuating surface, with which an actuation acceptor of the driving device is engaged or in contact with an actuation generator of the driving device, and the scorer depth setting means for setting the actuation distance are designed so that by setting the actuation distance, the distance of the scorer toolholder to the guide device or the guide surface or the penetration depth of the scoring tool into the workpiece is settable or is set in the at least one active position.

4. The handheld machine saw as claimed in claim 3, wherein the scorer depth setting means have a positioning body, which is adjustable between at least two positioning positions to set different distances of the scorer toolholder to the guide device or the guide surface or to set the penetration depth of the scoring tool into the workpiece in the at least one active position, wherein the positioning body is designed to adjust the deactivation device between the activation position and the deactivation position.

5. The handheld machine saw as claimed in claim 4, wherein the scorer depth setting means have a depth setting element, which is supported on a positioning contour of the positioning body and is adjustable between at least two depth setting positions to set a distance of the scorer toolholder to the guide device or the guide surface or to set the penetration depth of the scoring tool into the workpiece in the at least one active position.

6. The handheld machine saw as claimed in claim 5, wherein the positioning contour has a positioning section assigned to the activation position and a positioning section assigned to the deactivation position, which actuate the depth setting element to set the penetration depth of the scoring tool into the workpiece differently by adjustment, of the positioning body.

7. The handheld machine saw as claimed in claim 4, wherein the positioning body has a positioning surface for acting on an actuating surface of the actuation acceptor, which is arranged on the actuation acceptor or is operationally connected to the actuation acceptor.

8. The handheld machine saw as claimed in claim 7, wherein by way of an adjustment of the positioning body between the positioning positions assigned to the activation position and the deactivation position, the positioning surface of the positioning body can be engaged with or disengaged from the actuating surface of the actuation acceptor or the actuating surface of the actuation acceptor is adjusted into a position assigned to the active position or the inactive position.

9. The handheld machine saw as claimed in claim 4, wherein the positioning body, while remaining in the respective positioning position, is adjustable, between an inactive position assigned to the deactivation position, in which the actuation acceptor is disengaged from or out of contact with the actuation generator, and an active position assigned to the activation position, in which the actuation acceptor is in contact or engaged with the actuation generator.

10. The handheld machine saw as claimed in claim 4, wherein the scorer depth setting means have a scorer depth stop, which is adjustable between at least two stop positions, in which the scorer toolholder has different distances to the guide device or the guide surface, or in which the scoring tool protrudes different distances in front of the guide surface.

11. The handheld machine saw as claimed in claim 1, further comprising a saw depth setting device for setting at least one of the lower depth setting positions of the saw toolholder, wherein the saw depth setting device has a depth stop holder, on which a depth setting stop, on which the saw assembly stops during the adjustment by means of the saw depth setting bearing, is fixable in at least two depth stop positions.

12. The handheld machine saw as claimed in claim 11, wherein the driving device comprises an actuation generator having a guide link, and wherein the guide link and the depth stop holder have sections extending in an arc shape arranged adjacent to one another.

13. The handheld machine saw as claimed in claim 1, wherein the saw depth setting bearing is a pivot bearing, which pivotably mounts the saw toolholder around a depth setting axis.

14. A handheld machine saw having a saw assembly, which has a saw toolholder for a saw tool, and a saw drive motor for driving the saw toolholder, and having a guide device, which has a guide body having a guide surface extending along a longitudinal axis for guiding the handheld machine saw along a working direction on a workpiece or a guide rail and, on its upper side opposite to the guide surface, the saw toolholder as a whole is movably mounted by means of a saw depth setting bearing between an upper depth setting position and at least one lower depth setting position, in which the saw toolholder is adjusted closer to the guide surface than in the upper depth setting position, so that the saw tool, to introduce a saw cut into the workpiece, protrudes farther from the guide surface in the lower depth setting position than in the upper depth setting position, wherein the hand-held machine saw further comprises a scoring assembly, arranged in front of the saw assembly on the guide device with respect to the working direction, having a scorer toolholder for a scoring tool and having a scorer drive for driving the scorer toolholder, which is movably mounted on or with respect to the guide device by means of a scorer depth setting bearing, which is separate from the saw depth setting bearing, between at least one active position, in which the scoring tool arranged on the scorer toolholder protrudes from the guide surface to introduce a score, which is upstream in the working direction from a saw cut to be introduced, into the workpiece, and an inactive position, in which the scoring tool is adjusted behind the guide surface, and wherein the scoring assembly is configured to introduce the score using the scoring tool into an upper side surface of the workpiece, and the saw assembly is configured to introduce the saw cut using the saw tool from a lower side surface of the workpiece opposite the upper side surface, the upper side surface of the workpiece being closer to the guide surface of the guide device than the lower side surface of the workpiece, and wherein the saw depth setting bearing is spaced a longitudinal distance along the guide body with respect to the working direction from the scorer depth setting bearing, and wherein the scorer toolholder is acted upon by a scoring assembly spring arrangement in the inactive position, wherein the scoring assembly spring arrangement is separate from a spring arrangement loading the saw assembly or the saw toolholder in the upper depth setting position.

15. The handheld machine saw as claimed in claim 13, wherein the saw depth setting bearing is arranged in the working direction behind the saw toolholder or the scorer depth setting bearing is arranged in the working direction behind the scorer toolholder on the guide device or wherein the scorer depth setting bearing is arranged in the working direction between the scorer toolholder and the saw toolholder on the guide device.

16. The handheld machine saw as claimed in claim 1, wherein the saw toolholder, as a whole, or the scorer toolholder, as a whole, is pivotably mounted on the guide device by means of a miter bearing arrangement around a miter axis, which is parallel to the working direction and/or extends in parallel to a longitudinal axis of the guide device, which extends in parallel to the working direction.

17. The handheld machine saw as claimed in claim 1, wherein the saw depth setting bearing or the scorer depth setting bearing is arranged on a carrier, and which is arranged between a front miter bearing in the working direction and a rear miter bearing in the working direction of the miter bearing arrangement.

18. The handheld machine saw as claimed in claim 1, wherein the saw toolholder is loaded by a saw assembly spring arrangement in the upper depth setting position, so that the operator, to introduce a saw cut into the workpiece, actuates the saw toolholder, against the force of the saw assembly spring arrangement in the direction of the lower depth setting position.

19. The handheld machine saw as claimed in claim 1, further comprising a scorer positioning drive for adjusting the scorer toolholder between the active position and the inactive position.

20. The handheld machine saw as claimed in claim 19, wherein the driving device forms the scorer positioning drive or a part of the scorer positioning drive, or wherein the scorer positioning drive comprises a positioning motor.

21. The handheld machine saw as claimed in claim 1, further comprising a flexible electrical connecting line between the saw assembly and the scoring assembly for the electrical power supply of the scoring assembly.

22. The handheld machine saw as claimed in claim 21, wherein the connecting line has an attachment section connected to the saw assembly and an attachment section connected to the scoring assembly, wherein the attachment sections are connected to one another by a connecting section and have a greater distance to the saw toolholder and the scorer toolholder than the connecting section, so that the connecting line extends around a space open toward the side of the handheld machine saw facing away from the toolholders.

23. A handheld machine saw having a saw assembly, which has a saw toolholder for a saw tool, and a saw drive motor for driving the saw toolholder, and having a guide device, which has a guide body having a guide surface extending along a longitudinal axis for guiding the handheld machine saw along a working direction on a workpiece or a guide rail and, on its upper side opposite to the guide surface, the saw toolholder as a whole is movably mounted by means of a saw depth setting bearing between an upper depth setting position and at least one lower depth setting position, in which the saw toolholder is adjusted closer to the guide surface than in the upper depth setting position, so that the saw tool, to introduce a saw cut into the workpiece, protrudes farther from the guide surface in the lower depth setting position than in the upper depth setting position, wherein the hand-held machine saw further comprises a scoring assembly, arranged in front of the saw assembly on the guide device with respect to the working direction, having a scorer toolholder for a scoring tool and having a scorer drive for driving the scorer toolholder, which is movably mounted on or with respect to the guide device by means of a scorer depth setting bearing, which is separate from the saw depth setting bearing, between at least one active position, in which the scoring tool arranged on the scorer toolholder protrudes from the guide surface to introduce a score, which is upstream in the working direction from a saw cut to be introduced, into the workpiece, and an inactive position, in which the scoring tool is adjusted behind the guide surface, and wherein the scoring assembly is configured to introduce the score using the scoring tool into an upper side surface of the workpiece, and the saw assembly is configured to introduce the saw cut using the saw tool from a lower side surface of the workpiece opposite the upper side surface, the upper side surface of the workpiece being closer to the guide surface of the guide device than the lower side surface of the workpiece, and wherein the saw depth setting bearing is spaced a longitudinal distance along the guide body with respect to the working direction from the scorer depth setting bearing, and wherein the scoring assembly has a scorer drive motor separate from the saw drive motor.

24. The handheld machine saw as claimed in claim 23, further comprising at least one switch for switching on and switching off the scorer drive motor, wherein the switch comprises a switch for switching on and switching off the saw drive motor.

25. The machine saw as claimed in claim 23, wherein a ratio of an external diameter of the saw tool to an external diameter of the saw drive motor is greater than a ratio of an external diameter of the scoring tool to an external diameter of the scorer drive motor.

26. A mobile handheld machine saw having a saw assembly, which has a saw toolholder for a saw tool, and a saw drive motor for driving the saw toolholder, and having a guide device, which has a guide body having a guide surface extending along a longitudinal axis for guiding the handheld machine saw along a working direction on a workpiece or a guide rail and, on its upper side opposite to the guide surface, the saw toolholder as a whole is movably mounted by means of a saw depth setting bearing between an upper depth setting position and at least one lower depth setting position, in which the saw toolholder is adjusted closer to the guide surface than in the upper depth setting position, so that the saw tool, to introduce a saw cut into the workpiece, protrudes farther from the guide surface in the lower depth setting position than in the upper depth setting position, wherein the hand-held machine saw further comprises a scoring assembly, arranged in front of the saw assembly on the guide device with respect to the working direction, having a scorer toolholder for a scoring tool and having a scorer drive for driving the scorer toolholder, and wherein the hand-held machine saw further comprises a flexible electrical connecting line between the saw assembly and the scoring assembly for the electrical power supply of the scoring assembly.

27. The machine saw as claimed in claim 26, wherein the scoring assembly is movably mounted on or with respect to the guide device by means of a scorer depth setting bearing, which is separate from the saw depth setting bearing, between at least one active position, in which the scoring tool arranged on the scorer toolholder protrudes from the guide surface to introduce a score, which is upstream in the working direction from a saw cut to be introduced, into the workpiece, and an inactive position, in which the scoring tool is adjusted behind the guide surface.

28. The handheld machine saw as claimed in claim 14, wherein the scorer depth setting bearing is a pivot bearing, which pivotably mounts the scorer toolholder around the depth setting axis, and wherein the depth setting axis of the scorer depth setting bearing is arranged between the scorer toolholder and the saw toolholder on the guide device.

* * * * *